United States Patent
Ito et al.

(10) Patent No.: US 7,292,518 B2
(45) Date of Patent: Nov. 6, 2007

(54) APPARATUS FOR RECORDING INFORMATION AND APPARATUS FOR RECORDING AND REPRODUCING INFORMATION

(75) Inventors: Yujiro Ito, Kanagawa (JP); Masaaki Hara, Tokyo (JP); Jun Sawai, Kanagawa (JP); Tsunenori Shiimoto, Kanagawa (JP); Nobuchika Momochi, Kanagawa (JP); Tadaaki Yoshinaka, Kanagawa (JP); Takashi Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 498 days.

(21) Appl. No.: 10/489,728

(22) PCT Filed: Jul. 14, 2003

(86) PCT No.: PCT/JP03/08893

§ 371 (c)(1),
(2), (4) Date: Oct. 18, 2004

(87) PCT Pub. No.: WO2004/008445

PCT Pub. Date: Jan. 22, 2004

(65) Prior Publication Data

US 2005/0105444 A1     May 19, 2005

(30) Foreign Application Priority Data

Jul. 17, 2002   (JP)   ............................... 2002-207880

(51) Int. Cl.
*G11B 7/00*     (2006.01)
(52) U.S. Cl. .................. 369/116; 369/47.5; 369/59.11; 369/44.14; 369/97
(58) Field of Classification Search ..................... None
See application file for complete search history.

(56) References Cited

U.S. PATENT DOCUMENTS 4,520,472 A     5/1985   Reno (Continued)

FOREIGN PATENT DOCUMENTS

JP     52-128104     10/1977

(Continued)

*Primary Examiner*—Muhammad Edun
(74) *Attorney, Agent, or Firm*—Frommer Lawrence & Haug LLP; William S. Frommer; Thomas F. Presson

(57) ABSTRACT

An apparatus for recording information, which comprises a one-dimensional diode array (21) constituted with a plurality of laser diodes arranged in a line, a modulation control signal generator (23) for supplying the laser diodes constituting the one-dimensional diode array with modulation control signals based on information to be recorded, and an optical system (24) for causing laser light beams obtained from the one-dimensional diode array to be incident upon an optical tape (26), wherein said optical system is operative to focus the laser light beams which have been modulated in response to the modulation control signals and obtained from the one-dimensional diode array so that geometric optical images of the modulated light beams are reduced over the diffraction limit thereof on the optical tape. Accordingly, when information recording on the optical tape or information reproduction from the optical tape is carried out with the laser light beams incident upon the optical tape, difficulties in determining and maintaining positional relations among various optical means can be reduced and the coefficient of utilization of the laser light beams can be improved.

36 Claims, 21 Drawing Sheets

U.S. PATENT DOCUMENTS

| | | | |
|---|---|---|---|
| 4,754,446 A | | 6/1988 | Reno |
| 4,768,184 A | | 8/1988 | Reno |
| 4,884,260 A | | 11/1989 | Bouldin et al. |
| 5,479,387 A | * | 12/1995 | Ando et al. ............... 369/44.23 |
| 6,045,888 A | * | 4/2000 | Chen et al. ............... 369/275.1 |

FOREIGN PATENT DOCUMENTS

| | | |
|---|---|---|
| JP | 61-8749 | 1/1986 |
| JP | 8-321084 | 12/1996 |

* cited by examiner

APPARATUS FOR RECORDING INFORMATION AND APPARATUS FOR RECORDING AND REPRODUCING INFORMATION

TECHNICAL FIELD

The invention disclosed in each of claims of the present application relates to an apparatus for recording information which is operative to cause a light beam modulated in response to information to be recorded to be incident upon an optical recording medium for establishing a condition wherein the information to be recorded is recorded on the optical recording medium, or an apparatus for recording and reproducing information which is operative to cause a light beam modulated in response to information to be recorded to be incident upon an optical recording medium for establishing a condition wherein the information to be recorded is recorded on the optical recording medium or cause a light beam to be incident upon an optical recording medium for establishing a condition wherein the light beam is modulated in response to information recorded on the optical recording medium and obtained from the optical recording medium to be detected for reproduction of the information from the optical recording medium.

TECHNICAL BACKGROUND

In the field of information recording on a recording medium and information reproduction from a recording medium on which the information is recorded, under the circumstances wherein recording and reproduction of data representing moving pictures performed with a relatively small-scale recording and reproducing instrument are desired, it is strongly required more than before to have arrangements for recording information on a recording medium with high data density, increasing data rate of information to be recorded on or reproduced from a recording medium and so on. Accordingly, with the intention of meeting such requirements, there has been proposed a multi-beam recording and/or reproducing technology for causing a plurality of light beams to be incident upon an optical recording medium on which information can be recorded with light for establishing a condition wherein information is recorded on the optical recording medium with the light beams or information recorded on the optical recording medium is reproduced form the optical recording medium with the light beams.

With the multi-beam recording and reproducing technology, advantages that the light beams such as a plurality of laser light beams are used for recording information on the optical recording medium and so that the information is recorded with high data density on the optical recording medium and the light beams are incident upon the optical recording medium independently with one another for recording information on or reproducing information from the optical recording medium so that the data rate of the information to be recorded on or reproduced from the optical recording medium is increased, are obtained. As one of information recording and reproducing apparatus, to each of which such multi-beam recording and reproducing technology as mentioned above is applied, an optical tape recording and reproducing apparatus in which a tape-shaped optical recording medium, namely, an optical tape is used, has been proposed as disclosed in the paper of "Novel digital optical tape recorder" Oakley, William S., LaserTape Inc., SPIE Proceedings Vol. 2604, pp. 256-262.

FIG. 1 shows an essential part of an example of the optical tape recording and reproducing apparatus proposed previously. In the optical tape recording and reproducing apparatus, the essential part of which is shown in FIG. 1, a laser light source 1 is provided for generating continuously a single laser light beam as a parallel light beam. The single laser light beam emitted from the laser light source 1 enters into a beam producing hologram 2.

In the beam producing hologram 2, the single laser light beam which is the parallel light beam emitted from the laser light source 1 is divided into a plurality of laser light beams each being a parallel light beam. That is, the beam producing hologram 2 is operative to produce a plurality of parallel light beams by dividing the single parallel light beam.

The laser light beams obtained from the beam producing hologram 2 enter into a polarized light beam splitter 3 and are reflected from the polarized light beam splitter 3 to be directed downward in FIG. 1 to pass through a quarter wavelength plate 4 and then enter into a converging lens 5. The converging lens 5 is operative to converge the laser light beams having passed through the quarter wavelength plate 4 to be incident upon a two-dimensional light-modulator 6.

The two-dimensional light-modulator 6 is constituted with a plurality of reflection type light-modulating elements which are arranged two-dimensionally with predetermined spaces on a common plane portion. The laser light beams from the converging lens 5 form respectively a plurality of light spots P arranged two-dimensionally with predetermined spaces on the common plane portion of the two-dimensional light-modulator 6, as shown in FIG. 2. In FIG. 2, sixty-four (8×8=64) light spots P are arranged two-dimensionally and this means that sixty-four laser light beams arranged two-dimensionally are incident upon the two-dimensional light-modulator 6.

The reflection type light-modulating elements arranged two-dimensionally with predetermined spaces on the common plane portion of the two-dimensional light-modulator 6 are positioned to correspond respectively to the light spots P formed on the common plane portion of the two-dimensional light-modulator 6 by the laser light beams incident upon the two-dimensional light-modulator 6. FIG. 3 shows an example of an arrangement of the reflection type light-modulating elements in the two-dimensional light-modulator 6. In FIG. 3, each of the reflection type light-modulating elements is represented with a rectangular parallelepiped LM and each of the light spot P is formed on the reflection type light-modulating element LM.

As shown in FIG. 4, a back surface of each of the reflection type light-modulating elements LM arranged two-dimensionally with predetermined spaces on the common plane portion of the two-dimensional light-modulator 6, which is opposite to an incident surface of the reflection type light-modulating element LM upon which one of the laser light beams is incident to form the light beam, forms a light reflecting surface RF. Therefore, the laser light beam incident upon each of the reflection type light-modulating elements LM is reflected from the light reflecting surface RF.

In relation to the two-dimensional light-modulator 6, a modulation control signal generator 7 is provided. The modulation control signal generator 7 is operative to produce a plurality of modulation control signals SM corresponding to information which are to be recorded and supply the reflection type light-modulating elements constituting the two-dimensional light-modulator 6 with the modulation control signals SM, respectively. Each of the reflection type light-modulating elements constituting the two-dimensional light-modulator 6 is operative to modulate the laser light beam which is incident thereupon and reflected therefrom in response to the modulation control signal SM. The modulation of the laser light beam in the two-dimensional light-modulator 6 is carried out by varying the reflection amount of the laser light beam at each of the reflection type light-modulating elements in response to the modulation control signal SM. Incidentally, if the modulation control signals SM require, the laser light beam which is incident upon each of the reflection type light-modulating elements constituting the two-dimensional light-modulator 6 is reflected from the reflection type light-modulating elements substantially without being modulated.

As a result of this, the laser light beams which are modulated in response to the modulation control signals SM at and reflected from the reflection type light-modulating elements arranged two-dimensionally with predetermined spaces on the common plane portion of the two-dimensional light-modulator 6, respectively, or reflected respectively from the reflection type light-modulating elements arranged two-dimensionally with predetermined spaces on the common plane portion of the two-dimensional light-modulator 6 substantially without being modulated, are obtained from the two-dimensional light-modulator 6 to be directed to the converging lens 5.

The laser light beams from the two-dimensional light-modulator 6 pass through the converging lens 5 and the quarter wavelength plate 4 to enter into the polarized light beam splitter 3. Since the laser light beams entering into the polarized light beam splitter 3 from the quarter wavelength plate 4 have passed through the quarter wavelength plate 4 twice in the direction to the converging lens 5 and in the opposite direction to the polarized light beam splitter 3, a plane of polarization of each of the laser light beams entering into the polarized light beam splitter 3 from the quarter wavelength plate 4 has been rotated by 90 degrees in comparison with that of each of the laser light beams entering into the polarized light beam splitter 3 from the beam producing hologram 2 and therefore the laser light beams entering into the polarized light beam splitter 3 from the quarter wavelength plate 4 pass through the polarized light beam splitter 3 without being reflected.

The laser light beams thus having passed through the polarized light beam splitter 3 further pass through a quarter wavelength plate 8 and a light beam control optical system 9 to be incident upon an optical tape 10 which is an optical recording medium. The light beam control optical system 9 is operative to subject each of the laser light beams passing through there to the optical tape 10 to focus control for focusing properly each of the laser light beams on the optical tape 10 and tracking control for causing each of the laser light beams to be incident upon a proper position on the optical tape 10. Further, the optical tape 10 is driven by an optical tape driving device not shown in FIG. 1 to run in the direction indicated with an allow A (hereinafter, referred to as the A direction), for example.

The laser light beams passing through the light beam control optical system 9 to be incident upon the optical tape 10 form a plurality of light spots Q arranged two-dimensionally as shown in FIG. 5 on the optical tape 10. In FIG. 5, sixty-four (8×8=64) light spots Q are arranged two-dimensionally and this means that sixty-four laser light beams arranged two-dimensionally are incident upon the optical tape 10.

One of two array directions perpendicular to each other of the light spots (for example, sixty-four light spots Q) arranged two-dimensionally on the optical tape 10 is laid at an angle of α to the A direction in which the optical tape 10 runs, as shown in FIG. 5. Accordingly, with the movement of the optical tape 10 in the A direction, a plurality of recording tracks corresponding respectively to the light spots Q (for example, sixty-four light spots Q), on each of which information is recorded, are formed with a track-pitch $t$ on the optical tape 10.

When the laser light beams which have been reflected without being modulated from the two-dimensional light-modulator 6 are incident upon the optical tape 10, these laser light beams are modulated in response to information recorded on the optical tape 10 and simultaneously reflected from the optical tape 10 to be directed to the light beam control optical system 9. The laser light beams obtained from the optical tape 10 pass through the light beam control optical system 9 and the quarter wavelength plate 8 and then enter into the polarized light beam splitter 3. Since the laser light beams entering into the polarized light beam splitter 3 from the quarter wavelength plate 8 have passed through the quarter wavelength plate 8 twice in the direction to the light beam control optical system 9 and in the opposite direction to the polarized light beam splitter 3, a plane of polarization of each of the laser light beams entering into the polarized light beam splitter 3 from the quarter wavelength plate 8 has been rotated by 90 degrees in comparison with that of each of the laser light beams entering into the polarized light beam splitter 3 from the quarter wavelength plate 4 and therefore the laser light beams entering into the polarized light beam splitter 3 from the quarter wavelength plate 8 are reflected from the polarized light beam splitter 3 to be directed to the right in FIG. 1.

The laser light beams reflected to the right in FIG. 1 from the polarized light beam splitter 3 enter into a light beam splitter 11. A part of each of the laser light beams having entered into the light beam splitter 11 is reflected from the light beam splitter 11 to be directed downward in FIG. 1 to pass through an optical element 12, such as a cylindrical lens or the like, and then enters into a focus and tracking detector 13 and another part of each of the laser light beams having entered into the light beam splitter 11 passes through the light beam splitter 11 further to pass through an optical element 14, such as a converging lens or the like, and then enters into a light detector 15.

The focus and tracking detector 13 is operative to produce output signals SF and ST which represent respectively the focus condition and the tracking condition of the laser light beams incident upon the optical tape 10 in response to the laser light beams incident upon the focus and tracking detector 13 through the optical element 12. The output signals SF and ST thus obtained from the focus and tracking detector 13 are used for the focus control and the tracking control to which each of the laser light beams passing through the light beam control optical system 9 to be incident upon the optical tape 10 is subjected.

The light detector 15 is operative to produce a plurality of output signals Sl which vary in response to variations in each of the laser light beams incident upon the light detector 15 through the optical element 14 and supply an information reproducing portion 16 with the output signals Sl. The information reproducing portion 16 is operative to reproduce the information recorded on the optical tape 10 based on the output signals Sl obtained from the light detector 15.

In the optical tape recording and reproducing apparatus thus shown in FIG. 1, when information is newly recorded on the optical tape 10, the modulation control signals SM which are produced to vary in response to the information to be recorded are supplied from the modulation control signal generator 7 to the reflection type light-modulating elements constituting the two-dimensional light-modulator 6, respectively. As the result, the laser light beams which are modulated in response to the modulation control signals SM by the reflection type light-modulating elements and simultaneously reflected from the reflection type light-modulating elements are obtained from the two-dimensional light-modulator 6 to be directed to the converging lens 5.

The laser light beams modulated in response to the modulation control signals SM and obtained from the two-dimensional light-modulator 6 pass through the converging lens 5, the quarter wavelength plate 4, the polarized light beam splitter 3 and the quarter wavelength plate 8 to enter into the light beam control optical system 9 and then are subjected to the focus control and the tracking control in the light beam control optical system 9 so as to be incident upon the optical tape 10. As a result of this, the recording of the information on the optical tape 10 is carried out with the laser light beams modulated in response to the modulation control signals SM and the recording tracks, on each of which the information is recorded, are formed on the optical tape 10.

When information recorded on the optical tape 10 is reproduced from the optical tape 10 in the optical tape recording and reproducing apparatus shown in FIG. 1, the modulation control signals SM, each of which is predetermined to be constant, are supplied from the modulation control signal generator 7 to the reflection type light-modulating elements constituting the two-dimensional light-modulator 6, respectively. As the result, the laser light beams which are reflected with a constant reflecting amount without being modulated from the reflection type light-modulating elements are obtained from the two-dimensional light-modulator 6 to be directed to the converging lens 5.

The laser light beams having not been modulated and obtained from the two-dimensional light-modulator 6 pass through the converging lens 5, the quarter wavelength plate 4, the polarized light beam splitter 3 and the quarter wavelength plate 8 to enter into the light beam control optical system 9 and then are subjected to the focus control and the tracking control in the light beam control optical system 9 so as to be incident upon the optical tape 10. The laser light beams thus incident upon the optical tape 10 are modulated in response to the information recorded on the optical tape 10 and simultaneously reflected from the optical tape 10 to be directed to the light beam control optical system 9. The laser light beams modulated in response to the information recorded on the optical tape 10 and obtained from the optical tape 10 pass through the light beam control optical system 9 and the quarter wavelength plate 8 and then are reflected from the polarized light beam splitter 3 to enter into the light beam splitter 11. The laser light beams thus entering into the light beam splitter 11 are partially reflected from the light beam splitter 11 to enter into the focus and tracking detector 13 and simultaneously partially pass through the light beam splitter 11 to enter into the light detector 15 through the optical element 14.

As a result of this, the output signal SF which represents the focus condition of the laser light beams incident upon the optical tape 10 and the output signal ST which represents the tracking condition of the laser light beams incident upon the optical tape 10 are obtained from the focus and tracking detector 13 and the output signals Sl which vary in response to variations in each of the laser light beams modulated in response to the information recorded on the optical tape 10 are obtained from the light detector 15 to be supplied to the information reproducing portion 16. Then, in the information reproducing portion 16, the information recorded on the optical tape 10 is reproduced based on the output signals Sl obtained from the light detector 15.

Further, it has been also proposed previously another optical tape recording and reproducing apparatus which uses a two-dimensional laser diode array provided therein and is different in its configuration and operation from the optical tape recording and reproducing apparatus shown in FIG. 1. FIG. 6 shows an example of a two-dimensional laser diode array 17 used for such an apparatus. In the two-dimensional laser diode array 17 shown in FIG. 6, a plurality of surface emitting laser diodes (for example, nine surface emitting laser diodes (3×3=9)) 18 are arranged two-dimensionally with predetermined space.

The two-dimensional laser diode array 17 is positioned for causing the surface emitting laser diodes 18 arranged two-dimensionally with predetermined space to face closely or come into contact with an optical tape 19, as shown in FIG. 7. When information to be recorded is newly recorded on the optical tape 19, each of the surface emitting laser diodes 18 emits a laser light beam modulated in response to the information to cause the same to be incident upon the optical tape 19. Thereby, the information is recorded on the optical tape 19.

In such a case, one of two array directions perpendicular to each other of the surface emitting laser diodes 18 arranged two-dimensionally in the two-dimensional laser diode array 17 is laid at an angle of $\beta$ to the direction indicated with an allow B (hereinafter, referred as the B direction) in which the optical tape 19 runs, as shown in FIG. 8, for example. Accordingly, with the movement of the optical tape 19 in the B direction, a plurality of recording tracks corresponding respectively to the surface emitting laser diodes 18 (for example, nine surface emitting laser diodes 18), on each of which the information is recorded, are formed with a track-pitch $t'$ on the optical tape 19.

When the information thus recorded on the optical tape 19 is reproduced from the optical tape 19, the two-dimensional laser diode array 17 is positioned for causing the surface emitting laser diodes 18 arranged two-dimensionally with predetermined space to face closely or come into contact with the optical tape 19 on which the information is recorded and each of the surface emitting laser diodes 18 emits a laser light beam predetermined to be constant and causes the same to be incident upon the optical tape 19. The laser light beams thus incident upon the optical tape 19 are modulated in response to the information recorded on the optical tape 19 and simultaneously reflected from the optical tape 19 to return to the surface emitting laser diodes 18, respectively. Thereby, each of the surface emitting laser diodes 18 is put in an oscillating condition with the laser light beam returning thereto. Then, the oscillation in each of the surface emitting laser diodes 18 is detected to produce a detection output signal and the information is reproduced based on the detection output signals which are obtained from the surface emitting laser diodes 18, respectively.

In the optical tape recording and reproducing apparatus previously proposed as shown in FIG. 1, in which the beam producing hologram 2 and the two-dimensional light-modulator 6 are provided, the plural laser light beams which are produced by dividing the single laser light beam in the beam producing hologram 2 are incident upon the plural reflection type light-modulating elements constituting the two-dimensional light-modulator 6, respectively. Under such a situation, for establishing a condition wherein each of the plural laser light beams from the beam producing hologram 2 is incident precisely upon a corresponding one of the reflection type light-modulating elements constituting the two-dimensional light-modulator 6, it is necessary to determine and maintain rigorously positional relations among the various optical means including the beam producing hologram 2, the two-dimensional light-modulator 6 and the devices between them. However, as a matter of fact, since the reflection type light-modulating elements constituting the two-dimensional light-modulator 6 are arranged two-dimensionally with predetermined space, it is extremely difficult to determine and maintain rigorously the positional relations among the various optical means in question. Consequently, lack of necessary one or more of the laser light beams, deteriorations in coefficient of utilization of the laser light beams and so on result disadvantageously from inaccuracy in the positional relations among the various optical means in question.

Further, since one of two array directions perpendicular to each other of the light spots which are formed by the laser light beams incident upon the optical tape 10 to be arranged two-dimensionally on the optical tape 10, is laid at the angle of $\alpha$ to the A direction in which the optical tape 10 runs, the information recorded on the optical tape 10 to form the recording tracks are provided with phase-differences between each two recording tracks adjacent to each other. Therefore, when the information recorded on the optical tape 10 is reproduced, it is impossible to reproduce easily the information recorded on the optical tape 10 by processing the plural output signals Sl obtained from the light detector 15 in the lump and complicated signal processing for reproducing the information recorded on the optical tape 10 is required to be carried out in the information reproducing portion 16.

Then, as for the optical tape recording and reproducing apparatus using the two-dimensional laser diode array 17 provided therein and proposed previously as shown in FIG. 6, since the two-dimensional laser diode array 17 which contains the plural surface emitting laser diodes 18, each of which is operative to emit a laser light beam with very small power, for example, about 20 µW, has been merely realized, as a matter of fact, the surface emitting laser diodes 18 contained in the two-dimensional laser diode array 17 are required substantially to come into contact with the optical tape 19, as shown in FIG. 7. Therefore, the advantageous features of the optical tape recording and reproducing apparatus that noncontact information recording on and reproduction from the optical tape can be carried out so as to avoid a bad influence of extraneous substance stuck on the optical tape 19, are lost.

In addition, since one of two array directions perpendicular to each other of the surface emitting laser diodes 18 arranged two-dimensionally with predetermined space in the two-dimensional laser diode array 17 facing the optical tape 19, is laid at the angle of $\beta$ to the B direction in which the optical tape 19 runs, the information recorded on the optical tape 19 to form the recording tracks are provided with phase-differences between each two recording tracks adjacent to each other. Therefore, in this case also, when the information recorded on the optical tape 19 is reproduced, it is impossible to reproduce easily the information recorded on the optical tape 19 by processing a plurality of output signals obtained from a light detector in the lump and complicated signal processing for reproducing the information recorded on the optical tape 19 is required to be carried out in an information reproducing portion.

Accordingly, it is an object of the invention disclosed in each of claims of the present application to provide an apparatus for recording information or an apparatus for recording and reproducing information, in which a plurality of light beams, such as laser light beams, are caused to be incident upon an optical recording medium, such as an optical tape, for recording information on or for recording information on and reproducing information from the optical recording medium, and with which noncontact information recording wherein information is subjected to noncontact recording on the optical recording medium or noncontact information reproduction wherein information recorded on the optical recording medium is subjected to noncontact reproduction from the optical recording medium can be carried out, difficulties in determining and maintaining positional relations among a plurality of optical means through which the light beams pass or from which the light beams are reflected can be reduced, the coefficient of utilization of the light beams can be improved, and the information recorded on the optical recording medium can be reproduced relatively easily without performing complicated signal processing.

DISCLOSURE OF THE INVENTION

According to the invention claimed in any one of claims 1 to 3 of the present application, there is provided an apparatus for recording information, which comprises a recording medium driving controller for driving an optical recording medium, a light source comprising a one-dimensional diode array constituted with a plurality of laser diodes arranged in a line for generating a plurality of light beams, a modulation control signal generator for supplying the laser diodes in the light source with a plurality of modulation control signals varying in response to information to be recorded so that the laser diodes in the light source generate the light beams modulated in response to the modulation control signals and arranged in a line in accordance with the arrangement of the laser diodes, and an optical system for focusing the modulated light beams obtained from the light source so that geometric optical images of the modulated light beams are reduced over the diffraction limit thereof and simultaneously for causing the focused modulated light beams to be incident upon the optical recording medium driven by the recording medium driving controller to record the information to be recorded on the optical recording medium.

According to the invention claimed in claim 4 of the present application, there is provided an apparatus for recording information, which comprises a recording medium driving controller for driving a tape-shaped optical recording medium, a light source comprising a one-dimensional diode array constituted with a plurality of laser diodes arranged in a line for generating a plurality of light beams, a modulation control signal generator for supplying the laser diodes in the light source with a plurality of modulation control signals varying in response to information to be recorded so that the laser diodes in the light source generate the light beams modulated in response to the modulation control signals and arranged in a line in accordance with the arrangement of the laser diodes, and an optical system for focusing the modulated light beams obtained from the light source so that geometric optical images of the modulated light beams are obtained under the diffraction limit thereof and simultaneously for causing the focused modulated light beams to be incident upon the tape-shaped optical recording medium driven by the recording medium driving controller to form on the tape-shaped optical recording medium a plurality of light spots arranged in a line at a predetermined angle to a direction in which the tape-shaped optical recording medium runs and record the information to be recorded on the tape-shaped optical recording medium.

According to the invention claimed in any one of claims 5 to 9 of the present application, there is provided an apparatus for recording information, which comprises a recording medium driving controller for driving an optical recording medium, a light source comprising a one-dimensional diode array constituted with a plurality of laser diodes arranged in a line for generating a plurality of light beams, a one-dimensional light-modulator constituted with a plurality of light-modulating elements arranged in a line, a first optical system for causing the light beams obtained from the light source to incident upon the light-modulating elements in the one-dimensional light-modulator, a modulation control signal generator for supplying the light-modulating elements in the one-dimensional light-modulator with a plurality of modulation control signals varying in response to information to be recorded so that the light beams obtained from the light source are modulated in response to the modulation control signals at the light-modulating elements in the one-dimensional light-modulator to be arranged in a line in accordance with the arrangement of the light-modulating elements, and a second optical system for focusing the modulated light beams obtained from the one-dimensional light-modulator so that geometric optical images of the modulated light beams are reduced over the diffraction limit thereof and simultaneously for causing the focused modulated light beams to be incident upon the optical recording medium driven by the recording medium driving controller to record the information to be recorded on the optical recording medium.

According to the invention claimed in any one of claims 10 to 12 of the present application, there is provided an apparatus for recording information, which comprises a recording medium driving controller for driving a tape-shaped optical recording medium, a light source comprising a one-dimensional diode array constituted with a plurality of laser diodes arranged in a line for generating a plurality of light beams, a one-dimensional light-modulator constituted with a plurality of light-modulating elements arranged in a line, a first optical system for causing the light beams obtained from the light source to incident upon the light-modulating elements in the one-dimensional light-modulator, a modulation control signal generator for supplying the light-modulating elements in the one-dimensional light-modulator with a plurality of modulation control signals varying in response to information to be recorded so that the light beams obtained from the light source are modulated in response to the modulation control signals at the light-modulating elements in the one-dimensional light-modulator to be arranged in a line in accordance with the arrangement of the light-modulating elements, and a second optical system for focusing the modulated light beams obtained from the one-dimensional light-modulator so that geometric optical images of the modulated light beams are obtained under the diffraction limit thereof and simultaneously for causing the focused modulated light beams to be incident upon the tape-shaped optical recording medium driven by the recording medium driving controller to form on the optical recording medium a plurality of light spots arranged in a line at a predetermined angle to a direction in which the tape-shaped optical recording medium runs and record the information to be recorded on the tape-shaped optical recording medium.

According to the invention claimed in claim 13 or 14 of the present application, there is provided an apparatus for recording and reproducing information, which comprises a recording medium driving controller for driving an optical recording medium, a first light source comprising a one-dimensional diode array constituted with a plurality of laser diodes arranged in a line for generating a plurality of light beams, a modulation control signal generator for supplying the laser diodes in the first light source with a plurality of modulation control signals varying in response to information to be recorded so that the laser diodes in the first light source generate the light beams modulated in response to the modulation control signals and arranged in a line in accordance with the arrangement of the laser diodes, a first optical system for focusing the modulated light beams obtained from the first light source so that geometric optical images of the modulated light beams are reduced over the diffraction limit thereof and simultaneously for causing the focused modulated light beams to be incident upon the optical recording medium driven by the recording medium driving controller to record the information to be recorded on the optical recording medium, a second light source for emitting additional light beams, a second optical system for causing the additional light beams obtained from the second light source to be incident upon the optical recording medium driven by the recording medium driving controller so that a plurality of light beams modulated in response to the information recorded on the optical recording medium are obtained from the optical recording medium, a light detector for generating output signals varying in response to variations in light beams incident thereupon, a third optical system for causing the modulated light beams obtained from the optical recording medium to be incident upon the light detector, and an information reproducing portion for reproducing the information recorded on the optical recording medium based on the output signals obtained from the light detector.

According to the invention claimed in claim 15 or 16 of the present application, there is provided an apparatus for recording and reproducing information, which comprises a recording medium driving controller for driving a tape-shaped optical recording medium, a first light source comprising a one-dimensional diode array constituted with a plurality of laser diodes arranged in a line for generating a plurality of light beams, a modulation control signal generator for supplying the laser diodes in the first light source with a plurality of modulation control signals varying in response to information to be recorded so that the laser diodes in the first light source generate the light beams modulated in response to the modulation control signals and arranged in a line in accordance with the arrangement of the laser diodes, a first optical system for focusing the modulated light beams obtained from the first light source so that geometric optical images of the modulated light beams are obtained under the diffraction limit thereof and simultaneously for causing the focused modulated light beams to be incident upon the tape-shaped optical recording medium driven by the recording medium driving controller to form on the tape-shaped optical recording medium a plurality of light spots arranged in a line at a predetermined angle to a direction in which the tape-shaped optical recording medium runs and record the information to be recorded on the optical recording medium, a second light source for emitting additional light beams, a second optical system for causing the additional light beams obtained from the second light source to be incident upon the tape-shaped optical recording medium driven by the recording medium driving controller so that a plurality of light beams modulated in response to the information recorded on the tape-shaped optical recording medium are obtained from the tape-shaped optical recording medium, a light detector for generating output signals varying in response to variations in light beams incident thereupon, a third optical system for causing the modulated light beams obtained from the tape-shaped optical recording medium to be incident upon the light detector, and an information reproducing portion for reproducing the information recorded on the tape-shaped optical recording medium based on the output signals obtained from the light detector.

According to the invention claimed in claim 17 or 18 of the present application, there is provided an apparatus for recording and reproducing information, which comprises a recording medium driving controller for driving an optical recording medium, a first light source comprising a one-dimensional diode array constituted with a plurality of laser diodes arranged in a line for generating a plurality of light beams, a one-dimensional light-modulator constituted with a plurality of light-modulating elements arranged in a line, a first optical system for causing the light beams obtained from the light source to incident respectively upon the light-modulating elements in the one-dimensional light-modulator, a modulation control signal generator for supplying the light-modulating elements in the one-dimensional light-modulator with a plurality of modulation control signals varying in response to information to be recorded so that the light beams obtained from the light source are modulated in response to the modulation control signals at the light-modulating elements in the one-dimensional light-modulator to be arranged in a line in accordance with the arrangement of the light-modulating elements, a second optical system for focusing the modulated light beams obtained from the one-dimensional light-modulator so that geometric optical images of the modulated light beams are reduced over the diffraction limit thereof and simultaneously for causing the focused modulated light beams to be incident upon the optical recording medium driven by the recording medium driving controller to record the information to be recorded on the optical recording medium, a second light source for emitting additional light beams, a third optical system for causing the additional light beams obtained from the second light source to be incident upon the optical recording medium driven by the recording medium driving controller so that a plurality of light beams modulated in response to the information recorded on the optical recording medium are obtained from the optical recording medium, a light detector for generating output signals varying in response to variations in light beams incident thereupon, a fourth optical system for causing the modulated light beams obtained from the optical recording medium to be incident upon the light detector, and an information reproducing portion for reproducing the information recorded on the optical recording medium based on the output signals obtained from the light detector.

According to the invention claimed in claim 19 or 20 of the present application, there is provided an apparatus for recording and reproducing information, which comprises a recording medium driving controller for driving a tape-shaped optical recording medium, a first light source comprising a one-dimensional diode array constituted with a plurality of laser diodes arranged in a line for generating a plurality of light beams, a one-dimensional light-modulator constituted with a plurality of light-modulating elements arranged in a line, a first optical system for causing the light beams obtained from the light source to incident upon the light-modulating elements in the one-dimensional light-modulator, a modulation control signal generator for supplying the light-modulating elements in the one-dimensional light-modulator with a plurality of modulation control signals varying in response to information to be recorded so that the light beams obtained from the light source are modulated in response to the modulation control signals at the light-modulating elements in the one-dimensional light-modulator to be arranged in a line in accordance with the arrangement of the light-modulating elements, a second optical system for focusing the modulated light beams obtained from the one-dimensional light-modulator so that geometric optical images of the modulated light beams are obtained under the diffraction limit thereof and simultaneously for causing the focused modulated light beams to be incident upon the tape-shaped optical recording medium driven by the recording medium driving controller to form on the tape-shaped optical recording medium a plurality of light spots arranged in a line at a predetermined angle to a direction in which the tape-shaped optical recording medium runs and record the information to be recorded on the tape-shaped optical recording medium, a second light source for emitting additional light beams, a third optical system for causing the additional light beams obtained from the second light source to be incident upon the tape-shaped optical recording medium driven by the recording medium driving controller so that a plurality of light beams modulated in response to the information recorded on the tape-shaped optical recording medium are obtained from the tape-shaped optical recording medium, a light detector for generating output signals varying in response to variations in light beams incident thereupon, a fourth optical system for causing the modulated light beams obtained from the tape-shaped optical recording medium to be incident upon the light detector, and an information reproducing portion for reproducing the information recorded on the tape-shaped optical recording medium based on the output signals obtained from the light detector.

According to the invention claimed in any one of claims 21 to 25 of the present application, there is provided an apparatus for recording and reproducing information, which comprises a recording medium driving controller for driving an optical recording medium, a light source comprising a one-dimensional diode array constituted with a plurality of laser diodes arranged in a line for generating a plurality of light beams, a modulation control signal generator for supplying the laser diodes in the light source with a plurality of modulation control signals varying in response to information to be recorded or predetermined modulation control signals so that the laser diodes in the light source generate the light beams which have been modulated in response to the modulation control signals and arranged in a line in accordance with the arrangement of the laser diodes or which have not been subjected to any modulation and arranged in a line in accordance with the arrangement of the laser diodes, a polarized light beam splitter into which the light beams from the light source enter, a first optical system for focusing the light beams having passed through or been reflected from the polarized light beam splitter so that geometric optical images of the light beams are reduced over the diffraction limit thereof and simultaneously for causing the focused light beams to be incident upon the optical recording medium driven by the recording medium driving controller to record the information to be recorded on the optical recording medium or to produce a plurality of light beams modulated in response to information recorded on the optical recording medium and departing from the optical recording medium, a light detector for generating output signals varying in response to variations in light beams incident thereupon, a second optical system for causing the light beams obtained from the optical recording medium and having been reflected from or passed through the polarized light beam splitter to be incident upon the light detector, and an information reproducing portion for reproducing the information recorded on the optical recording medium based on the output signals obtained from the light detector.

According to the invention claimed in any one of claims 26 to 28 of the present application, there is provided an apparatus for recording and reproducing information, which comprises a recording medium driving controller for driving a tape-shaped optical recording medium, a light source comprising a one-dimensional diode array constituted with a plurality of laser diodes arranged in a line for generating a plurality of light beams, a modulation control signal generator for supplying the laser diodes in the light source with a plurality of modulation control signals varying in response to information to be recorded or predetermined modulation control signals so that the laser diodes in the light source generate the light beams which have been modulated in response to the modulation control signals and arranged in a line in accordance with the arrangement of the laser diodes or which have not been subjected to any modulation and arranged in a line in accordance with the arrangement of the laser diodes, a polarized light beam splitter into which the light beams from the light source enter, a first optical system for focusing the light beams having passed through or been reflected from the polarized light beam splitter so that geometric optical images of the modulated light beams are obtained under the diffraction limit thereof and simultaneously for causing the focused modulated light beams to be incident upon the tape-shaped optical recording medium driven by the recording medium driving controller to form on the tape-shaped optical recording medium a plurality of light spots arranged in a line at a predetermined angle to a direction in which the tape-shaped optical recording medium runs and record the information to be recorded on the tape-shaped optical recording medium or produce a plurality of light beams modulated in response to information recorded on the tape-shaped optical recording medium and departing from the tape-shaped optical recording medium, a light detector for generating output signals varying in response to variations in light beams incident thereupon, a second optical system for causing the light beams obtained from the tape-shaped optical recording medium and having been reflected from or passed through the polarized light beam splitter to be incident upon the light detector, and an information reproducing portion for reproducing the information recorded on the tape-shaped optical recording medium based on the output signals obtained from the light detector.

According to the invention claimed in any one of claims 29 to 33 of the present application, there is provided an apparatus for recording and reproducing information, which comprises a recording medium driving controller for driving an optical recording medium, a light source comprising a one-dimensional diode array constituted with a plurality of laser diodes arranged in a line for generating a plurality of light beams, a one-dimensional light-modulator constituted with a plurality of light-modulating elements arranged in a line, a first light system for causing the light beams obtained from the light source to incident respectively upon the light-modulating elements in the one-dimensional light-modulator, a modulation control signal generator for supplying the light-modulating elements in the one-dimensional light-modulator with a plurality of modulation control signals varying in response to information to be recorded or predetermined modulation control signals so that the light-modulating elements in the one-dimensional light-modulator generate the light beams which have been modulated respectively in response to the modulation control signals and arranged in a line in accordance with the arrangement of the light-modulating elements or which have not been subjected to any modulation and arranged in a line in accordance with the arrangement of the light-modulating elements, a polarized light beam splitter into which the light beams from the one-dimensional light-modulator enter, a second optical system for focusing the light beams obtained from the one-dimensional light-modulator and having passed through or been reflected from the polarized light beam splitter so that geometric optical images of the light beams are reduced over the diffraction limit thereof and simultaneously for causing the focused light beams to be incident upon the optical recording medium driven by the recording medium driving controller to record the information to be recorded on the optical recording medium or to produce a plurality of light beams modulated in response to information recorded on the optical recording medium and departing from the optical recording medium, a light detector for generating output signals varying in response to variations in light beams incident thereupon, a third optical system for causing the light beams obtained from the optical recording medium and having been reflected from or passed through the polarized light beam splitter to be incident upon the light detector, and an information reproducing portion for reproducing the information recorded on the optical recording medium based on the output signals obtained from the light detector.

According to the invention claimed in any one of claims 34 to 36 of the present application, there is provided an apparatus for recording and reproducing information, which comprises a recording medium driving controller for driving a tape-shaped optical recording medium, a light source comprising a one-dimensional diode array constituted with a plurality of laser diodes arranged in a line for generating a plurality of light beams, a one-dimensional light-modulator constituted with a plurality of light-modulating elements arranged in a line, a first optical system for causing the light beams obtained from the light source to be incident respectively upon the light-modulating elements in the one-dimensional light-modulator, a modulation control signal generator for supplying the light-modulating elements in the one-dimensional light-modulator with a plurality of modulation control signals varying in response to information to be recorded or predetermined modulation control signals so that the light beams obtained from the light source are modulated in response to the modulation control signals or not subjected to any modulation at the light-modulating elements in the one-dimensional light-modulator to be arranged in a line in accordance with the arrangement of the light-modulating elements, a polarized light beam splitter into which the light beams from the one-dimensional light-modulator enter, a second optical system for focusing the light beams obtained from the one-dimensional light-modulator and having passed through or been reflected from the polarized light beam splitter so that geometric optical images of the light beams are obtained under the diffraction limit thereof and simultaneously for causing the focused modulated light beams to be incident upon the tape-shaped optical recording medium driven by the recording medium driving controller to form on the tape-shaped optical recording medium a plurality of light spots arranged in a line at a predetermined angle to a direction in which the tape-shaped optical recording medium runs and record the information to be recorded on the tape-shaped optical recording medium or produce a plurality of light beams modulated in response to information recorded on the tape-shaped optical recording medium and departing from the tape-shaped optical recording medium, a third optical system for causing the light beams obtained from the tape-shaped optical recording medium and having been reflected from or passed through the polarized light beam splitter to be incident upon the light detector, and an information reproducing portion for reproducing the information recorded on the tape-shaped optical recording medium based on the output signals obtained from the light detector.

In the apparatus for recording information thus constituted in accordance with the invention claimed in any one of claims 1 to 3 of the present application, the light beams modulated in response to the modulation control signals and arranged in accordance with the arrangement of the laser diodes in the one-dimensional diode array are obtained from the light source which comprises the one-dimension diode array constituted with the laser diodes arranged in a line and supplied with the modulation control signals from the modulation control signal generator. These light beams are focused by the optical system so that the geometric optical images of the light beams are reduced over the diffraction limit thereof and simultaneously caused to be incident upon the optical recording medium driven by the recording medium driving controller to record the information to be recorded on the optical recording medium with the recording tracks formed thereon.

Since the light source which comprises the one-dimension diode array constituted with the laser diodes arranged in a line is used and the light beams which are modulated in response to the modulation control signals based on the information to be recorded are produced to be arranged in accordance with the arrangement of the laser diodes substantially in a common plane, focused so that the geometric optical images of the light beams are reduced over the diffraction limit thereof and simultaneously caused to be incident upon the optical recording medium driven by the recording medium driving controller, the noncontact information recording on the optical recording medium by which the information to be recorded is recorded on the recording tracks formed with minimum guard bands on the optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the optical recording medium is performed in the condition wherein the light beams arranged substantially in the common plane to be modulated in response to the modulation control signals based on the information to be recorded are incident upon the optical recording medium to form thereon the light spots arranged in a line, the information recorded on the optical recording medium can be reproduced relatively easily without performing complicated signal processing.

In the apparatus for recording information thus constituted in accordance with the invention claimed in claim 4 of the present application, the light beams modulated in response to the modulation control signals and arranged in accordance with the arrangement of the laser diodes in the one-dimensional diode array are obtained from the light source which comprises the one-dimension diode array constituted with the laser diodes arranged in a line and supplied with the modulation control signals from the modulation control signal generator. These light beams are focused by the optical system so that the geometric optical images of the light beams are obtained under the diffraction limit thereof and simultaneously caused to be incident upon the tape-shaped optical recording medium driven by the recording medium driving controller to form on the tape-shaped optical recording medium the light spots arranged in a line at the predetermined angle to the direction in which the tape-shaped optical recording medium runs and record the information to be recorded on the tape-shaped optical recording medium with the recording tracks formed thereon.

Since the light source which comprises the one-dimension diode array constituted with the laser diodes arranged in a line is used and the light beams which are modulated in response to the modulation control signals based on the information to be recorded are produced to be arranged in accordance with the arrangement of the laser diodes substantially in a common plane, focused so that the geometric optical images of the light beams are reduced over the diffraction limit thereof and simultaneously caused to be incident upon the tape-shaped optical recording medium driven by the recording medium driving controller to form on the tape-shaped optical recording medium the light spots arranged in a line at the predetermined angle to the direction in which the tape-shaped optical recording medium runs, the noncontact information recording on the tape-shaped optical recording medium by which the information to be recorded is recorded on the recording tracks formed with minimum guard bands on the tape-shaped optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the tape-shaped optical recording medium is performed in the condition wherein the light beams arranged substantially in the common plane to be modulated in response to the modulation control signals based on the information to be recorded are incident upon the tape-shaped optical recording medium to form thereon the light spots arranged in a line, the information recorded on the tape-shaped optical recording medium can be reproduced relatively easily without performing complicated signal processing.

In the apparatus for recording information thus constituted in accordance with the invention claimed in any one of claims 5 to 9 of the present application, the light beams which are modulated in response to the modulation control signals based on the information to be recorded and supplied from the modulation control signal generator at the light-modulating elements and arranged in accordance with the arrangement of the light-modulating elements are obtained from the one-dimensional light-modulator constituted with the light-modulating elements which are arranged in a line and upon which the light beams obtained from the light source which comprises the one-dimensional diode array constituted with the laser diodes arranged in a line are incident. These light beams are focused by the second optical system so that the geometric optical images of the light beams are reduced over the diffraction limit thereof and simultaneously caused to be incident upon the optical recording medium driven by the recording medium driving controller to record the information to be recorded on the optical recording medium with the recording tracks formed thereon.

Since the light source which comprises the one-dimension diode array constituted with the laser diodes arranged in a line and the one-dimensional light-modulator constituted with the light-modulating elements which are arranged in a line are used and the light beams which are modulated in response to the modulation control signals based on the information to be recorded are produced to be arranged in accordance with the arrangement of the light-modulating elements substantially in a common plane, focused so that the geometric optical images of the light beams are reduced over the diffraction limit thereof and simultaneously caused to be incident upon the optical recording medium driven by the recording medium driving controller, the noncontact information recording on the optical recording medium by which the information to be recorded is recorded on the recording tracks formed with minimum guard bands on the optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the optical recording medium is performed in the condition wherein the light beams arranged substantially in the common plane to be modulated in response to the modulation control signals based on the information to be recorded are incident upon the optical recording medium to form thereon the light spots arranged in a line, the information recorded on the optical recording medium can be reproduced relatively easily without performing complicated signal processing.

In the apparatus for recording information thus constituted in accordance with the invention claimed in any one of claims 10 to 12 of the present application, the light beams which are modulated in response to the modulation control signals based on the information to be recorded and supplied from the modulation control signal generator at the light-modulating elements and arranged in accordance with the arrangement of the light-modulating elements are obtained from the one-dimensional light-modulator constituted with the light-modulating elements which are arranged in a line and upon which the light beams obtained from the light source which comprises the one-dimensional diode array constituted with the laser diodes arranged in a line are incident. These light beams are focused by the second optical system so that the geometric optical images of the light beams are obtained under the diffraction limit thereof and simultaneously caused to be incident upon the tape-shaped optical recording medium driven by the recording medium driving controller to form on the tape-shaped optical record medium the light spots arranged in a line at the predetermined angle to the direction in which the tape-shaped optical record medium runs and record the information to be recorded on the tape-shaped optical recording medium with the recording tracks formed thereon.

Since the light source which comprises the one-dimension diode array constituted with the laser diodes arranged in a line and the one-dimensional light-modulator constituted with the light-modulating elements which are arranged in a line are used and the light beams which are modulated in response to the modulation control signals based on the information to be recorded are produced to be arranged in accordance with the arrangement of the light-modulating elements substantially in a common plane, focused so that the geometric optical images of the light beams are obtained under the diffraction limit thereof and simultaneously caused to be incident upon the tape-shaped optical recording medium driven by the recording medium driving controller to form on the tape-shaped optical record medium the light spots arranged in a line at the predetermined angle to the direction in which the tape-shaped optical record medium runs, the noncontact information recording on the optical recording medium by which the information to be recorded is recorded on the recording tracks formed with minimum guard bands on the tape-shaped optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the optical recording medium is performed in the condition wherein the light beams arranged substantially in the common plane to be modulated in response to the modulation control signals based on the information to be recorded are incident upon the tape-shaped optical recording medium to form thereon the light spots arranged in a line, the information recorded on the tape-shaped optical recording medium can be reproduced relatively easily without performing complicated signal processing.

In the apparatus for recording and reproducing information thus constituted in accordance with the invention claimed in claim 13 or 14 of the present application, the light beams modulated in response to the modulation control signals and arranged in accordance with the arrangement of the laser diodes in the one-dimensional diode array are obtained from the light source which comprises the one-dimension diode array constituted with the laser diodes arranged in a line and supplied with the modulation control signals from the modulation control signal generator. These light beams are focused by the first optical system so that the geometric optical images of the light beams are reduced over the diffraction limit thereof and simultaneously caused to be incident upon the optical recording medium driven by the recording medium driving controller to record the information to be recorded on the optical recording medium with the recording tracks formed thereon.

Further, the additional light beams obtained from the second light source are caused to be incident upon the optical recording medium driven by the recording medium driving controller so that the light beams modulated in response to the information recorded on the optical recording medium are obtained from the optical recording medium to be lead to the light detector. Then, the output signals varying in response to variations in the light beams modulated in response to the information recorded on the optical recording medium are obtained from the light detector and the information recorded on the optical recording medium is reproduced based on the output signals obtained from the light detector in the information reproducing portion.

Since the light source which comprises the one-dimension diode array constituted with the laser diodes arranged in a line is used and the light beams which are modulated in response to the modulation control signals based on the information to be recorded are produced to be arranged in accordance with the arrangement of the laser diodes substantially in a common plane, focused so that the geometric optical images of the light beams are reduced over the diffraction limit thereof and simultaneously caused to be incident upon the optical recording medium driven by the recording medium driving controller, the noncontact information recording on the optical recording medium by which the information to be recorded is recorded on the recording tracks formed with minimum guard bands on the optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the optical recording medium is performed in the condition wherein the light beams arranged substantially in the common plane to be modulated in response to the modulation control signals based on the information to be recorded are incident upon the optical recording medium to form thereon the light spots arranged in a line, the information recorded on the optical recording medium can be reproduced relatively easily without performing complicated signal processing, for example, with the additional light beams obtained from the second light source incident upon the optical recording medium driven by the recording medium driving controller, in the information reproducing portion.

In the apparatus for recording and reproducing information thus constituted in accordance with the invention claimed in claim 15 or 16 of the present application, the light beams modulated in response to the modulation control signals and arranged in accordance with the arrangement of the laser diodes in the one-dimensional diode array are obtained from the light source which comprises the one-dimension diode array constituted with the laser diodes arranged in a line and supplied with the modulation control signals from the modulation control signal generator. These light beams are focused by the first optical system so that the geometric optical images of the light beams are obtained under the diffraction limit thereof and simultaneously caused to be incident upon the tape-shaped optical recording medium driven by the recording medium driving controller to form on the tape-shaped optical record medium the light spots arranged in a line at the predetermined angle to the direction in which the tape-shaped optical record medium runs and record the information to be recorded on the tape-shaped optical recording medium with the recording tracks formed thereon.

Further, the additional light beams obtained from the second light source are caused to be incident upon the tape-shaped optical recording medium driven by the recording medium driving controller so that the light beams modulated in response to the information recorded on the tape-shaped optical recording medium are obtained from the tape-shaped optical recording medium to be lead to the light detector. Then, the output signals varying in response to variations in the light beams modulated in response to the information recorded on the tape-shaped optical recording medium are obtained from the light detector and the information recorded on the tape-shaped optical recording medium is reproduced based on the output signals obtained from the light detector in the information reproducing portion.

Since the light source which comprises the one-dimension diode array constituted with the laser diodes arranged in a line is used and the light beams which are modulated in response to the modulation control signals based on the information to be recorded are produced to be arranged in accordance with the arrangement of the laser diodes substantially in a common plane, focused so that the geometric optical images of the light beams are obtained under the diffraction limit thereof and simultaneously caused to be incident upon the tape-shaped optical recording medium driven by the recording medium driving controller to form on the tape-shaped optical record medium the light spots arranged in a line at the predetermined angle to the direction in which the tape-shaped optical record medium runs, the noncontact information recording on the optical recording medium by which the information to be recorded is recorded on the recording tracks formed with minimum guard bands on the tape-shaped optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the tape-shaped optical recording medium is performed in the condition wherein the light beams arranged substantially in the common plane to be modulated in response to the modulation control signals based on the information to be recorded are incident upon the tape-shaped optical recording medium to form thereon the light spots arranged in a line, the information recorded on the tape-shaped optical recording medium can be reproduced relatively easily without performing complicated signal processing, for example, with the additional light beams obtained from the second light source incident upon the tape-shaped optical recording medium driven by the recording medium driving controller, in the information reproducing portion.

In the apparatus for recording and reproducing information thus constituted in accordance with the invention claimed in claim 17 or 18 of the present application, the light beams which are modulated in response to the modulation control signals based on the information to be recorded and supplied from the modulation control signal generator at the light-modulating elements and arranged in accordance with the arrangement of the light-modulating elements are obtained from the one-dimensional light-modulator constituted with the light-modulating elements which are arranged in a line and upon which the light beams obtained from the light source which comprises the one-dimensional diode array constituted with the laser diodes arranged in a line are incident. These light beams are focused by the second optical system so that the geometric optical images of the light beams are reduced over the diffraction limit thereof and simultaneously caused to be incident upon the optical recording medium driven by the recording medium driving controller to record the information to be recorded on the optical recording medium with the recording tracks formed thereon.

Further, the additional light beams obtained from the second light source are caused to be incident upon the optical recording medium driven by the recording medium driving controller so that the light beams modulated in response to the information recorded on the optical recording medium are obtained from the optical recording medium to be lead to the light detector. Then, the output signals varying in response to variations in the light beams modulated in response to the information recorded on the optical recording medium are obtained from the light detector and the information recorded on the optical recording medium is reproduced based on the output signals obtained from the light detector in the information reproducing portion.

Since the first light source which comprises the one-dimension diode array constituted with the laser diodes arranged in a line and the one-dimensional light-modulator constituted with the light-modulating elements which are arranged in a line are used and the light beams which are modulated in response to the modulation control signals based on the information to be recorded are produced to be arranged in accordance with the arrangement of the light-modulating elements substantially in a common plane, focused so that the geometric optical images of the light beams are reduced over the diffraction limit thereof and simultaneously caused to be incident upon the optical recording medium driven by the recording medium driving controller, the noncontact information recording on the optical recording medium by which the information to be recorded is recorded on the recording tracks formed with minimum guard bands on the optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the optical recording medium is performed in the condition wherein the light beams arranged substantially in the common plane to be modulated in response to the modulation control signals based on the information to be recorded are incident upon the optical recording medium to form thereon the light spots arranged in a line, the information recorded on the optical recording medium can be reproduced relatively easily without performing complicated signal processing, for example, with the additional light beams obtained from the second light source incident upon the optical recording medium driven by the recording medium driving controller, in the information reproducing portion.

In the apparatus for recording and reproducing information thus constituted in accordance with the invention claimed in claim 19 or 20 of the present application, the light beams which are modulated in response to the modulation control signals based on the information to be recorded and supplied from the modulation control signal generator at the light-modulating elements and arranged in accordance with the arrangement of the light-modulating elements are obtained from the one-dimensional light-modulator constituted with the light-modulating elements which are arranged in a line and upon which the light beams obtained from the light source which comprises the one-dimensional diode array constituted with the laser diodes arranged in a line are incident. These light beams are focused by the second optical system so that the geometric optical images of the light beams are obtained under the diffraction limit thereof and simultaneously caused to be incident upon the tape-shaped optical recording medium driven by the recording medium driving controller to form on the tape-shaped optical recording medium the light spots arranged in a line at the predetermined angle to the direction in which the tape-shaped optical recording medium runs and record the information to be recorded on the tape-shaped optical recording medium with the recording tracks formed thereon.

Further, the additional light beams obtained from the second light source are caused to be incident upon the tape-shaped optical recording medium driven by the recording medium driving controller so that the light beams modulated in response to the information recorded on the tape-shaped optical recording medium are obtained from the tape-shaped optical recording medium to be lead to the light detector. Then, the output signals varying in response to variations in the light beams modulated in response to the information recorded on the tape-shaped optical recording medium are obtained from the light detector and the information recorded on the optical recording medium is reproduced based on the output signals obtained from the light detector in the information reproducing portion.

Since the first light source which comprises the one-dimension diode array constituted with the laser diodes arranged in a line and the one-dimensional light-modulator constituted with the light-modulating elements which are arranged in a line are used and the light beams which are modulated in response to the modulation control signals based on the information to be recorded are produced to be arranged in accordance with the arrangement of the light-modulating elements substantially in a common plane, focused so that the geometric optical images of the light beams are obtained under the diffraction limit thereof and simultaneously caused to be incident upon the tape-shaped optical recording medium driven by the recording medium driving controller to form on the tape-shaped optical recording medium the light spots arranged in a line at the predetermined angle to the direction in which the tape-shaped optical recording medium runs, the noncontact information recording on the optical recording medium by which the information to be recorded is recorded on the recording tracks formed with minimum guard bands on the tape-shaped optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the tape-shaped optical recording medium is performed in the condition wherein the light beams arranged substantially in the common plane to be modulated in response to the modulation control signals based on the information to be recorded are incident upon the tape-shaped optical recording medium to form thereon the light spots arranged in a line, the information recorded on the tape-shaped optical recording medium can be reproduced relatively easily without performing complicated signal processing, for example, with the additional light beams obtained from the second light source incident upon the tape-shaped optical recording medium driven by the recording medium driving controller, in the information reproducing portion.

In the apparatus for recording and reproducing information thus constituted in accordance with the invention claimed in any one of claims 21 to 25 of the present application, the recording of the information on and the reproduction of the information from the optical recording medium are carried out with the light source and the plural optical means used in common.

In the recording of the information on the optical recording medium, the light source which comprises the one-dimensional diode array constituted with the laser diodes arranged in a line is supplied with the modulation control signals based on the information to be recorded from the modulation control signal generator and thereby produces the light beams which are modulated in accordance with the modulation control signals and arranged in accordance with the arrangement of the laser diodes constituting the one-dimensional diode array. These light beams are focused by the first optical system so that the geometric optical images of the light beams are reduced over the diffraction limit thereof and simultaneously caused to be incident upon the optical recording medium driven by the recording medium driving controller to record the information to be recorded on the optical recording medium with the recording tracks formed thereon.

On the other hand, in the reproduction of the information from the optical recording medium, the light source is supplied with the predetermined modulation control signal from the modulation control signal generator and thereby produces the light beams which are not subjected to any modulation and arranged in accordance with the arrangement of the laser diodes constituting the one-dimensional diode array. These light beams are focused by the first optical system so that the geometric optical images of the light beams are reduced over the diffraction limit thereof and simultaneously caused to be incident upon the optical recording medium driven by the recording medium driving controller to produce the light beams modulated in response to the information recorded on the optical recording medium and departing from the optical recording medium to be led to the light detector. Then, the output signals varying in response to variations in the light beams modulated in response to the information recorded on the optical recording medium are obtained from the light detector and the information recorded on the optical recording medium is reproduced based on the output signals obtained from the light detector in the information reproducing portion.

Since the light source which comprises the one-dimension diode array constituted with the laser diodes arranged in a line is used and the light beams modulated in response to the modulation control signals based on the information to be recorded or not modulated in accordance with the predetermined modulation control signal are produced to be arranged in accordance with the arrangement of the light-modulating elements substantially in a common plane, focused so that the geometric optical images of the light beams are reduced over the diffraction limit thereof and simultaneously caused to be incident upon the optical recording medium driven by the recording medium driving controller, the noncontact information recording on the optical recording medium by which the information to be recorded is recorded on the recording tracks formed with minimum guard bands on the optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the optical recording medium is performed in the condition wherein the light beams arranged substantially in the common plane to be modulated in response to the modulation control signals based on the information to be recorded are incident upon the optical recording medium to form thereon the light spots arranged in a line, the information recorded on the optical recording medium can be reproduced relatively easily without performing complicated signal processing, with the light beams not modulated to be arranged substantially in the common plane and caused to be incident upon the optical recording medium driven by the recording medium driving controller, in the information reproducing portion.

In the apparatus for recording and reproducing information thus constituted in accordance with the invention claimed in any one of claims 26 to 28 of the present application, the recording of the information on and the reproduction of the information from the tape-shaped optical recording medium are carried out with the light source and the plural optical means used in common.

In the recording of the information on the tape-shaped optical recording medium, the light source which comprises the one-dimensional diode array constituted with the laser diodes arranged in a line is supplied with the modulation control signals based on the information to be recorded from the modulation control signal generator and thereby produces the light beams which are modulated in accordance with the modulation control signals and arranged in accordance with the arrangement of the laser diodes constituting the one-dimensional diode array. These light beams are focused by the first optical system so that the geometric optical images of the light beams are obtained under the diffraction limit thereof and simultaneously caused to be incident upon the tape-shaped optical recording medium driven by the recording medium driving controller to form on the tape-shaped optical recording medium the light spots arranged in a line at the predetermined angle to the direction in which the tape-shaped optical recording medium runs and record the information to be recorded on the tape-shaped optical recording medium with the recording tracks formed thereon.

On the other hand, in the reproduction of the information from the tape-shaped optical recording medium, the light source is supplied with the predetermined modulation control signal from the modulation control signal generator and thereby produces the light beams which are not subjected to any modulation and arranged in accordance with the arrangement of the laser diodes constituting the one-dimensional diode array. These light beams are focused by the first optical system so that the geometric optical images of the light beams are obtained under the diffraction limit thereof and simultaneously caused to be incident upon the tape-shaped optical recording medium driven by the recording medium driving controller to form on the tape-shaped optical recording medium the light spots arranged in a line at the predetermined angle to the direction in which the tape-shaped optical recording medium runs and produce the light beams modulated in response to the information recorded on the tape-shaped optical recording medium and departing from the tape-shaped optical recording medium to be led to the light detector. Then, the output signals varying in response to variations in the light beams modulated in response to the information recorded on the tape-shaped optical recording medium are obtained from the light detector and the information recorded on the tape-shaped optical recording medium is reproduced based on the output signals obtained from the light detector in the information reproducing portion.

Since the light source which comprises the one-dimension diode array constituted with the laser diodes arranged in a line is used and the light beams modulated in response to the modulation control signals based on the information to be recorded or not modulated in accordance with the predetermined modulation control signal are produced to be arranged in accordance with the arrangement of the light-modulating elements substantially in a common plane, focused so that the geometric optical images of the light beams are obtained under the diffraction limit thereof and simultaneously caused to be incident upon the tape-shaped optical recording medium driven by the recording medium driving controller to form on tape-shaped optical recording medium the light spots arranged in a line at the predetermined angle to the direction in which the tape-shaped optical recording medium runs, the noncontact information recording on the tape-shaped optical recording medium by which the information to be recorded is recorded on the recording tracks formed with minimum guard bands on the tape-shaped optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the tape-shaped optical recording medium is performed in the condition wherein the light beams arranged substantially in the common plane to be modulated in response to the modulation control signals based on the information to be recorded are incident upon the tape-shaped optical recording medium to form thereon the light spots arranged in a line, the information recorded on the tape-shaped optical recording medium can be reproduced relatively easily without performing complicated signal processing, with the light beams not modulated to be arranged substantially in the common plane and caused to be incident upon the tape-shaped optical recording medium driven by the recording medium driving controller, in the information reproducing portion.

In the apparatus for recording and reproducing information thus constituted in accordance with the invention claimed in any one of claims 29 to 33 of the present application, the recording of the information on and the reproduction of the information from the optical recording medium are carried out with the light source and the plural optical means used in common.

In the recording of the information on the optical recording medium, the light-modulating elements which are arranged in a line to constitute the one-dimensional light-modulator and upon which the light beams obtained from the light source which comprises the one-dimensional diode array constituted with the laser diodes arranged in a line are incident, are supplied with the modulation control signals based on the information to be recorded from the modulation control signal generator and thereby the light beams which have been modulated in response to the modulation control signals and arranged in accordance with the arrangement of the light-modulating elements are obtained from the one-dimensional light-modulator. These light beams are focused by the second optical system so that the geometric optical images of the light beams are reduced over the diffraction limit thereof and simultaneously caused to be incident upon the optical recording medium driven by the recording medium driving controller to record the information to be recorded on the optical recording medium with the recording tracks formed thereon.

On the other hand, in the reproduction of the information from the optical recording medium, the light-modulating elements in the one-dimensional light-modulator upon which the light beams obtained from the light source are incident, are supplied with the predetermined modulation control signal from the modulation control signal generator and thereby the light beams which have not been subjected to any modulation and arranged in accordance with the arrangement of the light-modulating elements are obtained from the one-dimensional light-modulator. These light beams are focused by the second optical system so that the geometric optical images of the light beams are reduced over the diffraction limit thereof and simultaneously caused to be incident upon the optical recording medium driven by the recording medium driving controller to produce the light beams modulated in response to the information recorded on the optical recording medium and departing from the optical recording medium to be led to the light detector. Then, the output signals varying in response to variations in the light beams modulated in response to the information recorded on the optical recording medium are obtained from the light detector and the information recorded on the optical recording medium is reproduced based on the output signals obtained from the light detector in the information reproducing portion.

Since the light source which comprises the one-dimension diode array constituted with the laser diodes arranged in a line and the one-dimensional light-modulator constituted with the light-modulating elements arranged in a line are used, and the light beams modulated in response to the modulation control signals based on the information to be recorded or not modulated in accordance with the predetermined modulation control signal are produced to be arranged in accordance with the arrangement of the light-modulating elements substantially in a common plane in the one-dimensional light-modulator, focused so that the geometric optical images of the light beams are reduced over the diffraction limit thereof and simultaneously caused to be incident upon the optical recording medium driven by the recording medium driving controller, the noncontact information recording on the optical recording medium by which the information to be recorded is recorded on the recording tracks formed with minimum guard bands on the optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the optical recording medium is performed in the condition wherein the light beams arranged substantially in the common plane to be modulated in response to the modulation control signals based on the information to be recorded are incident upon the optical recording medium to form thereon the light spots arranged in a line, the information recorded on the optical recording medium can be reproduced relatively easily without performing complicated signal processing, with the light beams not modulated to be arranged substantially in the common plane and caused to be incident upon the optical recording medium driven by the recording medium driving controller, in the information reproducing portion.

In the apparatus for recording and reproducing information thus constituted in accordance with the invention claimed in any one of claims 34 to 36 of the present application, the recording of the information on and the reproduction of the information from the tape-shaped optical recording medium are carried out with the light source and the plural optical means used in common.

In the recording of the information on the tape-shaped optical recording medium, the light-modulating elements which are arranged in a line to constitute the one-dimensional light-modulator and upon which the light beams obtained from the light source which comprises the one-dimensional diode array constituted with the laser diodes arranged in a line are incident, are supplied with the modulation control signals based on the information to be recorded from the modulation control signal generator and thereby the light beams which have been modulated in response to the modulation control signals and arranged in accordance with the arrangement of the light-modulating elements are obtained from the one-dimensional light-modulator. These light beams are focused by the second optical system so that the geometric optical images of the light beams are obtained under the diffraction limit thereof and simultaneously caused to be incident upon the tape-shaped optical recording medium driven by the recording medium driving controller to form on the tape-shaped optical recording medium the light spots arranged in a line at the predetermined angle to the direction in which the tape-shaped optical recording medium runs and record the information to be recorded on the tape-shaped optical recording medium with the recording tracks formed thereon.

On the other hand, in the reproduction of the information from the tape-shaped optical recording medium, the light-modulating elements in the one-dimensional light-modulator upon which the light beams obtained from the light source are incident, are supplied with the predetermined modulation control signal from the modulation control signal generator and thereby the light beams which have not been subjected to any modulation and arranged in accordance with the arrangement of the light-modulating elements are obtained from the one-dimensional light-modulator. These light beams are focused by the second optical system so that the geometric optical images of the light beams are obtained under the diffraction limit thereof and simultaneously caused to be incident upon the tape-shaped optical recording medium driven by the recording medium driving controller to form on the tape-shaped optical recording medium the light spots arranged in a line at the predetermined angle to the direction in which the tape-shaped optical recording medium runs and produce the light beams modulated in response to the information recorded on the tape-shaped optical recording medium and departing from the tape-shaped optical recording medium to be led to the light detector. Then, the output signals varying in response to variations in the light beams modulated in response to the information recorded on the tape-shaped optical recording medium are obtained from the light detector and the information recorded on the tape-shaped optical recording medium is reproduced based on the output signals obtained from the light detector in the information reproducing portion.

Since the light source which comprises the one-dimension diode array constituted with the laser diodes arranged in a line and the one-dimensional light-modulator constituted with the light-modulating elements arranged in a line are used, and the light beams modulated in response to the modulation control signals based on the information to be recorded or not modulated in accordance with the predetermined modulation control signal are produced to be arranged in accordance with the arrangement of the light-modulating elements substantially in a common plane in the one-dimensional light-modulator, focused so that the geometric optical images of the light beams are obtained under the diffraction limit thereof and simultaneously caused to be incident upon the tape-shaped optical recording medium driven by the recording medium driving controller to form on the tape-shaped optical recording medium the light spots arranged in a line at the predetermined angle to the direction in which the tape-shaped optical recording medium runs, the noncontact information recording on the tape-shaped optical recording medium by which the information to be recorded is recorded on the recording tracks formed with minimum guard bands on the tape-shaped optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the tape-shaped optical recording medium is performed in the condition wherein the light beams arranged substantially in the common plane to be modulated in response to the modulation control signals based on the information to be recorded are incident upon the tape-shaped optical recording medium to form thereon the light spots arranged in a line, the information recorded on the tape-shaped optical recording medium can be reproduced relatively easily without performing complicated signal processing, with the light beams not modulated to be arranged substantially in the common plane and caused to be incident upon the tape-shaped optical recording medium driven by the recording medium driving controller, in the information reproducing portion.

EMNODIMENTS MOST PREFERABLE FOR WORKING OF THE INVENTION

Figure 1:
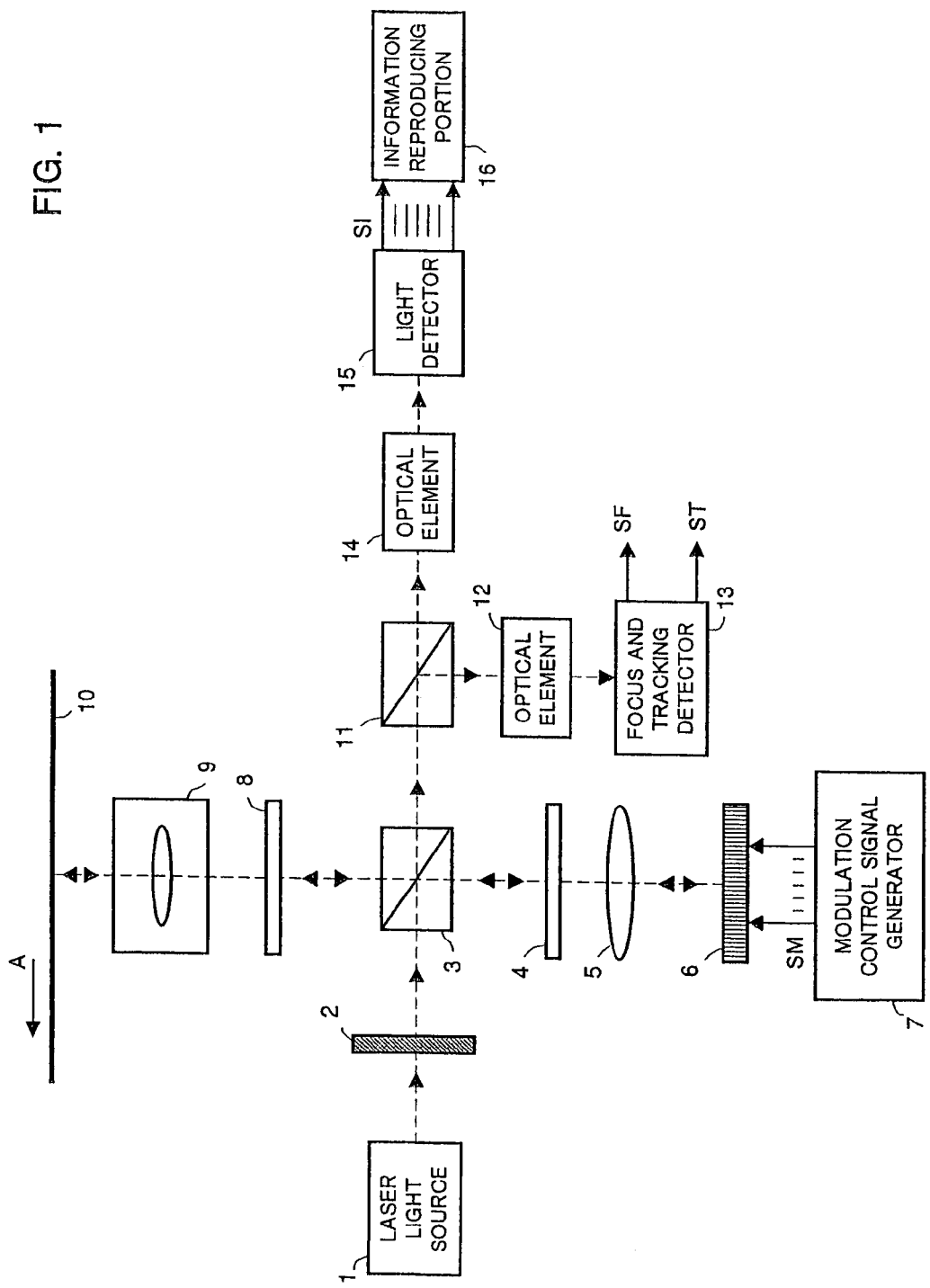
FIG. 1 is a schematic block diagram showing an essential part of an example of an optical tape recording and reproducing apparatus proposed previously.
Figure 2:
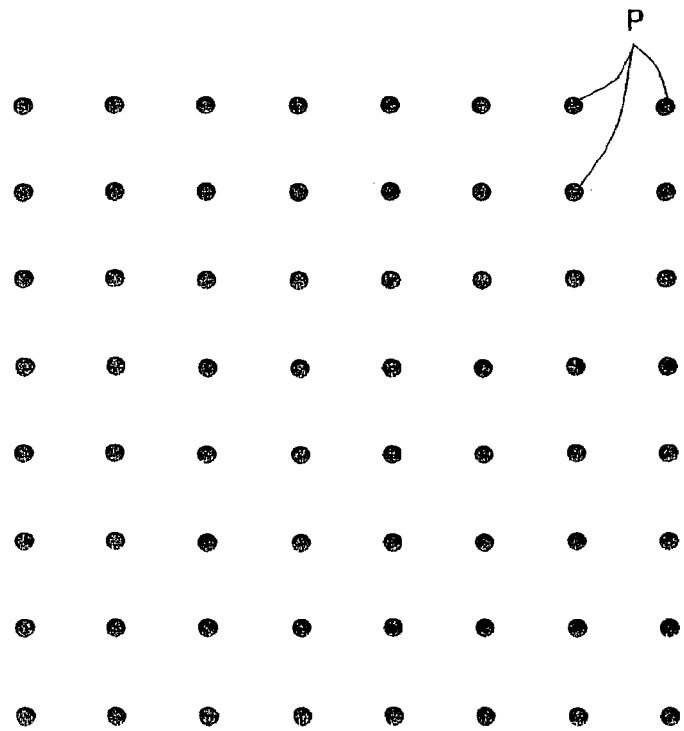
FIG. 2 is a schematic illustration used for explaining a two-dimensional light-modulator used in the optical tape recording and reproducing apparatus shown in FIG. 1.
Figure 3:
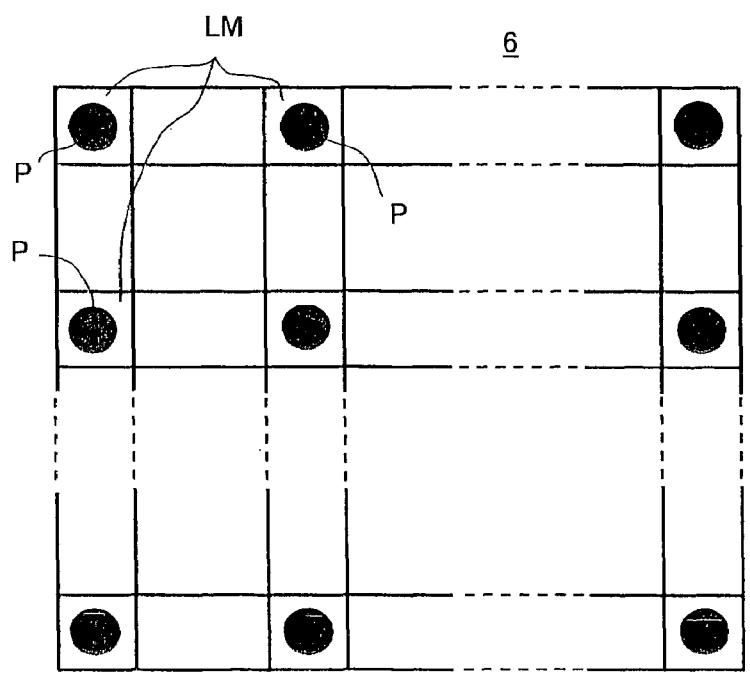
FIG. 3 is a schematic illustration used for explaining the two-dimensional light-modulator used in the optical tape recording and reproducing apparatus shown in FIG. 1.
Figure 4:
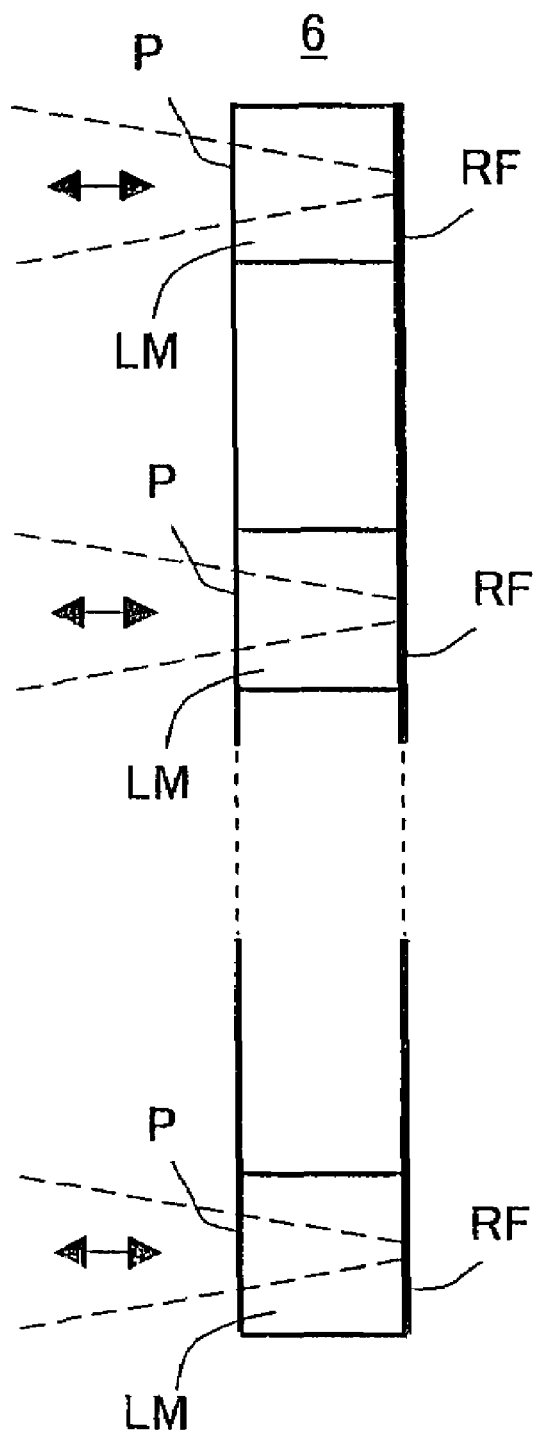
FIG. 4 is a schematic illustration used for explaining the two-dimensional light-modulator used in the optical tape recording and reproducing apparatus shown in FIG. 1.
Figure 5:
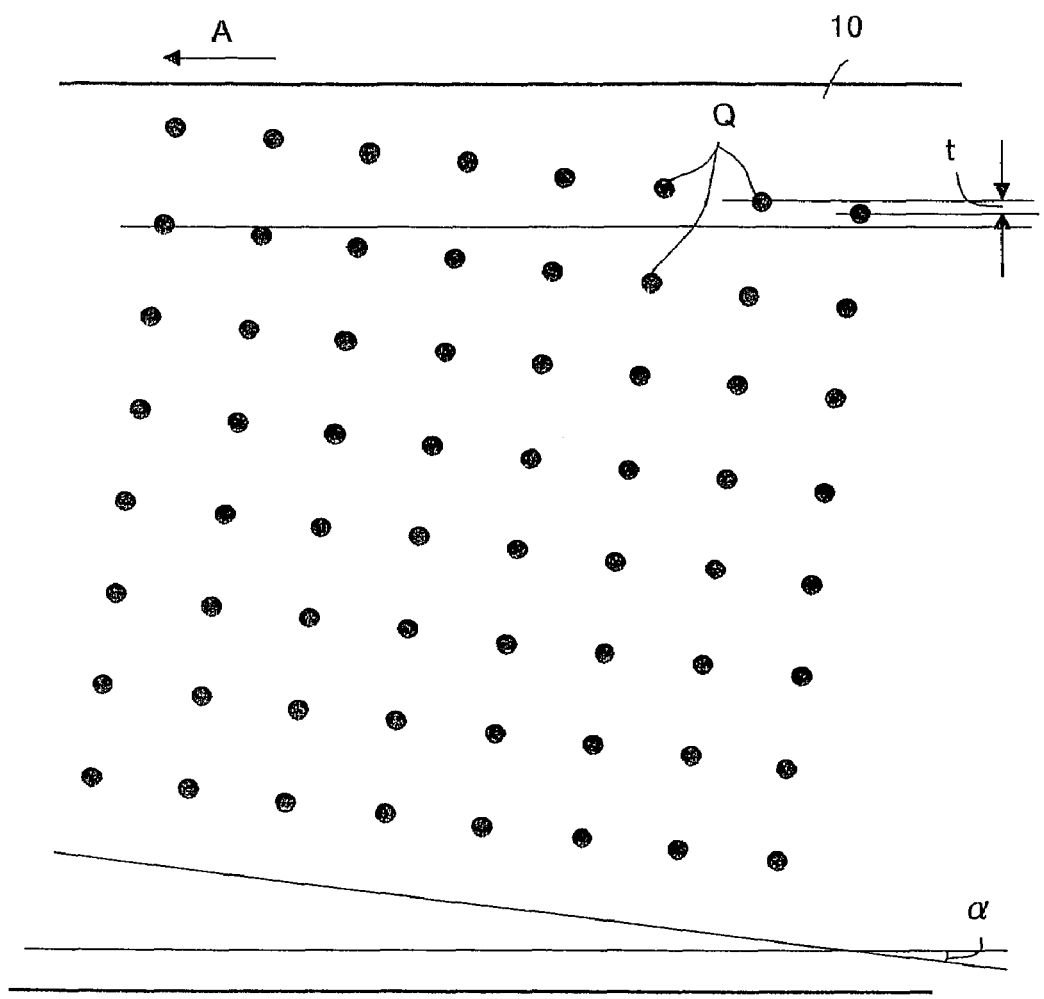
FIG. 5 is a schematic illustration used for explaining the information recording on an optical tape conducted by the optical tape recording and reproducing apparatus shown in FIG. 1.
Figure 6:
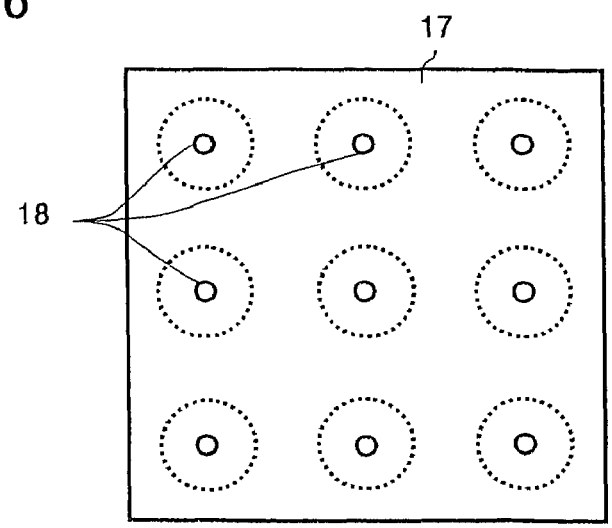
FIG. 6 is a schematic illustration showing a two-dimensional diode array used in another example of an optical tape recording and reproducing apparatus proposed previously.
Figure 7:
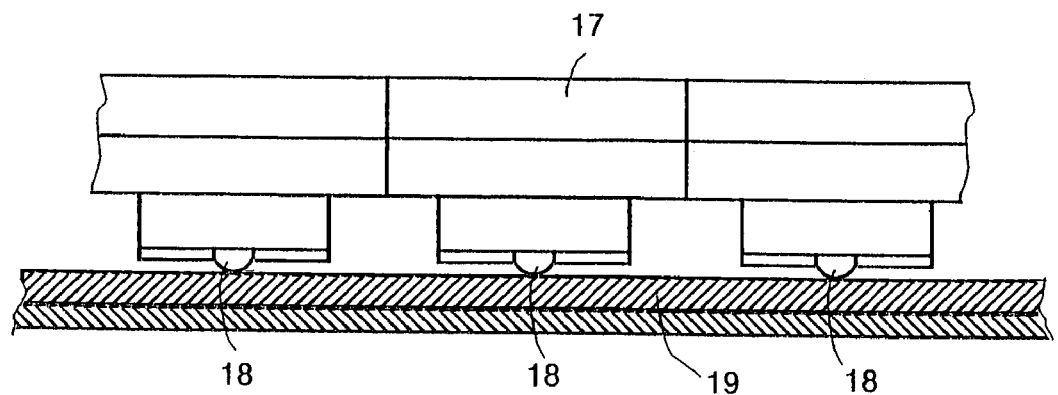
FIG. 7 is a schematic illustration used for explaining the information recording on an optical tape conducted by the optical tape recording and reproducing apparatus proposed previously in which the two-dimensional diode array shown in FIG. 6 is used.
Figure 8:
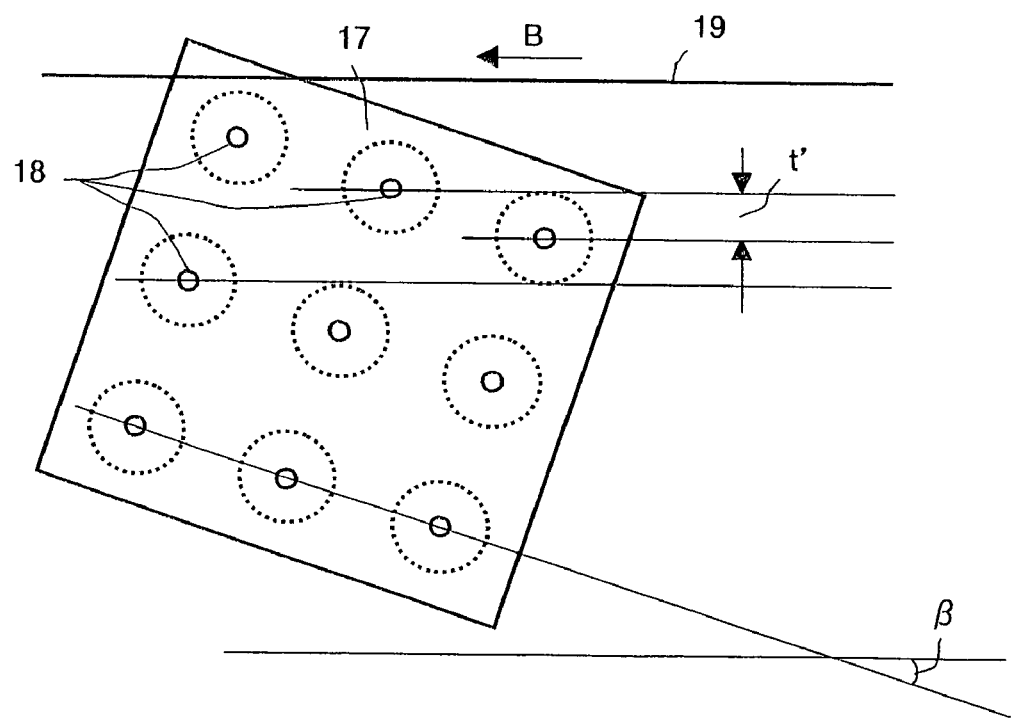
FIG. 8 is a schematic illustration used for explaining the information recording on an optical tape conducted by the optical tape recording and reproducing apparatus proposed previously in which the two-dimensional diode array shown in FIG. 6 is used.
Figure 9:
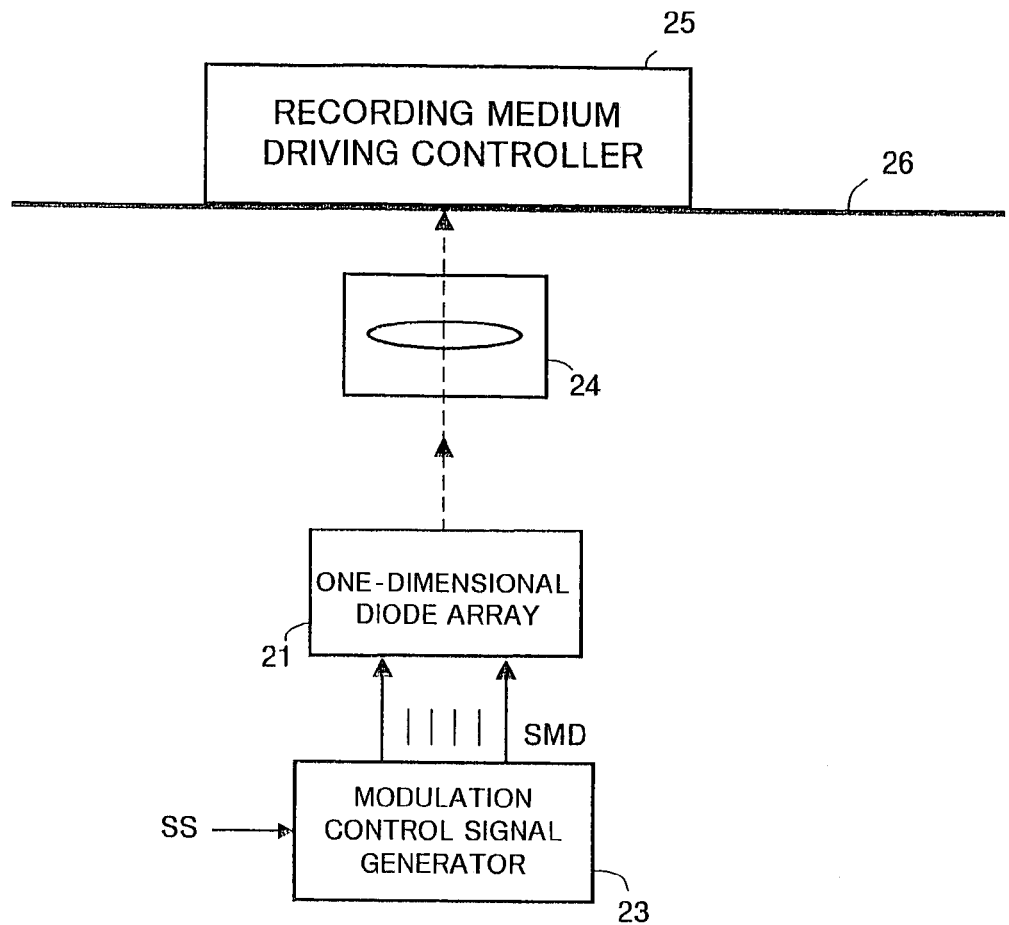
FIG. 9 is a schematic block diagram showing an essential part of an embodiment of apparatus for recording information according to the invention claimed in any one of claims 1 to 4 of the present application.

FIG. 9 shows an essential part of an embodiment of apparatus for recording information according to the invention claimed in any one of claims 1 to 4 of the present application.

In the embodiment shown in FIG. 9, a tape-shaped optical recording medium, that is, an optical tape is used as an optical recording medium and information is recorded on the optical tape.

Figure 10:
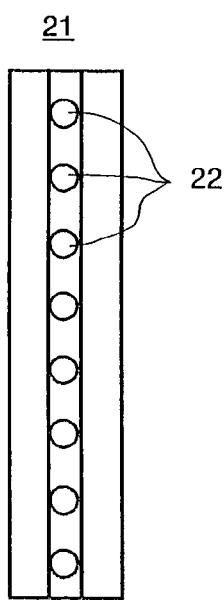
FIG. 10 is a schematic illustration showing a structural example of a one-dimensional diode array used in the embodiment shown in FIG. 9.

The embodiment shown in FIG. 9 is provided with a one-dimensional diode array 21 which constitutes a light source for emitting continuously a plurality of laser light beams. This one-dimensional diode array 21 is constituted with, for example, a plurality of laser diodes 22 arranged in a line as shown in FIG. 10 and each of the laser diodes 22 is operative to emit a laser light beam. Accordingly, a plurality of laser light beams arranged substantially in a common plane in accordance with the linear arrangement of the laser diodes 22 are obtained from the one-dimensional diode array 21.

A modulation control signal generator 23 is provided in relation to the one-dimensional diode array 21. The modulation control signal generator 23 is supplied with a recording signal SS which represents information to be recorded and produces modulation control signals SMD based on the information to be recorded in response to the recording signal SS. The modulation control signals SMD obtained from the modulation control signal generator 23 are supplied respectively to the laser diodes 22 constituting the one-dimensional diode array 21. Thereby, the laser light beam emitted from each of the laser diodes 22 is varied in its intensity in response to the modulation control signal SMD, that is, modulated in response to the modulation control signal SMD.

As a result, the laser light beams which have been modulated in response to the modulation control signals SMD based on the information to be recorded (the modulated laser light beams) are obtained from the one-dimensional diode array 21, in which the laser diodes 22 are supplied with the modulation control signals SMD obtained from the modulation control signal generator 23, so as to be arranged substantially in the common plane in accordance with the linear arrangement of the laser diodes 22.

The modulated laser light beams obtained from the one-dimensional diode array 21 pass through an optical system 24 operative to perform a light beam control to be incident upon an optical tape 26 which is an optical recording medium driven to run by a recording medium driving controller 25.

The optical system 24 converges each of the modulated laser light beams arranged substantially in the common plane and obtained from the one-dimensional diode array 21 to be reduced in its beam diameter and incident upon the optical tape 26. Further, the optical system 24 performs a focus control by which each of the modulated laser light beams incident upon the optical tape 26 is appropriately focused on the optical tape 26 and a tracking control by which each of the modulated laser light beams incident upon the optical tape 26 is appropriately positioned on the optical tape 26. Then, the recording of the information to be recorded is carried out on the optical tape 26 with the modulated laser light beams.

On the occasion of the recording of the information to be recorded with the modulated laser light beams, a plurality of parallel recording tracks are formed on the optical tape 26 to correspond respectively to the modulated laser light beams incident upon the optical tape 26 and extend in a direction in which the optical tape 26 runs. An information recording pattern corresponding to the modulation state of each of the modulated laser light beams is provided on each of the recording tracks.

Figure 11:
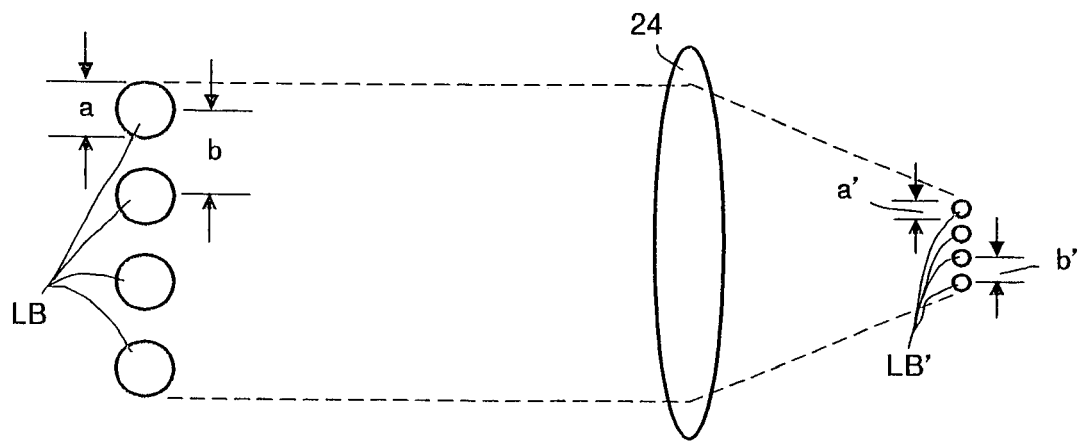
FIG. 11 is a schematic illustration used for explaining an optical system employed in the embodiment shown in FIG. 9.

When the recording of the information to be recorded on the optical tape 26 is carried out with the modulated laser light beams, it is thinkable that the optical system 24 focuses modulated laser light beams LB which are obtained from the one-dimensional diode array 21 so that geometric optical images of the modulated laser light beams LB are reduced not to reach to the diffraction limit thereof, as shown in FIG. 11 wherein four modulated laser light beams LB are shown, for example, and causes the modulated laser light beams LB to be incident upon the optical tape 26 as modulated laser light beams LB'.

In such a case, assuming that a beam diameter of each of the modulated laser light beams LB is $a$, a beam space between each adjacent two of the modulated laser light beams LB is $b$, a beam diameter of each of the modulated laser light beams LB' is a', and a beam space between each adjacent two of the modulated laser light beams LB' is b', the following equation [Math. 1] is satisfied because the modulated laser light beams LB are focused so that the geometric optical images of the modulated laser light beams LB are reduced not to reach to the diffraction limit thereof.

$$a'/b' = a/b \quad \text{[Math. 1]}$$

This means that the modulated laser light beams LB are focused analogously with the modulated laser light beams LB' so that the beam space b' is set to correspond to the beam diameter a' which is reduced in comparison with the beam diameter $\underline{a}$.

Figure 12:
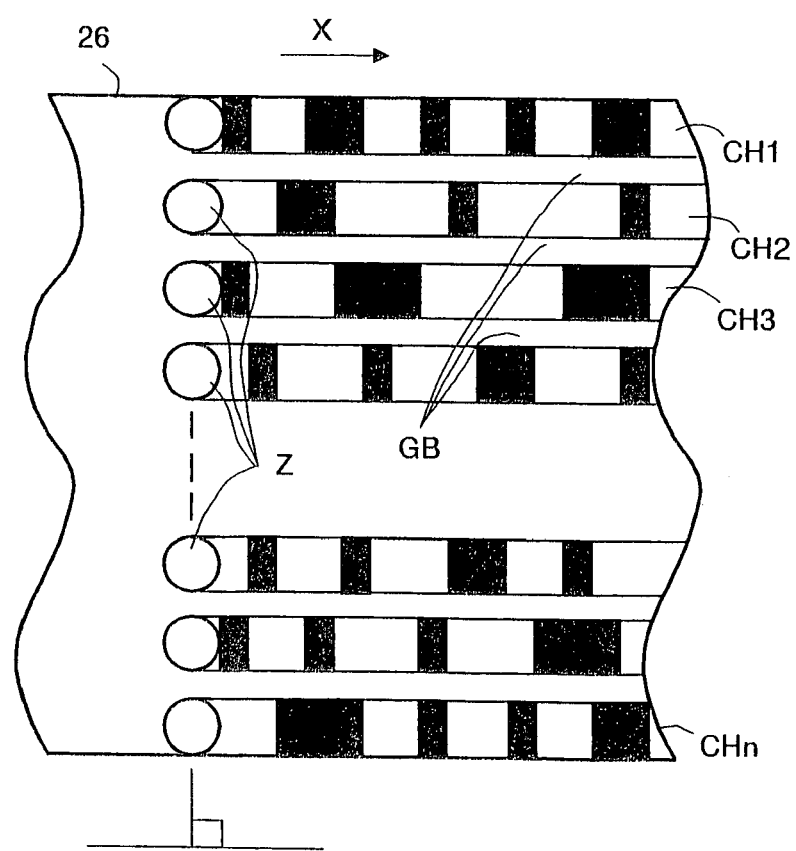
FIG. 12 is a schematic illustration used for explaining the information recording on an optical tape conducted by the embodiment shown in FIG. 9.

Under such a situation, when the modulated laser light beams LB' are incident upon the optical tape 26 to form on the optical tape 26 the light spots arranged in a line at the rectangular angle to the direction in which the optical tape 26 runs, recording tracks CH1, CH2, CH3, . . . , CHn as shown in FIG. 12, are formed on the optical tape 26 with guard bands GB, each of which is larger than a predetermined minimum guard band. In FIG. 12, X represents the direction in which the optical tape 26 runs and Z shows each of light beam spots formed on the optical tape 26 by the modulated laser light beams LB'.

The fact that the recording tracks are formed on the optical tracks with the guard bands, each of which is larger than the predetermined minimum guard band, results in that the coefficient of utilization of the optical tape 26 is deteriorated and a high density recording of the information to be recorded on the optical tape 26 is impeded. Accordingly, it is desired that the recording tracks formed on the optical tape 26 are provided with the predetermined minimum guard bands.

Figure 13:
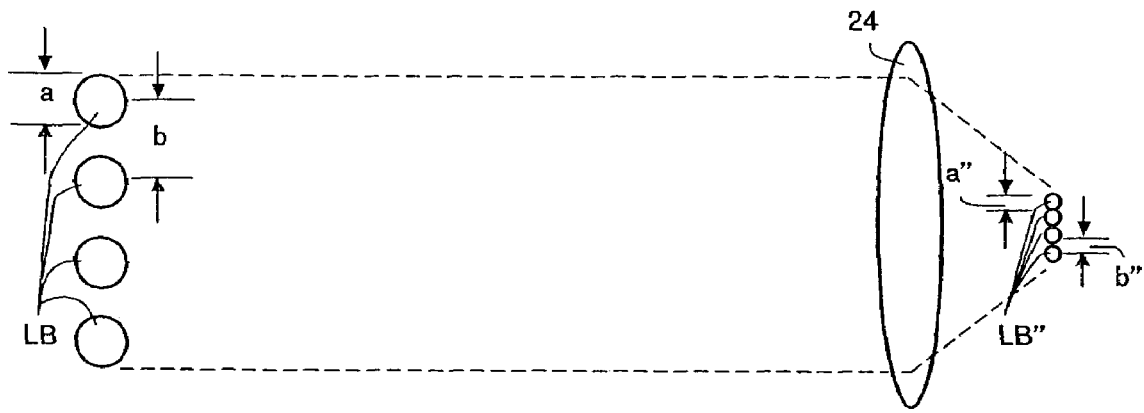
FIG. 13 is a schematic illustration used for explaining an optical system employed in the embodiment shown in FIG. 9.

Consequently, in the embodiment shown in FIG. 9, when the recording of the information to be recorded on the optical tape 26 is carried out with the modulated laser light beams, in fact, the optical system 24 focuses the modulated laser light beams LB which are obtained from the one-dimensional diode array 21 so that the geometric optical images of the modulated laser light beams LB are reduced over the diffraction limit thereof and simultaneously causes the modulated laser light beams LB to be incident upon the optical tape 26 as modulated laser light beams LB", as shown in FIG. 13 wherein four modulated laser light beams LB are shown also, for example.

In this case, assuming that a beam diameter of each of the modulated laser light beams LB is $\underline{a}$, a beam space between each adjacent two of the modulated laser light beams LB is $\underline{b}$, a beam diameter of each of the modulated laser light beams LB" is a", and a beam space between each adjacent two of the modulated laser light beams LB" is b", the following equation [Math. 2] is satisfied under the condition wherein the modulated laser light beams LB are focused so that the geometric optical images of the modulated laser light beams LB are reduced over the diffraction limit thereof.

$$a''/b'' < b/a \quad \text{[Math. 2]}$$

This means that a beam space (b"−a") between each adjacent two of the modulated laser light beams LB" can be reduced to be substantially zero under the condition wherein a" is a finite value.

Figure 14:
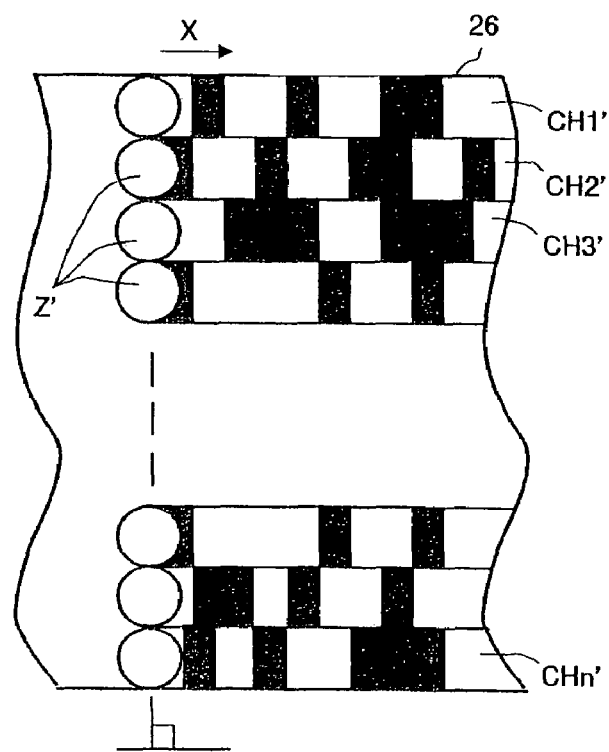
FIG. 14 is a schematic illustration used for explaining the information recording on an optical tape conducted by the embodiment shown in FIG. 9.

In the case where the beam space (b"−a") between each adjacent two of the modulated laser light beams LB" is reduced to be substantially zero, the modulated laser light beams LB" are incident upon the optical tape 26 to form on the optical tape 26 the light spots arranged in a line at a right angle to the direction in which the optical tape 26 runs and recording tracks CH1', CH2', CH3', . . . , CHn', as shown in FIG. 14, are formed on the optical tape 26 with the predetermined minimum (substantially zero) guard bands by the modulated laser light beams LB". In FIG. 14, X represents the direction in which the optical tape 26 runs and Z' shows each of light beam spots formed on the optical tape 26 by the modulated laser light beams LB".

Since the optical system 24 focuses the modulated laser light beams obtained from the one-dimensional diode array 21 so that the geometric optical images of the modulated laser light beams are reduced over the diffraction limit thereof and causes the focused modulated laser light beams to be incident upon the-optical tape 26 in such a manner as mentioned above, the recording tracks are formed on the optical tape 26 with the predetermined minimum guard band between each adjacent two of them.

Figure 15:
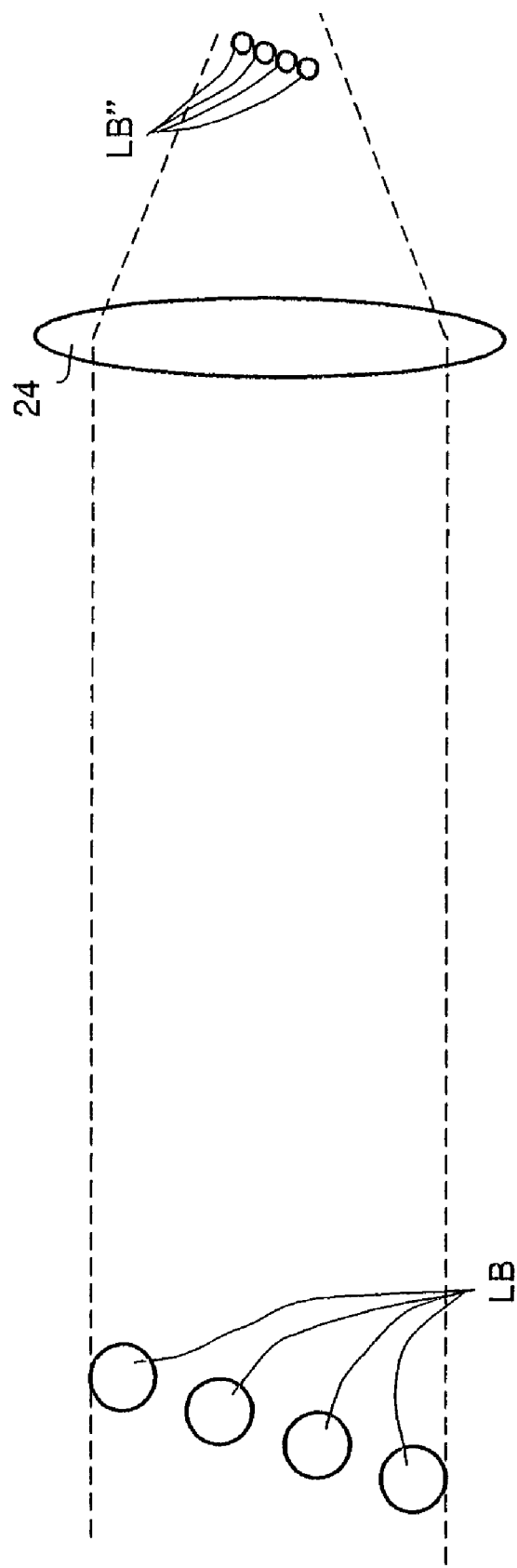
FIG. 15 is a schematic illustration used for explaining an optical system employed in the embodiment shown in FIG. 9.
Figure 16:
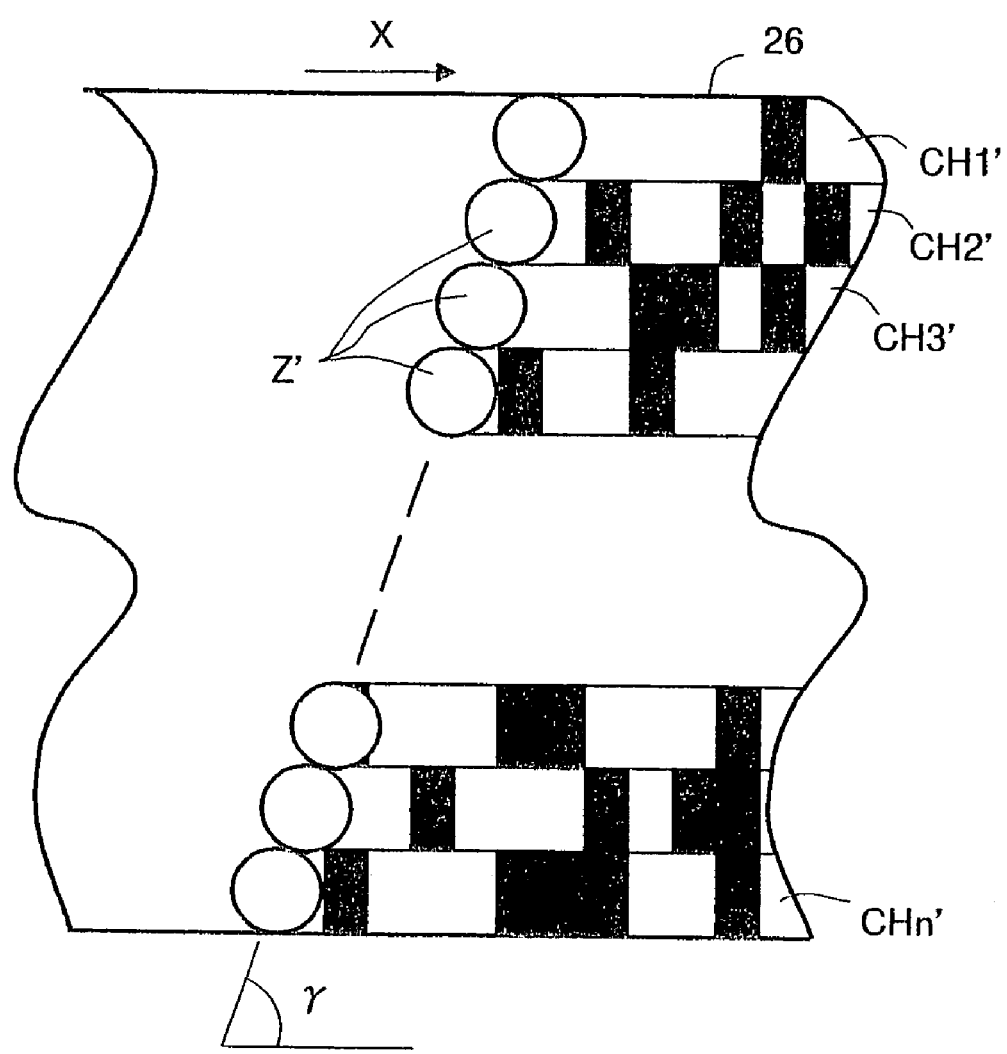
FIG. 16 is a schematic illustration used for explaining the information recording on an optical tape conducted by the embodiment shown in FIG. 9.

Although the recording tracks CH1', CH2', CH3', . . . , CHn' shown in FIG. 14 by way of example are formed on the optical tape 26 under the condition wherein the focused modulated laser light beams LB" are incident upon the optical tape 26 to form the light spots arranged in a line at a right angle to the direction X in which the optical tape 26 runs, it is also thinkable that the optical system 24 causes the focused modulated laser light beams LB" to be incident upon the optical tape 26 to form the light spots arranged in a line at a predetermined angle other than a right angle to the direction X in which the optical tape 26 runs, as shown in FIG. 15. In such a case, a plurality of light spots Z' formed on the optical tape 26 by the focused modulated laser light beams LB" are arranged in a line at an angle of γ to the direction X in which the optical tape 26 runs, as shown in FIG. 16. In FIG. 16, the distance between the centers of each adjacent two of the laser spots Z' in the direction perpendicular to the direction X in which the optical tape 26 runs is decreased compared with that in the case wherein the focused modulated laser light beams LB" are incident upon the optical tape 26 to form the light spots arranged in a line at the right angle to the direction X in which the optical tape 26 runs and this is advantageous for forming the recording tracks on the optical tape 26 with the predetermined minimum guard band between each adjacent two of them.

Further, when the recording of the information to be recorded on the optical tape 26 is carried out with the modulated laser light beams, the optical system 24 can be operative to focus the modulated laser light beams LB which are obtained from the one-dimensional diode array 21 in a manner different from the above mentioned manner in which the modulated laser light beams LB are focused so that the geometric optical images of the modulated laser light beams LB are reduced over the diffraction limit thereof and caused to be incident upon the optical tape 26.

Figure 17:
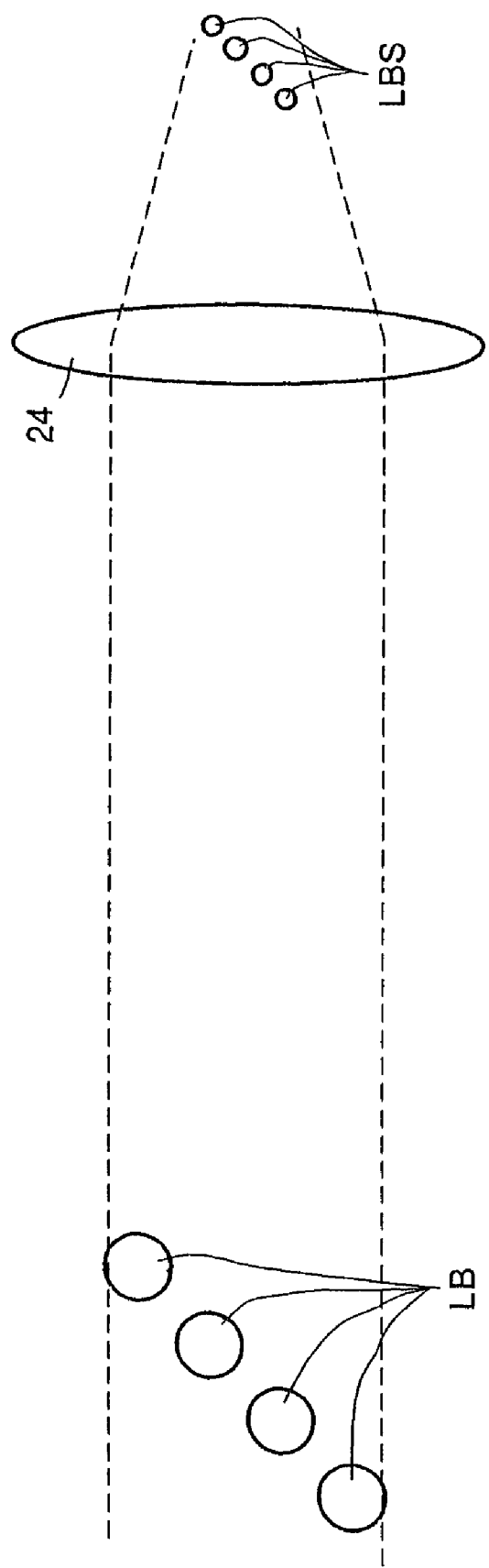
FIG. 17 is a schematic illustration used for explaining an optical system employed in the embodiment shown in FIG. 9.

When the optical system 24 focuses the modulated laser light beams LB in such a manner, the modulated laser light beams LB which are obtained from the one-dimensional diode array 21 are focused so that the geometric optical images of the modulated laser light beams LB are obtained under the diffraction limit thereof and simultaneously caused to be incident upon the optical tape 26 as modulated laser light beams LBS, as shown in FIG. 17 wherein four modulated laser light beams LB are shown, for example. In this case, the optical system 24 causes the modulated laser light beams LBS to be incident upon the optical tape 26 to form on the optical tape 26 a plurality of light spots arranged in a line at a predetermined angle other than 90 degrees or 180 degrees to the direction in which the optical tape 26 runs.

Figure 18:
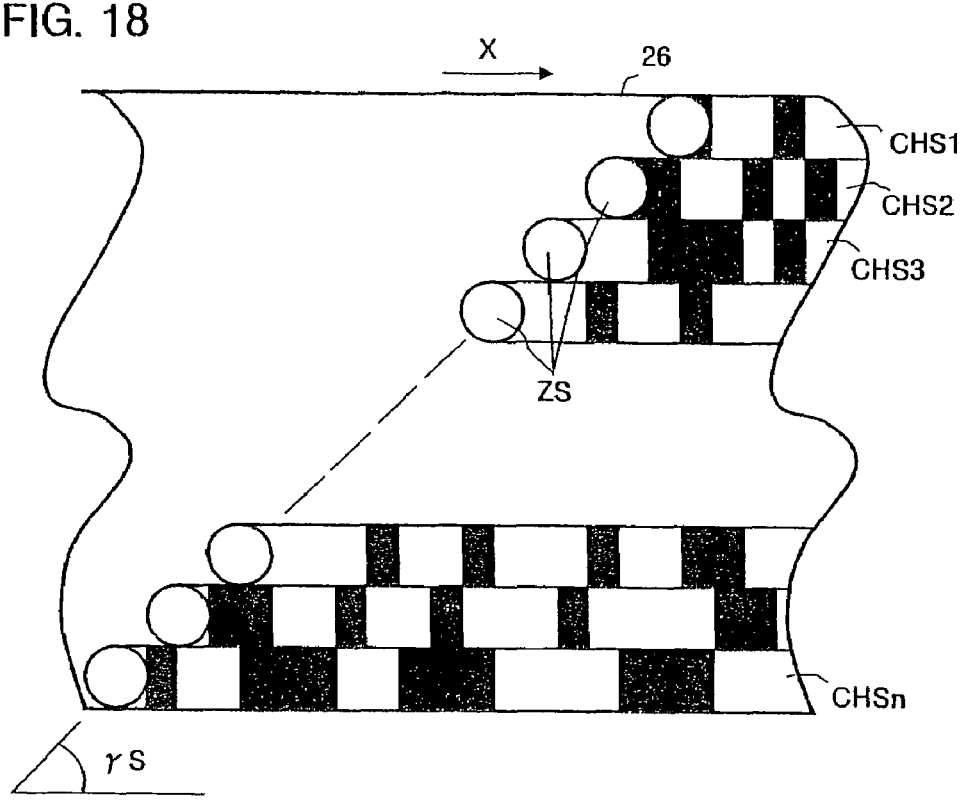
FIG. 18 is a schematic illustration used for explaining the information recording on an optical tape conducted by the embodiment shown in FIG. 9.

Therefore, a plurality of light spots ZS are formed on the optical tape 26 by the focused modulated laser light beams LBS to be arranged in a line at an angle of γs other than 90 degrees or 180 degrees to the direction X in which the optical tape 26 runs, as shown in FIG. 18. The angle of γs is so selected that the distance between the centers of each adjacent two of the light spots ZS in the direction perpendicular to the direction X in which the optical tape 26 runs is equal to the diameter of each of the light spots ZS and thereby recording tracks CHS1, CHS2, CHS3, . . . , CHSn are formed on the optical tape 26 with the predetermined minimum (substantially zero) guard bands by the focused modulated laser light beams LBS.

This means that the recording tracks with the predetermined minimum (substantially zero) guard bands can be formed on the optical tape 26 also under the condition wherein the optical system 24 causes the modulated laser light beams which are obtained from the one-dimensional diode array 21 so that the geometric optical images of the modulated laser light beams are obtained under the diffraction limit thereof and simultaneously causes the focused modulated laser light beams to be incident upon the optical tape 26 so as to form on the optical tape 26 the light spots arranged in a line at the predetermined angle other than 90 degrees or 180 degrees to the direction in which the optical tape 26 runs.

With the embodiment of apparatus for recording information shown in FIG. 9, a noncontact information recording on the optical tape 26 by which the information is recorded on the recording tracks formed with the predetermined minimum guard bands on the optical tape 26 can be carried out, difficulties in determining and maintaining a position of the optical system 24 can be reduced and the coefficient of utilization of the light beams can be improved.

Figure 19:
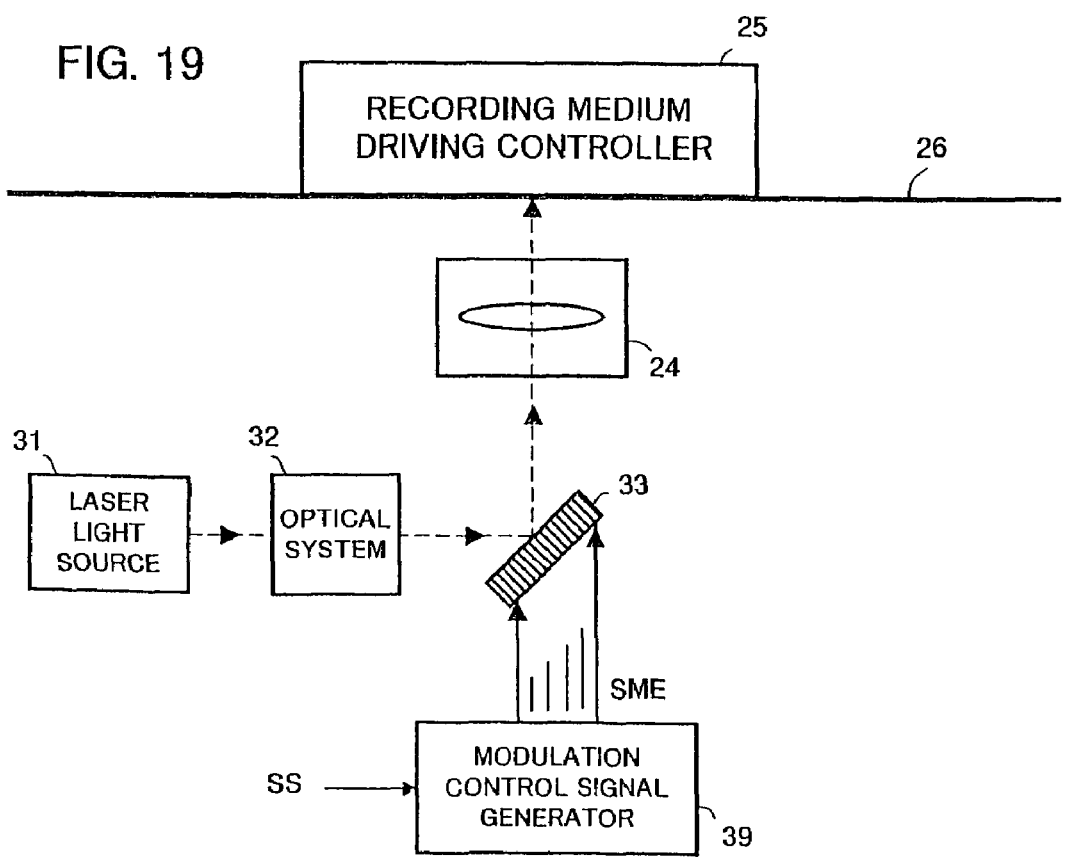
FIG. 19 is a schematic block diagram showing an essential part of an embodiment of apparatus for recording information according to the invention claimed in any one of claims 5 to 12 of the present application.

FIG. 19 shows an essential part of an embodiment of apparatus for recording information according to the invention claimed in any one of claims 5 to 12 of the present application.

In the embodiment shown in FIG. 19, a tape-shaped optical recording medium, that is, an optical tape is used as an optical recording medium and information is recorded on the optical tape.

The embodiment shown in FIG. 18 is provided with a laser light source 31 which constitutes a light source for emitting continuously a plurality of laser light beams. The laser light beams obtained from the laser light source 31 are caused by an optical system 32 comprising a plurality of optical elements such as lenses to enter into a one-dimensional light-modulator 33.

Figure 20:
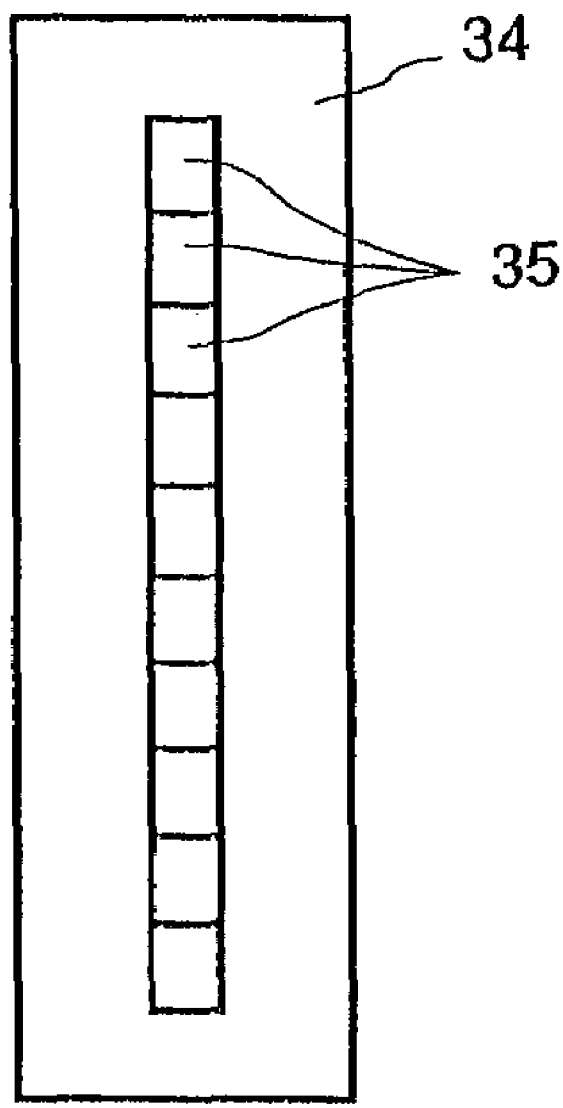
FIG. 20 is a schematic illustration showing a structural example of a one-dimensional diode array used in the embodiment shown in FIG. 19.

The one-dimensional light-modulator 33 is constituted with a plurality of reflection type light-modulating elements 35 which are arranged in a line substantially without a space between each adjacent two on a plane supporting member 34, as shown in FIG. 20. Each of the reflection type light-modulating elements 35 is operative to modulate a light beam incident thereupon in response to a modulation control signal supplied thereto from the outside and reflect the modulated light beam.

Figure 21:
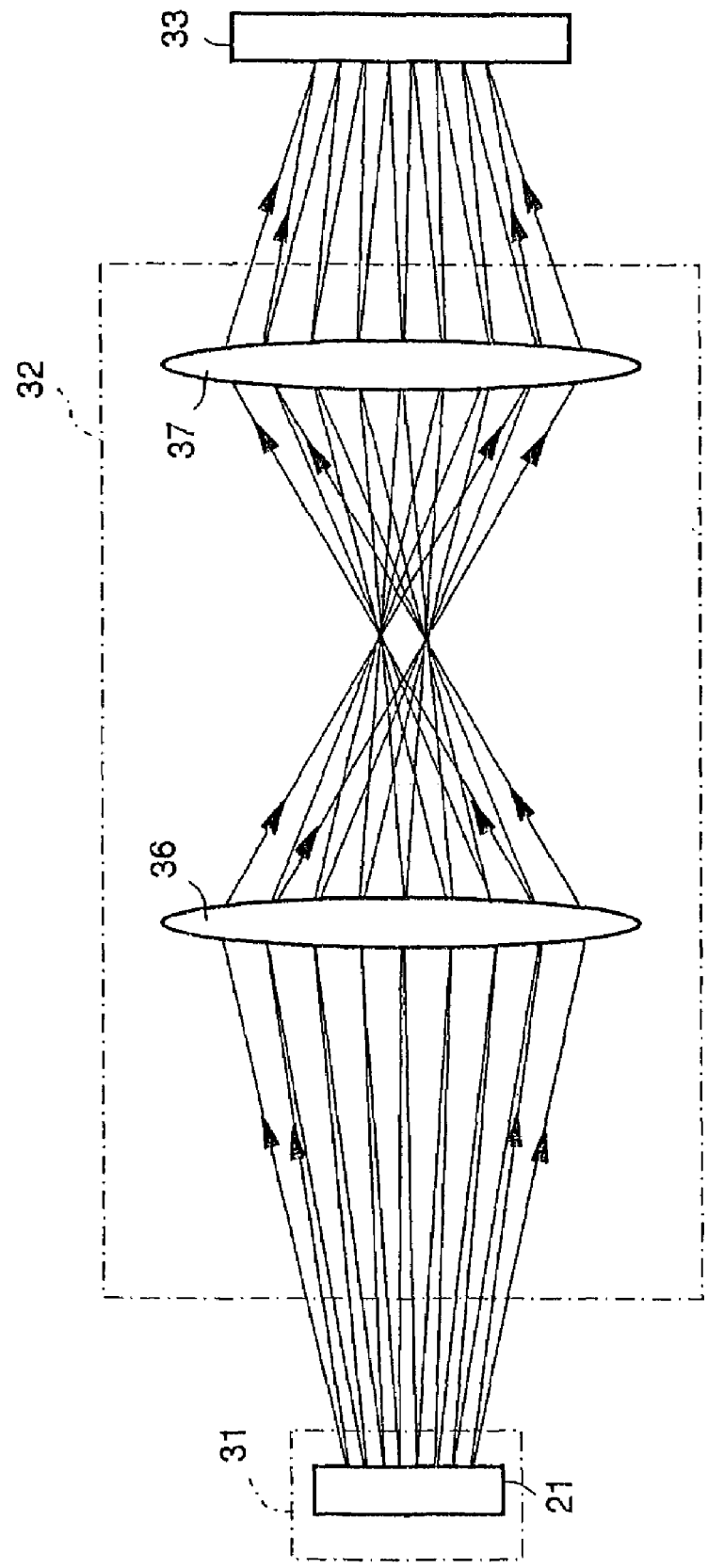
FIG. 21 is a schematic illustration showing a structural example of a laser light source and a structural example of an optical system upon which laser light beams from the laser light source are incident used in the embodiment shown in FIG. 19.

In an example of a combination of the laser light source 31 and the optical system 32, the laser light source 31 comprises the one-dimensional diode array 21 as shown in FIG. 10 to emit the laser light beams arranged substantially in a common plane and the optical system 32 comprises a collimator lens 36 and a converging lens 37, as shown in FIG. 21.

In the case of the example shown in FIG. 21, the laser light beams obtained from the one-dimensional diode array 21 in the laser light source 31 to be arranged substantially in the common plane enter into the collimator lens 36. Each of these laser light beams is collimated by the collimator lens 36 to enter into the converging lens 37 and then converged by the converging lens 37 to be incident upon the one-dimensional light-modulator 33.

Figure 22:
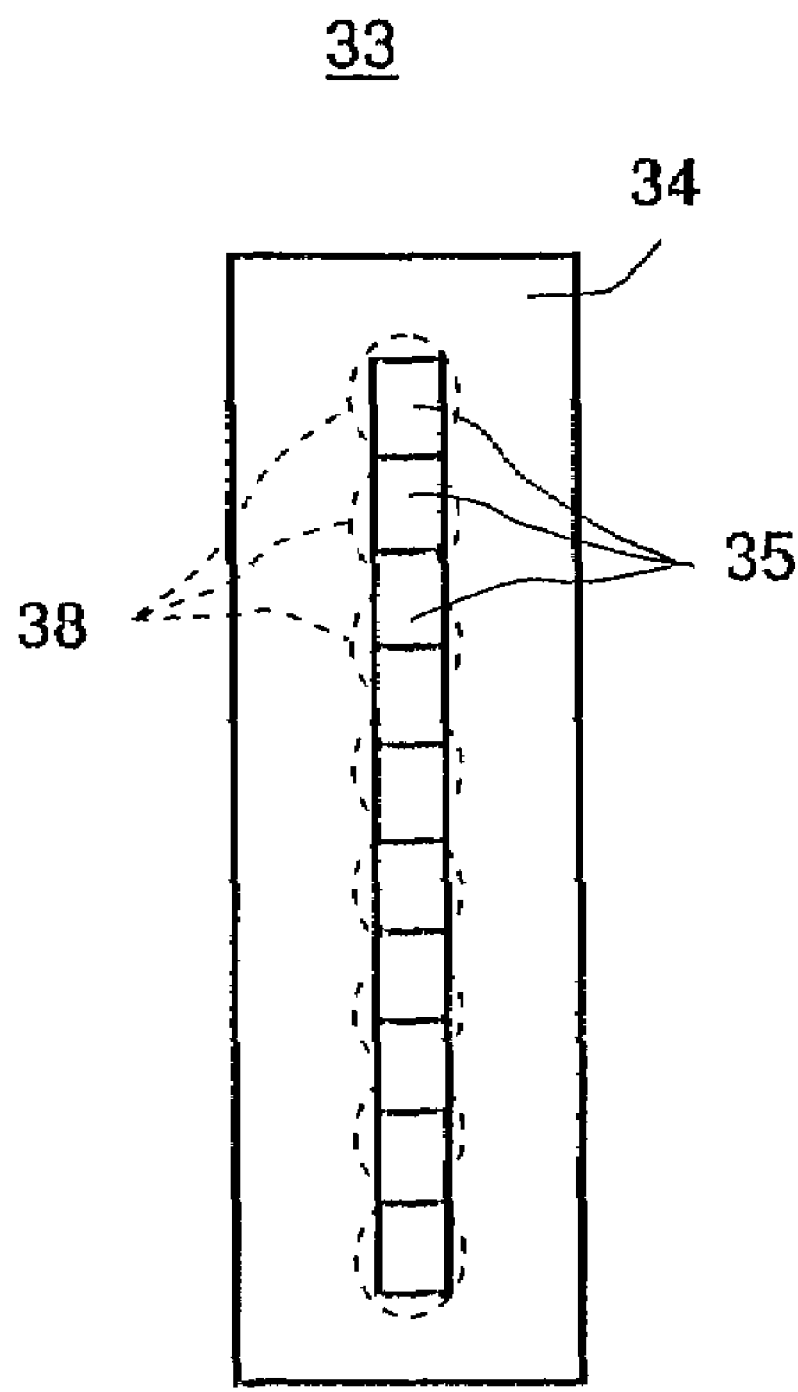
FIG. 22 is a schematic illustration used for explaining the structural examples of the laser light source and the one-dimensional diode array shown in FIG. 21.

The laser light beams arranged substantially in the common plane are caused to be incident upon the reflection type light-modulating elements 35 constituting the one-dimensional light-modulator 33 so that a direction of the arrangement thereof is coincident with a direction of the arrangement of the reflection type light-modulating elements 35 which are arranged in a line in the one-dimensional light-modulator 33. Thereby, a plurality of light spots 38 are formed on the one-dimensional light-modulator 33 by the laser light beams so that each of the light spots 38 irradiates one of the reflection type light-modulating elements 35 arranged in a line, as shown in FIG. 22.

A modulation control signal generator 39 is provided in relation to the one-dimensional light-modulator 33. The modulation control signal generator 39 is supplied with a recording signal SS which represents information to be recorded and produces modulation control signals SME based on the information to be recorded in response to the recording signal SS. The modulation control signals SME obtained from the modulation control signal generator 39 are supplied respectively to the reflection type light-modulating elements 35 constituting the one-dimensional light-modulator 33.

Under such a condition, each of the reflection type light-modulating elements 35 constituting the one-dimensional light-modulator 33 modulates one of the laser light beams which forms the light spots 38 on the one-dimensional light-modulator 33 to irradiate the reflection type light-modulating elements 35 arranged in a line, respectively, in response to one of the modulation control signals SME obtained from the modulation control signal generator 39 and simultaneously reflects the laser light beam modulated thereby. The modulation of one of the laser light beams by each of the reflection type light-modulating elements 35 is carried out by varying the reflection amount of laser light beam in response to one of the modulation control signals SME.

As a result, the laser light beams which have been modulated by the reflection type light-modulating elements 35 in response to the modulation control signals SME obtained from the modulation control signal generator 39 and reflected from the reflection type light-modulating elements 35 (the modulated laser light beams) are obtained from the one-dimensional light-modulator 33 to be arranged in accordance with the arrangement of the reflection type light-modulating elements 35, in other words, to be arranged substantially in the common plane.

The modulated laser light beams obtained from the one-dimensional light-modulator 33 to be arranged substantially in the common plane pass through an optical system 24 operative to perform a light beam control to be incident upon an optical tape 26 which is an optical recording medium driven to run by a recording medium driving controller 25. The optical system 24, recording medium driving controller 25 and optical tape 26 correspond to those in FIG. 9, respectively.

In the condition wherein the modulated laser light beams are obtained from the one-dimensional light-modulator 33 in such a manner as mentioned above, assuming that the number of the laser light beams incident upon the one-dimensional light-modulator 33 is m and the number of the reflection type light-modulating elements 35 constituting the one-dimensional light-modulator 33 is $\underline{n}$, a relation expressed with the equation : $m \leq n$ is satisfied between $\underline{m}$ and $\underline{n}$. In the case of m=n, the modulated laser light beams are incident upon the reflection type light-modulating elements 35, respectively. In the case of m<n, the laser light beams may be not incident upon some of the reflection type light-modulating elements 35 and the rest of the reflection type light-modulating elements 35 may be supplied with the modulation control signals SME, respectively, to be used for modulating the laser light beams incident thereupon. Further, in the case of m<n, one of the laser light beams may be incident upon two or more of the reflection type light-modulating elements 35 and these two or more of the reflection type light-modulating elements 35 may be supplied with the same modulation control signal SME to be used for modulating one of the laser light beams incident thereupon.

In the embodiment of apparatus for recording information thus constituted as shown in FIG. 19, the optical system 24 operative to perform the light beam control focuses the modulated laser light beams which are obtained from the one-dimensional light-modulator 33 so that the geometric optical images of the modulated laser light beams are reduced over the diffraction limit thereof and causes the focused modulated laser light beams to be incident upon the optical tape 26 driven to run by the recording medium driving controller 25, or focuses the modulated laser light beams which are obtained from the one-dimensional light-modulator 33 so that the geometric optical images of the modulated laser light beams are obtained under the diffraction limit thereof and causes the focused modulated laser light beams to be incident upon the optical tape 26 driven to run by the recording medium driving controller 25 to form on the optical tape 26 the light spots arranged in a line at a predetermined angle other than 90 degrees or 180 degrees to the direction in which the optical tape 26 runs, in the similar manner to the case of the optical system 24 employed in the embodiment shown in FIG. 9 for performing the light beam control for the modulated laser light beams obtained from the one-dimensional diode array 21.

With the embodiment of apparatus for recording information shown in FIG. 19, the advantages corresponding to those obtained with the embodiment of apparatus for recording information shown in FIG. 9 can be also obtained.

Figure 23:
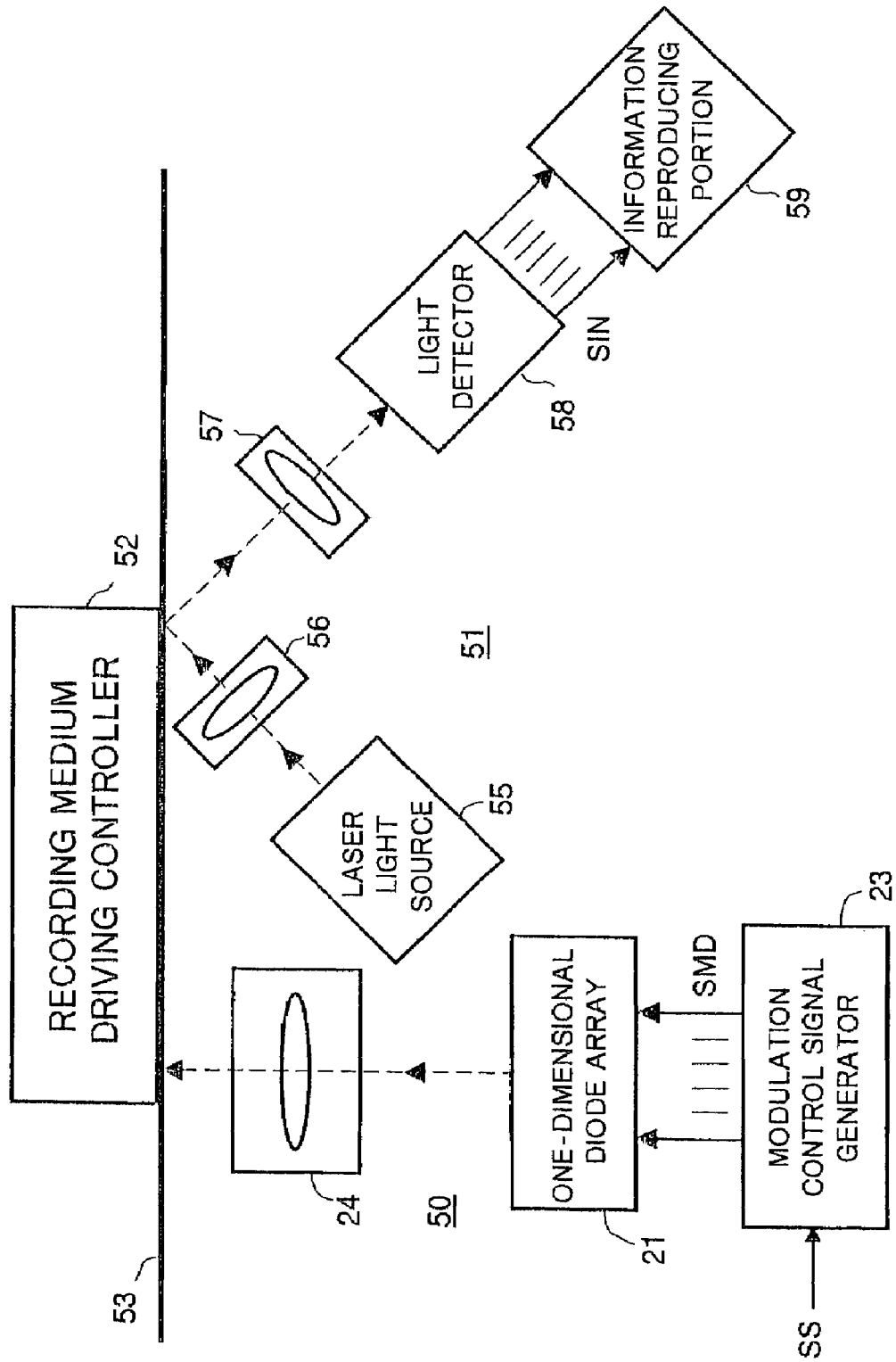
FIG. 23 is a schematic block diagram showing an essential part of an embodiment of apparatus for recording and reproducing information according to the invention claimed in any one of claims 13 to 16 of the present application.

FIG. 23 shows an essential part of an embodiment of apparatus for recording and reproducing information according to the invention claimed in any one of claims 13 to 16 of the present application.

In the embodiment shown in FIG. 23, a tape-shaped optical recording medium, that is, an optical tape is used as an optical recording medium and information is recorded on or reproduced from the optical tape.

The embodiment shown in FIG. 23 is provided with an information recording portion 50 and an information reproducing portion 51. In the information recording portion 50, information is recorded on an optical tape 53 which is driven to run by a recording medium driving controller 52, and in the information reproducing portion 51, information recorded on the optical tape 53 is reproduced from the optical tape 53 which is driven to run by the recording medium driving controller 52.

The information recording portion 50 is constituted in the same manner as the essential part of the embodiment of apparatus for recording information shown in FIG. 9, and in FIG. 23, blocks and signals in the information recording portion 50 corresponding to those in the embodiment shown in FIG. 9 are marked with the same references and further description thereof will be omitted.

In the information reproducing portion 51, a laser light source 55 which constitutes a light source for emitting continuously a plurality of laser light beams is provided. The laser light source 55 comprises, for example, the one-dimensional diode array 21 which is constituted with a plurality of laser diodes 22 arranged in a line as shown in FIG. 10. Accordingly, a plurality of laser light beams arranged substantially in a common plane in accordance with the linear arrangement of the laser diodes 22 are obtained from the laser light source 55.

The laser light beams obtained from the laser light source 55 pass through an optical system 56 operative to perform a light beam control to be incident upon the optical tape 53 driven to run by the recording medium driving controller 52. The optical tape 53 is provided thereon with, for example, the recording tracks CH1'~CHn' or CHS1~CHSn as shown in FIG. 14, 16 or 18 in the same manner as the optical tape 26 used in the embodiment shown in FIG. 9 or 19.

The optical system 56 causes the laser light beams, which are obtained from the laser light source 55 to be arranged substantially in the common plane, to be incident upon the optical tape 53 so that each adjacent two of the laser light beams are in close vicinity to each other substantially without any space between them. Further, the optical system 56 performs a focus control by which each of the laser light beams incident upon the optical tape 53 is appropriately focused on one of the recording tracks CH1'~CHn' or CHS1~CHSn formed on the optical tape 53 and a tracking control by which each of the laser light beams incident upon the optical tape 53 is appropriately positioned on one of the recording tracks CH1'~CHn' or CHS1~CHSn formed on the optical tape 53.

Each of the laser light beams positioned appropriately on one of the recording tracks CH1'~CHn' or CHS1~CHSn formed on the optical tape 53 is modulated in response to the information recorded on one of the recording tracks CH1'~CHn' or CHS1~CHSn and simultaneously reflected from one of the recording tracks CH1'~CHn' or CHS1~CHSn to an optical system 57 comprising, for example, a plurality of optical elements. The optical system 57 causes the laser light beams which have been modulated in response to the information recorded on the recording tracks CH1'~CHn' or CHS1~CHSn and reflected from the recording tracks CH1'~CHn' or CHS1~CHSn to enter into a light detector 58.

The light detector 58 produces a plurality of output signals SIN varying in response to variations in the laser light beams modulated in response to the information recorded on the optical tape 53 and reflected from the optical tape 53 and supplies an information reproducing portion 59 with the output signals SIN. The information reproducing portion 59 reproduces the information recorded on the optical tape 53 based on the output signals SIN obtained from the light detector 58.

Although the laser light source 55 comprises the one-dimensional diode array 21 to emit the laser light beams arranged substantially in the common plane in the information reproducing portion 51 provided in the embodiment shown in FIG. 23, it is also possible to modify the laser light source 55 so as to emit a single laser light beam in place of the laser light beams arranged substantially in the common plane. In such a case, the single laser light beam is incident upon the optical tape 53 through the optical system 56 and the information recorded on the recording tracks formed on the optical tape 53 is reproduced by the single laser light beam successively at every recording track, for example.

With the embodiment of apparatus for recording and reproducing information shown in FIG. 23, a noncontact information recording on the optical tape 53 by which the information is recorded on the recording tracks formed with the predetermined minimum guard bands on the optical tape 53 can be carried out in the information recording portion 50, difficulties in determining and maintaining a position of the optical system 24 can be reduced and the coefficient of utilization of the light beams can be improved. Further, since the recording of the information on the optical tape 53 is performed in the condition wherein the laser light beams modulated in response to the modulation control signals SMD based on the information to be recorded and arranged substantially in the common plane are incident upon the optical tape 53 to form thereon the light spots arranged in a line, the information recorded on the optical tape 53 can be reproduced relatively easily without performing complicated signal processing in the information reproducing portion 51.

Figure 24:
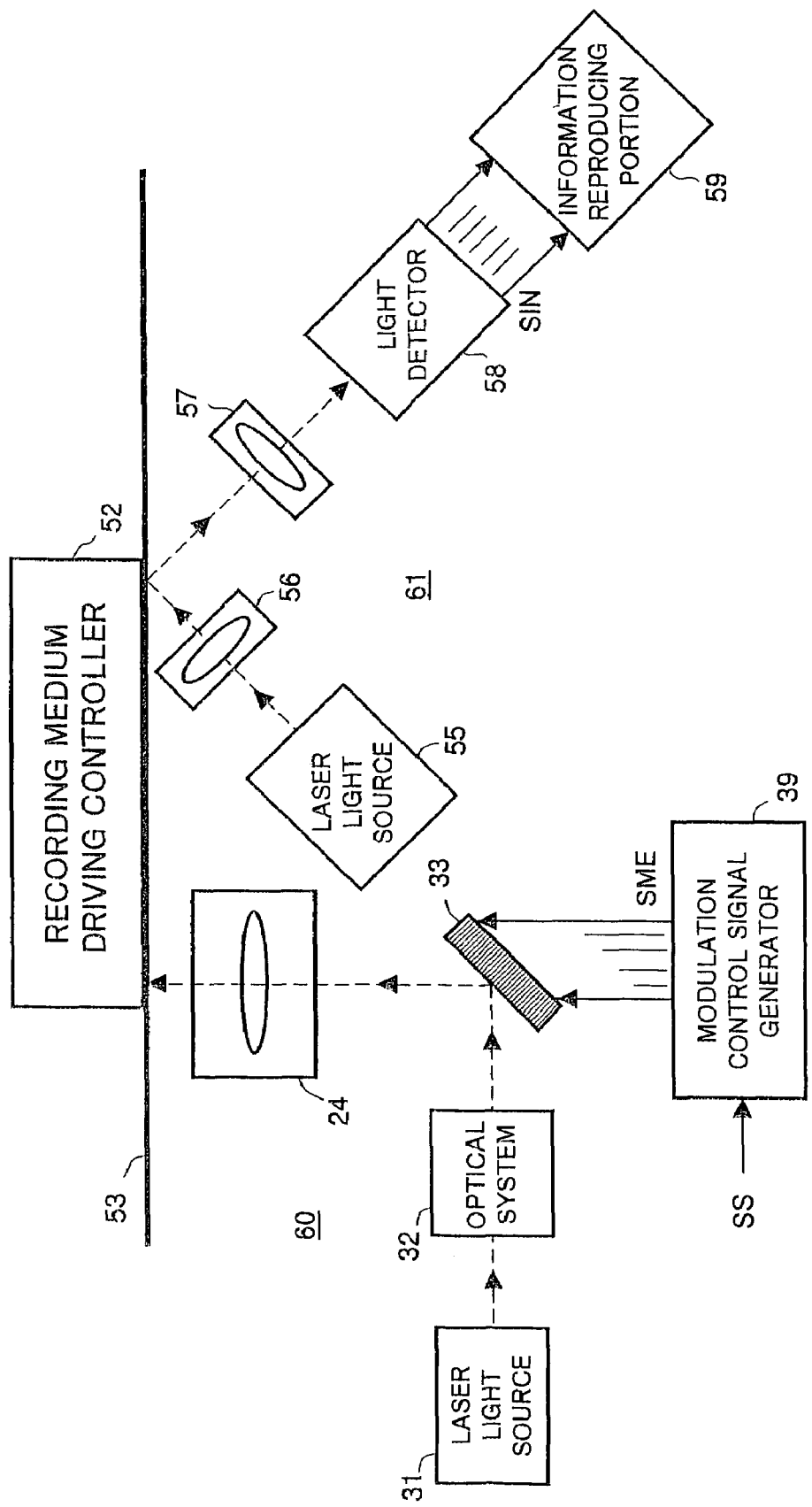
FIG. 24 is a schematic block diagram showing an essential part of an embodiment of apparatus for recording and reproducing information according to the invention claimed in any one of claims 17 to 20 of the present application.

FIG. 24 shows an essential part of an embodiment of apparatus for recording and reproducing information according to the invention claimed in any one of claims 17 to 20 of the present application.

In the embodiment shown in FIG. 24, a tape-shaped optical recording medium, that is, an optical tape is used as an optical recording medium and information is recorded on or reproduced from the optical tape.

The embodiment shown in FIG. 24 is provided with an information recording portion 60 and an information reproducing portion 61. In the information recording portion 60, information is recorded on an optical tape 53 which is driven to run by a recording medium driving controller 52, and in the information reproducing portion 61, information recorded on the optical tape 53 is reproduced from the optical tape 53 which is driven to run by the recording medium driving controller 52. The recording medium driving controller 52 and optical tape 53 correspond respectively to those in the embodiment shown in FIG. 23.

The information recording portion 60 is constituted in the same manner as the essential part of the embodiment of apparatus for recording information shown in FIG. 19, and in FIG. 24, blocks and signals in the information recording portion 60 corresponding to those in the embodiment shown in FIG. 19 are marked with the same references and further description thereof will be omitted.

Similarly, the information reproducing portion 61 is constituted in the same manner as the information reproducing portion 51 shown in FIG. 23, and in FIG. 24, blocks and signals in the information reproducing portion 61 corresponding to those in the information reproducing portion 51 shown in FIG. 23 are marked with the same references and further description thereof will be omitted.

With the embodiment of apparatus for recording and reproducing information shown in FIG. 24, the advantages corresponding to those obtained with the embodiment of apparatus for recording and reproducing information shown in FIG. 23 can be also obtained.

Figure 25:
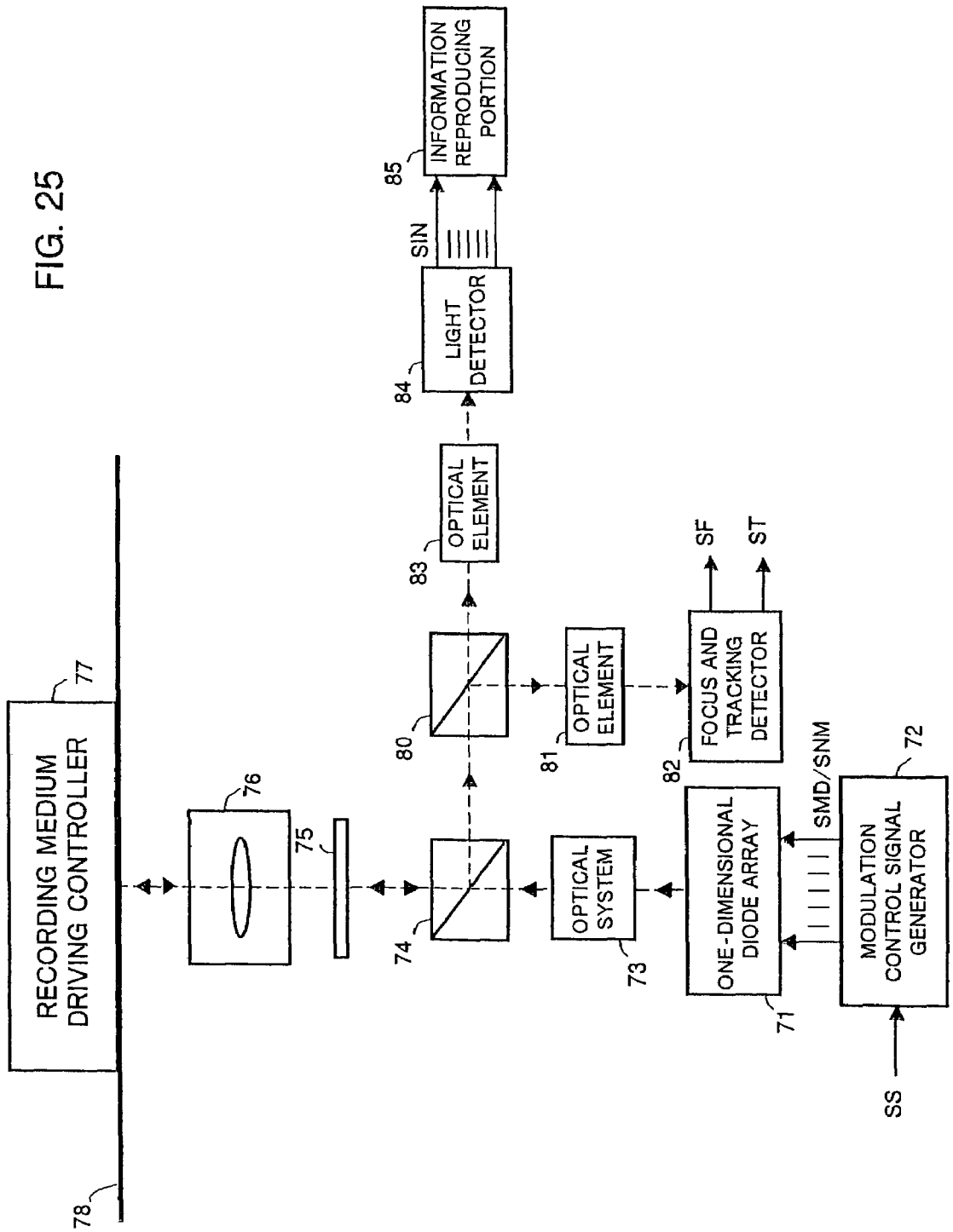
FIG. 25 is a schematic block diagram showing an essential part of an embodiment of apparatus for recording and reproducing information according to the invention claimed in any one of claims 21 to 28 of the present application.

FIG. 25 shows an essential part of an embodiment of apparatus for recording and reproducing information according to the invention claimed in any one of claims 21 to 28 of the present application.

In the embodiment shown in FIG. 25, a tape-shaped optical recording medium, that is, an optical tape is used as an optical recording medium and information is recorded on or reproduced from the optical tape.

The embodiment shown in FIG. 25 is provided with a one-dimensional diode array 71 which constitutes a light source for emitting continuously a plurality of laser light beams. This one-dimensional diode array 71 is constituted with, for example, a plurality of laser diodes arranged in a line, each of which is operative to emit a laser light beam, in the same manner as the one-dimensional diode array 21 shown in FIGS. 9 and 10. Accordingly, a plurality of laser light beams arranged substantially in a common plane in accordance with the linear arrangement of the laser diodes are obtained from the one-dimensional diode array 71.

A modulation control signal generator 72 is provided in relation to the one-dimensional diode array 71. The modulation control signal generator 72 corresponds to the modulation control signal generator 23 shown in FIG. 9 and is supplied with a recording signal SS which represents information to be recorded.

Then, the modulation control signal generator 72 is operative to produce a plurality of modulation control signals SMD based on the information to be recorded in response to the recording signal SS and supply the laser diodes constituting the one-dimensional diode array 71 with the modulation control signals SMD or to produce a plurality of predetermined modulation control signals SNM regardless of the recording signal SS and supply the laser diodes constituting the one-dimensional diode array 71 with the modulation control signals SNM.

When the modulation control signals SMD based on the information to be recorded are supplied from the modulation control signal generator 72 to the laser diodes constituting the one-dimensional diode array 71, the laser light beam emitted from each of the laser diodes constituting the one-dimensional diode array 71 is varied in its intensity in response to the modulation control signal SMD, that is, modulated in response to the modulation control signal SMD. On the other hand, when the predetermined modulation control signals SNM are supplied from the modulation control signal generator 72 to the laser diodes constituting the one-dimensional diode array 71, the laser light beam emitted from each of the laser diodes constituting the one-dimensional diode array 71 is constant in its intensity without being subjected to any modulation.

As a result, the laser light beams which have been modulated in response to the modulation control signals SMD based on the information to be recorded (the modulated laser light beams) or the laser light beams which have not been subjected to any modulation (the unmodulated laser light beams) are obtained from the one-dimensional diode array 71 so as to be arranged substantially in the common plane in accordance with the linear arrangement of the laser diodes constituting the one-dimensional diode array 71.

The laser light beams arranged substantially in the common plane and obtained from the one-dimensional diode array 71 pass through an optical system 73 comprising a collimating lens and other optical elements to enter into a polarized light beam splitter 74. The laser light beams entering into the polarized light beam splitter 74 from the optical system 73 pass through the polarized light beam splitter 74 without being reflected.

Then, the laser light beams thus having passed through the polarized light beam splitter 74 further pass through a quarter wavelength plate 75 and a light beam control optical system 76 to be incident upon an optical tape 78 which is an optical recording medium driven to run by a recording medium driving controller 77.

The light beam control optical system 76 is operative to subject the laser light beams arranged substantially in the common plane and having passed through the quarter wavelength plate 75 to a focus control for focusing properly each of the laser light beams on the optical tape 78 and a tracking control for causing each of the laser light beams to be incident upon a proper position on the optical tape 78. Further, the light beam control optical system 76 is also operative to focus the laser light beams arranged substantially in the common plane and having passed through the quarter wavelength plate 75 so that geometric optical images of the laser light beams are reduced over the diffraction limit thereof and simultaneously cause the focused laser light beams to be incident upon the optical tape 78 or operative to focus the laser light beams arranged substantially in the common plane and having passed through the quarter wavelength plate 75 so that geometric optical images of the laser light beams are obtained under the diffraction limit thereof and simultaneously cause the focused laser light beams to be incident upon the optical tape 78 to form thereon a plurality of light spots arranged in a line at a predetermined angle other than 90 degrees or 180 degrees to a direction in which the optical tape 78 runs, in the same manner as the beam control to which the modulated laser light beams are subjected in the optical system 24 shown in FIG. 9.

When the modulated laser light beams which have been modulated in response to the modulation control signals SMD and obtained from the one-dimensional diode array 71 are incident upon the optical tape 78, the information is recorded on the optical tape 78 by means of the modulated laser light beams.

On the other hand, when the unmodulated laser light beams which have not been subjected to any modulation and obtained from the one-dimensional diode array 71 are incident upon the optical tape 78, the optical tape 78 has been provided thereon a plurality of recording tracks on which information has been recorded and the unmodulated laser light beams are appropriately positioned on the recording tracks formed on the optical tape 78, respectively, by the light beam control optical system 76.

The unmodulated laser light beams incident upon the optical tape 78 to be appropriately positioned on the recording tracks formed on the optical tape 78, respectively, are modulated in response to the information recorded on the recording tracks and simultaneously reflected from the recording tracks to be laser light beams modulated in response to the information. The laser light beams thus obtained from the optical tape 78 pass through the light beam control optical system 76 and the quarter wavelength plate 75 and then enter into the polarized light beam splitter 74. Since the laser light beams entering into the polarized light beam splitter 74 from the quarter wavelength plate 75 have passed through the quarter wavelength plate 75 twice in the direction to the light beam control optical system 76 and in the opposite direction to the polarized light beam splitter 74, a plane of polarization of each of the laser light beams entering into the polarized light beam splitter 74 from the quarter wavelength plate 75 has been rotated by 90 degrees in comparison with that of each of the laser light beams entering into the polarized light beam splitter 74 from the optical system 73 and therefore the laser light beams entering into the polarized light beam splitter 74 from the quarter wavelength plate 75 are reflected from the polarized light beam splitter 74 to be directed to the right in FIG. 25.

The laser light beams reflected to the right in FIG. 25 from the polarized light beam splitter 74 enter into a light beam splitter 80. A part of each of the laser light beams having entered into the light beam splitter 80 is reflected from the light beam splitter 80 to be directed downward in FIG. 25 to pass through an optical element 81, such as a cylindrical lens or the like, and then enters into a focus and tracking detector 82, and another part of each of the laser light beams having entered into the light beam splitter 80 passes through the light beam splitter 80 further to pass through an optical element 83, such as a converging lens or the like, and then enters into a light detector 84.

The focus and tracking detector 82 is operative to produce output signals SF and ST which represent respectively the focus condition and the tracking condition of the laser light beams incident upon the optical tape 78 in response to the laser light beams incident upon the focus and tracking detector 82 through the optical element 81. The output signals SF and ST thus obtained from the focus and tracking detector 82 are used for the focus control and the tracking control to which each of the laser light beams passing through the light beam control optical system 76 to be incident upon the optical tape 78 is subjected.

The light detector 84 is operative to produce a plurality of output signals SIN which vary in response to variations in each of the laser light beams incident upon the light detector 84 through the optical element 83 and supply an information reproducing portion 85 with the output signals SIN. The information reproducing portion 85 is operative to reproduce the information recorded on the optical tape 78 based on the output signals SIN obtained from the light detector 84.

In the embodiment of apparatus for recording and reproducing information shown in FIG. 25, when information is newly recorded on the optical tape 78, the modulation control signals SMD formed based on the information to be recorded in response to the recording signal SS are supplied from the modulation control signal generator 72 to the laser diodes constituting the one-dimensional diode array 71. As the result, the modulated laser light beams which have been modulated in response to the modulation control signals SMD are obtained from the one-dimensional diode array 71 to be arranged substantially in the common plane.

The modulated laser light beams obtained from the one-dimensional diode array 71 pass through the optical system 73, the polarized light beam splitter 74 and the quarter wavelength plate 75 to enter into the light beam control optical system 76 and then are subjected to the focus control and the tracking control in the light beam control optical system 76 so as to be incident upon the optical tape 78. As a result of this, the recording of the information on the optical tape 78 is carried out with the modulated laser light beams which have been modulated in response to the modulation control signals SMD and the recording tracks, on each of which the information is recorded, are formed on the optical tape 78.

In such an information recording, the light beam control optical system 76 is operative to focus the modulated laser light beams arranged substantially in the common plane and having passed through the quarter wavelength plate 75 so that the geometric optical images of the modulated laser light beams are reduced over the diffraction limit thereof and simultaneously cause the focused modulated laser light beams to be incident upon the optical tape 78, or to focus the modulated laser light beams arranged substantially in the common plane and having passed through the quarter wavelength plate 75 so that the geometric optical images of the modulated laser light beams are obtained under the diffraction limit thereof and simultaneously cause the focused modulated laser light beams to be incident upon the optical tape 78 to form thereon the light spots arranged in a line at the predetermined angle other than 90 degrees or 180 degrees to the direction in which the optical tape 78 runs.

With such operations of the light beam control optical system 76 for recording the information on the optical tape 78, the recording tracks each of which extends in the direction in which the optical tape 78 runs are formed on the optical tape 78 with predetermined minimum (substantially zero) guard bands in the same manner as the recording tracks CH1', CH2', CH3', . . . , CHn' or CHS1, CHS2, CHS3, . . .

, CHSn shown in FIG. 14, 16 or 18. An information recording pattern corresponding to the modulation state of each of the modulated laser light beams which are incident upon the optical tape 78 to form the recording tracks thereon is provided on each of the recording tracks.

When the modulated laser light beams arranged substantially in the common plane are incident upon the optical tape 78 to form thereon the light spots arranged in a line at the predetermined angle other than 90 degrees or 180 degrees to the direction in which the optical tape 78 runs, the information recorded on the recording tracks formed on the optical tape 78 are provided with a phase-difference between each two recording tracks adjacent to each other, which is substantially constant in accordance with the predetermined angle of the light spots arranged in a line on the optical tape 78.

Meanwhile, in the embodiment of apparatus for recording and reproducing information shown in FIG. 25, when information recorded on the optical tape 78 is reproduced from the optical tape 78, the predetermined modulation control signals SNM are supplied from the modulation control signal generator 72 to the laser diodes constituting the one-dimensional diode array 71. As the result, the unmodulated laser light beams which have not been subjected to any modulation to be constant in its intensity are obtained from the one-dimensional diode array 71 to be arranged substantially in the common plane.

The unmodulated laser light beams obtained from the one-dimensional diode array 71 pass through the optical system 73, the polarized light beam splitter 74 and the quarter wavelength plate 75 to enter into the light beam control optical system 76 and then are subjected to the focus control and the tracking control in the light beam control optical system 76 so as to be incident upon the optical tape 78.

In such a case, the optical tape 78 has been provided thereon the recording tracks formed with the predetermined minimum (substantially zero) guard bands in the same manner as the recording tracks CH1', CH2', CH3', . . . , CHn' or CHS1, CHS2, CHS3, . . . , CHSn shown in FIG. 14, 16 or 18 for the recording of the information thereon and the unmodulated laser light beams are appropriately positioned on the recording tracks formed on the optical tape 78, respectively, by the light beam control optical system 76.

The light beam control optical system 76 is operative to focus the unmodulated laser light beams arranged substantially in the common plane and having passed through the quarter wavelength plate 75 so that the geometric optical images of the unmodulated laser light beams are reduced over the diffraction limit thereof and simultaneously cause the focused unmodulated laser light beams to be incident upon the optical tape 78, or to focus the unmodulated laser light beams arranged substantially in the common plane and having passed through the quarter wavelength plate 75 so that the geometric optical images of the unmodulated laser light beams are obtained under the diffraction limit thereof and simultaneously cause the focused unmodulated laser light beams to be incident upon the optical tape 78 to form thereon the light spots arranged in a line at the predetermined angle other than 90 degrees or 180 degrees to the direction in which the optical tape 78 runs.

The unmodulated laser light beams incident upon the optical tape 78 to be appropriately positioned on the recording tracks formed on the optical tape 78, respectively, are modulated in response to the information recorded on the recording tracks and simultaneously reflected from the recording tracks to be directed to the light beam control optical system 76 from the optical tape 78 as laser light beams modulated in response to the information.

The laser light beams modulated in response to the information recorded on the optical tape 78 and obtained from the optical tape 78 pass through the light beam control optical system 76 and the quarter wavelength plate 75 and then are reflected from the polarized light beam splitter 74 to enter into the light beam splitter 80. The laser light beams thus entering into the light beam splitter 80 are partially reflected from the light beam splitter 80 to enter into the focus and tracking detector 82 through the optical element 81 and simultaneously partially pass through the light beam splitter 80 to enter into the light detector 84 through the optical element 83.

As a result of this, the output signal SF which represents the focus condition of the unmodulated laser light beams incident upon the optical tape 78 and the output signal ST which represents the tracking condition of the unmodulated laser light beams incident upon the optical tape 78 are obtained from the focus and tracking detector 82 and the output signals SIN which vary in response to variations in each of the laser light beams modulated in response to the information recorded on the optical tape 78 are obtained from the light detector 84 to be supplied to the information reproducing portion 85. Then, in the information reproducing portion 85, the information recorded on the optical tape 78 is reproduced based on the output signals SIN obtained from the light detector 84.

With the embodiment of apparatus for recording and reproducing information shown in FIG. 25, a noncontact information recording on the optical tape 78 by which the information is recorded on the recording tracks formed with the predetermined minimum guard bands on the optical tape 78 can be carried out, difficulties in determining and maintaining positional relations among the optical means through which the laser light beams pass or from which the laser light beams are reflected can be reduced and the coefficient of utilization of the laser light beams can be improved. Further, since the recording of the information on the optical tape 78 is performed in the condition wherein the laser light beams modulated in response to the modulation control signals SMD based on the information to be recorded and arranged substantially in the common plane are incident upon the optical tape 78 to form thereon the light spots arranged in a line, the information recorded on the optical tape 78 can be reproduced relatively easily without performing complicated signal processing.

Figure 26:
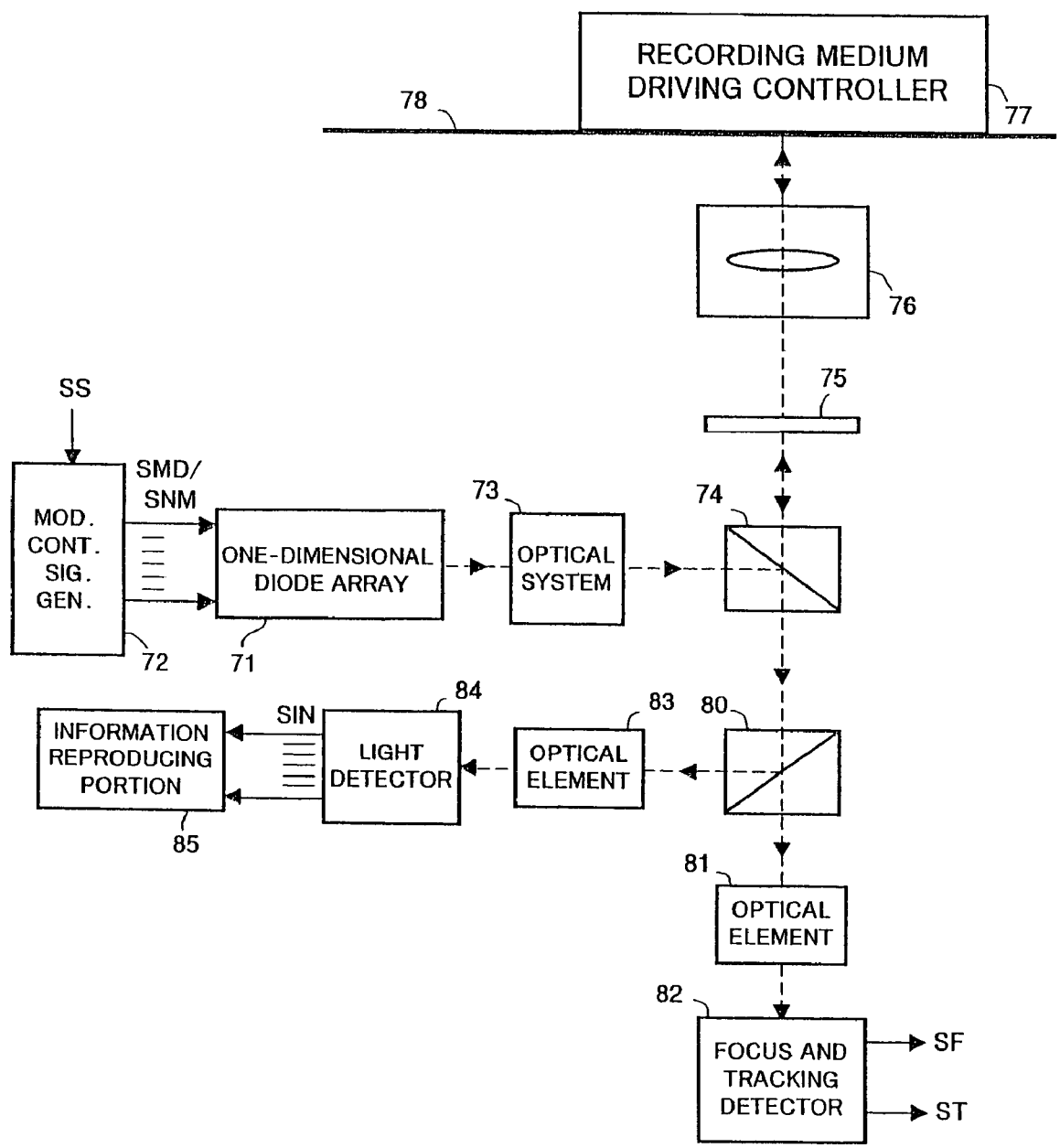
FIG. 26 is a schematic block diagram showing an essential part of another embodiment of apparatus for recording and reproducing information according to the invention claimed in any one of claims 21 to 28 of the present application.

FIG. 26 shows an essential part of another embodiment of apparatus for recording and reproducing information according to the invention claimed in any one of claims 21 to 28 of the present application.

In the embodiment shown in FIG. 26, a tape-shaped optical recording medium, that is, an optical tape is used as an optical recording medium and information is recorded on or reproduced from the optical tape.

The essential part of the embodiment shown in FIG. 26 is constituted with various structural elements corresponding to those constituting the essential part of the embodiment shown in FIG. 25, and in FIG. 26, blocks and signals in the essential part of the embodiment corresponding to those in the essential part of the embodiment shown in FIG. 25 are marked with the same references and further description thereof will be omitted.

The embodiment shown in FIG. 26 is different from the embodiment shown in FIG. 25 in the polarization characteristic of a polarized light beam splitter 74, the positional arrangement of a portion including one-dimensional diode array 71, a modulation control signal generator 72 and an optical system 73, and the positional arrangement of another portion including a light beam splitter 80, an optical element 81, a focus and tracking detector 82, an optical element 83, a light detector 84 and an information reproducing portion 85.

In the embodiment shown in FIG. 26, a plurality of laser light beams having been modulated in response to modulation control signals SMD or having not been subjected to any modulation are obtained from the one-dimensional diode array 71 to enter into the polarized light beam splitter 74 through the optical system 73. The laser light beams entering into the polarized light beam splitter 74 from the optical system 73 are reflected from the polarized light beam splitter 74 to be directed upward in FIG. 26. Then, the laser light beams obtained to be directed upward from the polarized light beam splitter 74 pass through the quarter wavelength plate 75 and the light beam control optical system 76 to be incident upon an optical tape 78.

Further, a plurality of laser light beams having been modulated in response to information recorded on the optical tape 78 are obtained from the optical tape 78 to enter into the polarized light beam splitter 74 through the light beam control optical system 76 and the quarter wavelength plate 75. The laser light beams entering into the polarized light beam splitter 74 from the quarter wavelength plate 75 pass through the polarized light beam splitter 74 to enter into the light beam splitter 80. A part of each of the laser light beams having entered into the light beam splitter 80 passes through the light beam splitter 80 to enter into the focus and tracking detector 82 through the optical element 81, and another part of each of the laser light beams having entered into the light beam splitter 80 is reflected from the light beam splitter 80 to be directed to the left in FIG. 26 to enter into the light detector 84 through the optical element 83.

The operation of each of the one-dimensional diode array 71, modulation control signal generator 72, light beam control optical system 76, focus and tracking detector 82 and information reproducing portion 85 is the same as that in the embodiment shown in FIG. 25. Accordingly, with the embodiment of apparatus for recording and reproducing information shown in FIG. 26, the advantages corresponding to those obtained with the embodiment of apparatus for recording and reproducing information shown in FIG. 25 can be also obtained.

Figure 27:
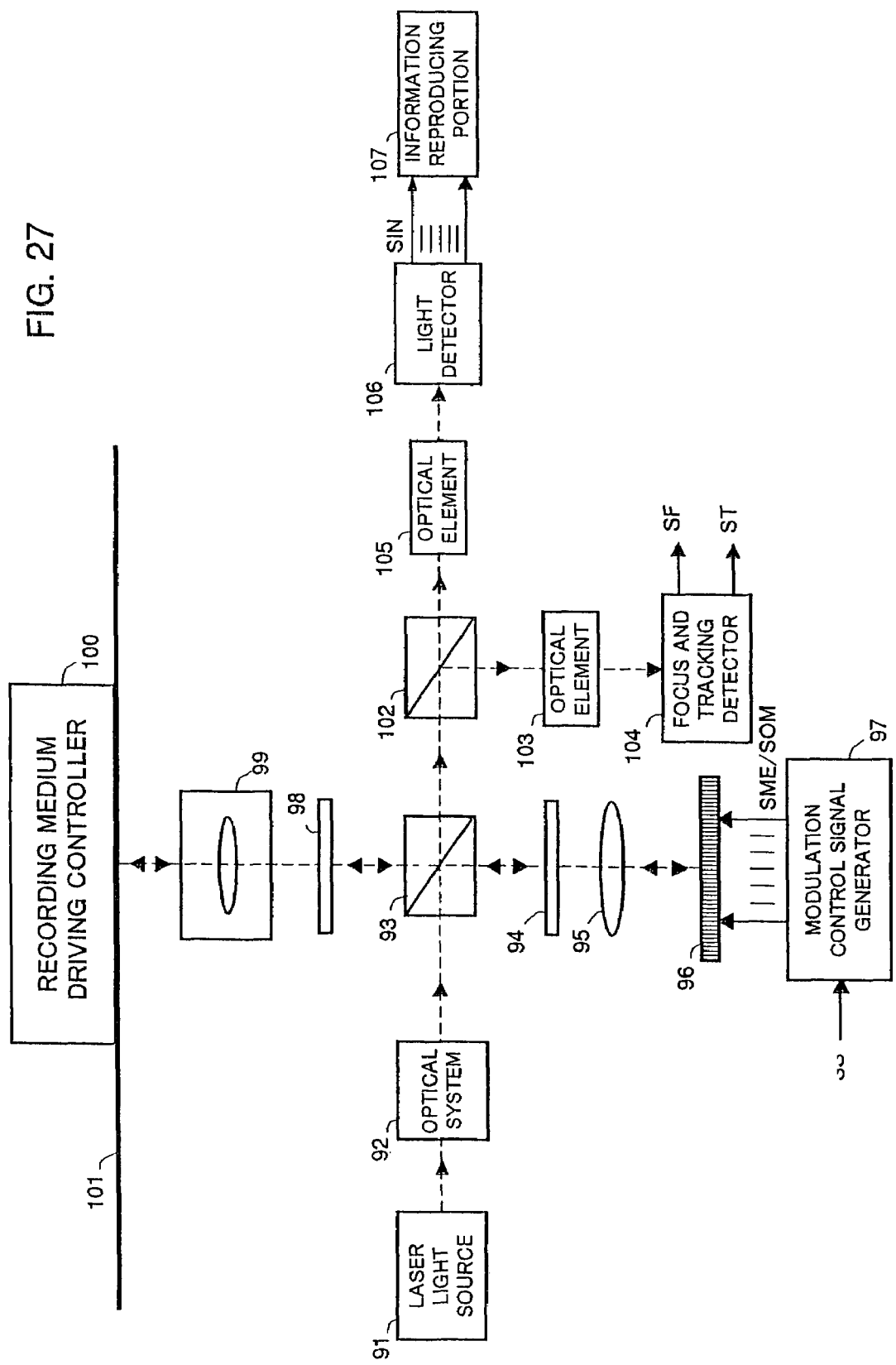
FIG. 27 is a schematic block diagram showing an essential part of an embodiment of apparatus for recording and reproducing information according to the invention claimed in any one of claims 29 to 36 of the present application.

FIG. 27 shows an essential part of an embodiment of apparatus for recording and reproducing information according to the invention claimed in any one of claims 29 to 36 of the present application.

In the embodiment shown in FIG. 27, a tape-shaped optical recording medium, that is, an optical tape is used as an optical recording medium and information is recorded on or reproduced from the optical tape.

The embodiment shown in FIG. 27 is provided with a laser light source 91 which constitutes a light source for emitting continuously a plurality of laser light beams and an optical system 92 which comprises a plurality of optical elements such as lenses and into which the laser light beams obtained from the laser light source 91 enter. These laser light source 91 and optical system 92 are constituted in the same manner as the laser light source 31 and optical system 32 in the embodiment shown in FIG. 19. For example, the laser light source 91 comprises the one-dimensional diode array 21 as shown in FIG. 10 and the optical system 92 comprises the collimator lens 36 and the converging lens 37 shown in FIG. 21. Thereby, the laser light beams arranged substantially in a common plane are obtained from the optical system 92.

The laser light beams obtained from the optical system 92 enter into a polarized light beam splitter 93 and are reflected from the polarized light beam splitter 93 to be directed downward in FIG. 27 to pass through a quarter wavelength plate 94 and then enter into a converging lens 95. The converging lens 95 is operative to converge the laser light beams having passed through the quarter wavelength plate 94 to be incident upon a one-dimensional light-modulator 96.

The one-dimensional light-modulator 96 corresponds to the one-dimensional light-modulator 33 in the embodiment shown in FIG. 19. The one-dimensional light-modulator 96 is constituted with, for example, a plurality of reflection type light-modulating elements which correspond to the light-modulating elements 35 shown in FIG. 20 and are arranged in a line substantially without a space between each adjacent two on a plane supporting member corresponding to the plane supporting member 34 shown in FIG. 20, in the same manner as the one-dimensional light-modulator 33 shown in FIG. 20 which is constituted with the light-modulating elements 35 arranged in a line substantially without the space between each adjacent two on the plane supporting member 34.

The laser light beams arranged substantially in the common plane having passed through the converging lens 95 are incident upon the reflection type light-modulating elements arranged in a line for constituting the one-dimensional light-modulator 96 so that a direction of the arrangement thereof is coincident with a direction of the arrangement of the reflection type light-modulating elements which are arranged in a line in the one-dimensional light-modulator 96. Thereby, a plurality of light spots are formed on the one-dimensional light-modulator 96 by the laser light beams so that each of the light spots irradiates one of the reflection type light-modulating elements arranged in a line for constituting the one-dimensional light-modulator 96, in the same manner as the case of the one-dimensional light-modulator 33 shown in FIG. 20.

A modulation control signal generator 97 is provided in relation to the one-dimensional light-modulator 96 and a recording signal SS representing information to be recorded is supplied to the modulation control signal generator 97. The modulation control signal generator 97 is operative to produce a plurality of modulation control signals SME based on the information to be recorded in response to the recording signal SS and supply the reflection type light-modulating elements constituting the one-dimensional light-modulator 96 with the modulation control signals SME or to produce a plurality of predetermined modulation control signals SOM regardless of the recording signal SS and supply the reflection type light-modulating elements constituting the one-dimensional light-modulator 96 with the modulation control signals SOM.

When the modulation control signals SME based on the information to be recorded are supplied from the modulation control signal generator 97 to the reflection type light-modulating elements constituting the one-dimensional light-modulator 96, the laser light beams which are incident upon the one-dimensional light-modulator 96 to form the light spots thereon so that each of the light spots irradiates one of the reflection type light-modulating elements arranged in a line for constituting the one-dimensional light-modulator 96, are modulated in response to the modulation control signals SME by the reflection type light-modulating elements and simultaneously reflected from the reflection type light-modulating elements. The modulation of one of the laser light beams by each of the reflection type light-modulating elements 35 is carried out by varying the reflection amount of laser light beam in response to one of the modulation control signals SME.

On the other hand, when the predetermined modulation control signals SOM are supplied from the modulation control signal generator 97 to the reflection type light-modulating elements constituting the one-dimensional light-modulator 96, the laser light beams which are incident upon the one-dimensional light-modulator 96 to form the light spots thereon so that each of the light spots irradiates one of the reflection type light-modulating elements arranged in a line for constituting the one-dimensional light-modulator 96, are reflected from the reflection type light-modulating elements to be constant in its intensity without being subjected to any modulation.

As a result, the laser light beams which have been modulated in response to the modulation control signals SME based on the information to be recorded or the laser light beams which have not been subjected to any modulation are obtained from the one-dimensional light-modulator 71 so as to be arranged substantially in the common plane in accordance with the linear arrangement of the reflection type light-modulating elements constituting the one-dimensional light-modulator 96.

The laser light beams obtained from the one-dimensional light-modulator 96 pass through the converging lens 95 and the quarter wavelength plate 94 to enter into the polarized light beam splitter 93. Since the laser light beams entering into the polarized light beam splitter 93 from the quarter wavelength plate 94 have passed through the quarter wavelength plate 94 twice in the direction to the converging lens 95 and in the opposite direction to the polarized light beam splitter 93, a plane of polarization of each of the laser light beams entering into the polarized light beam splitter 93 from the quarter wavelength plate 94 has been rotated by 90 degrees in comparison with that of each of the laser light beams entering into the polarized light beam splitter 93 from the optical system 92 and therefore the laser light beams entering into the polarized light beam splitter 93 from the quarter wavelength plate 94 pass through the polarized light beam splitter 93. The laser light beams having passed through the polarized light beam splitter 93 further pass through a quarter wavelength plate 98 and a light beam control optical system 99 to be incident upon an optical tape 101 which is an optical recording medium driven to run by a recording medium driving controller 100.

The light beam control optical system 99 is operative to subject the laser light beams arranged substantially in the common plane and having passed through the quarter wavelength plate 98 to a focus control for focusing properly each of the laser light beams on the optical tape 101 and a tracking control for causing each of the laser light beams to be incident upon a proper position on the optical tape 101. Further, the light beam control optical system 99 is also operative to focus the laser light beams arranged substantially in the common plane and having passed through the quarter wavelength plate 98 so that geometric optical images of the laser light beams are reduced over the diffraction limit thereof and simultaneously cause the focused laser light beams to be incident upon the optical tape 101 or operative to focus the laser light beams arranged substantially in the common plane and having passed through the quarter wavelength plate 98 so that geometric optical images of the laser light beams are obtained under the diffraction limit thereof and simultaneously cause the focused laser light beams to be incident upon the optical tape 101 to form thereon a plurality of light spots arranged in a line at a predetermined angle other than 90 degrees or 180 degrees to a direction in which the optical tape 101 runs, in the same manner as the beam control to which the modulated laser light beams are subjected in the optical system 24 shown in FIG. 9.

When the modulated laser light beams which have been modulated in response to the modulation control signals SME and obtained from the one-dimensional light-modulator 96 are incident upon the optical tape 101, the information is recorded on the optical tape 101 by means of the laser light beams modulated in response to the modulation control signals SME.

On the other hand, when the laser light beams which have not been subjected to any modulation and reflected from the one-dimensional light-modulator 96 are incident upon the optical tape 101, the optical tape 101 has been provided thereon a plurality of recording tracks on which information has been recorded and the laser light beams incident upon the optical tape 101 are appropriately positioned on the recording tracks formed on the optical tape 101, respectively, by the light beam control optical system 99.

The laser light beams incident upon the optical tape 101 to be appropriately positioned on the recording tracks formed on the optical tape 101, respectively, are modulated in response to the information recorded on the recording tracks and simultaneously reflected from the recording tracks to be laser light beams modulated in response to the information. The laser light beams thus obtained from the optical tape 101 pass through the light beam control optical system 99 and the quarter wavelength plate 98 and then enter into the polarized light beam splitter 93. Since the laser light beams entering into the polarized light beam splitter 93 from the quarter wavelength plate 98 have passed through the quarter wavelength plate 98 twice in the direction to the light beam control optical system 99 and in the opposite direction to the polarized light beam splitter 93, a plane of polarization of each of the laser light beams entering into the polarized light beam splitter 93 from the quarter wavelength plate 98 has been rotated by 90 degrees in comparison with that of each of the laser light beams entering into the polarized light beam splitter 93 from the optical system 92 and therefore the laser light beams entering into the polarized light beam splitter 93 from the quarter wavelength plate 98 are reflected from the polarized light beam splitter 93 to be directed to the right in FIG. 27.

The laser light beams reflected to the right in FIG. 27 from the polarized light beam splitter 93 enter into a light beam splitter 102. A part of each of the laser light beams having entered into the light beam splitter 102 is reflected from the light beam splitter 102 to be directed downward in FIG. 27 to pass through an optical element 103, such as a cylindrical lens or the like, and then enters into a focus and tracking detector 104, and another part of each of the laser light beams having entered into the light beam splitter 102 passes through the light beam splitter 102 further to pass through an optical element 105, such as a converging lens or the like, and then enters into a light detector 106.

The focus and tracking detector 104 is operative to produce output signals SF and ST which represent respectively the focus condition and the tracking condition of the laser light beams incident upon the optical tape 101 in response to the laser light beams incident upon the focus and tracking detector 104 through the optical element 103. The output signals SF and ST thus obtained from the focus and tracking detector 104 are used for the focus control and the tracking control to which each of the laser light beams passing through the light beam control optical system 99 to be incident upon the optical tape 101 is subjected.

The light detector 106 is operative to produce a plurality of output signals SIN which vary in response to variations in each of the laser light beams incident upon the light detector 106 through the optical element 105 and supply an information reproducing portion 107 with the output signals SIN. The information reproducing portion 107 is operative to reproduce the information recorded on the optical tape 101 based on the output signals SIN obtained from the light detector 106.

In the embodiment of apparatus for recording and reproducing information shown in FIG. 27, when information is newly recorded on the optical tape 101, the modulation control signals SME based on the information to be recorded are supplied from the modulation control signal generator 97 to the reflection type light-modulating elements constituting the one-dimensional light-modulator 96. As the result, the laser light beams which have been modulated in response to the modulation control signals SME are obtained from the one-dimensional light-modulator 96 to be arranged substantially in the common plane.

The laser light beams modulated in response to the modulation control signals SME and obtained from the one-dimensional light-modulator 96 pass through the converging lens 95, the quarter wavelength plate 94, the polarized light beam splitter 93 and the quarter wavelength plate 98 to enter into the light beam control optical system 99 and then are subjected to the focus control and the tracking control in the light beam control optical system 99 so as to be incident upon the optical tape 101. As a result of this, the recording of the information on the optical tape 101 is carried out with the laser light beams which have been modulated in response to the modulation control signals SME and the recording tracks, on each of which the information is recorded, are formed on the optical tape 101.

In such an information recording, the light beam control optical system 99 is operative to focus the laser light beams modulated in response to the modulation control signals SME and arranged substantially in the common plane and having passed through the quarter wavelength plate 98 so that the geometric optical images of the modulated laser light beams are reduced over the diffraction limit thereof and simultaneously cause the focused modulated laser light beams to be incident upon the optical tape 101, or to focus the modulated laser light beams modulated in response to the modulation control signals SME and arranged substantially in the common plane and having passed through the quarter wavelength plate 98 so that the geometric optical images of the modulated laser light beams are obtained under the diffraction limit thereof and simultaneously cause the focused modulated laser light beams to be incident upon the optical tape 101 to form thereon the light spots arranged in a line at the predetermined angle other than 90 degrees or 180 degrees to the direction in which the optical tape 101 runs.

With such operations of the light beam control optical system 99 for recording the information on the optical tape 101, the recording tracks each of which extends in the direction in which the optical tape 101 runs are formed on the optical tape 101 with predetermined minimum (substantially zero) guard bands in the same manner as the recording tracks CH1', CH2', CH3', . . . , CHn' or CHS1, CHS2, CHS3, . . . , CHSn shown in FIG. 14, 16 or 18. An information recording pattern corresponding to the modulation state of each of the modulated laser light beams which are incident upon the optical tape 101 to form the recording tracks thereon is provided on each of the recording tracks.

When the laser light beams modulated in response to the modulation control signals SME and arranged substantially in the common plane are incident upon the optical tape 101 to form thereon the light spots arranged in a line at the predetermined angle other than 90 degrees or 180 degrees to the direction in which the optical tape 101 runs, the information recorded on the recording tracks formed on the optical tape 101 are provided with a phase-difference between each two recording tracks adjacent to each other, which is substantially constant in accordance with the predetermined angle of the light spots arranged in a line on the optical tape 101.

Meanwhile, in the embodiment of apparatus for recording and reproducing information shown in FIG. 27, when information recorded on the optical tape 101 is reproduced from the optical tape 101, the predetermined modulation control signals SOM are supplied from the modulation control signal generator 97 to the reflection type light-modulating elements constituting the one-dimensional light-modulator 96. As the result, the laser light beams which have not been subjected to any modulation to be constant in its intensity are obtained from the one-dimensional light-modulator 96 to be arranged substantially in the common plane.

The laser light beams having not been subjected to any modulation and obtained from the one-dimensional light-modulator 96 pass through the converging lens 95, the quarter wavelength plate 94, the polarized light beam splitter 93 and the quarter wavelength plate 98 to enter into the light beam control optical system 99 and then are subjected to the focus control and the tracking control in the light beam control optical system 99 so as to be incident upon the optical tape 101.

In such a case, the optical tape 101 has been provided thereon the recording tracks formed with the predetermined minimum (substantially zero) guard bands in the same manner as the recording tracks CH1', CH2', CH3', . . . , CHn' or CHS1, CHS2, CHS3, . . . , CHSn shown in FIG. 14, 16 or 18 for the recording of the information thereon and the laser light beams are appropriately positioned on the recording tracks formed on the optical tape 101, respectively, by the light beam control optical system 99.

The light beam control optical system 99 is operative to focus the laser light beams having not been subjected to any modulation and arranged substantially in the common plane and having passed through the quarter wavelength plate 98 so that the geometric optical images of the laser light beams are reduced over the diffraction limit thereof and simultaneously cause the focused laser light beams to be incident upon the optical tape 101, or to focus the laser light beams having not been subjected to any modulation and arranged substantially in the common plane and having passed through the quarter wavelength plate 98 so that the geometric optical images of the laser light beams are obtained under the diffraction limit thereof and simultaneously cause the focused laser light beams to be incident upon the optical tape 101 to form thereon the light spots arranged in a line at the predetermined angle other than 90 degrees or 180 degrees to the direction in which the optical tape 101 runs.

The laser light beams incident upon the optical tape 101 to be appropriately positioned on the recording tracks formed on the optical tape 101, respectively, are modulated in response to the information recorded on the recording tracks and simultaneously reflected from the recording tracks to be directed to the light beam control optical system 99 from the optical tape 101.

The laser light beams modulated in response to the information recorded on the optical tape 101 and obtained from the optical tape 101 pass through the light beam control optical system 99 and the quarter wavelength plate 98 and then are reflected from the polarized light beam splitter 93 to enter into the light beam splitter 102. The laser light beams thus entering into the light beam splitter 102 are partially reflected from the light beam splitter 102 to enter into the focus and tracking detector 104 through the optical element 103 and simultaneously partially pass through the light beam splitter 102 to enter into the light detector 106 through the optical element 105.

As a result of this, the output signal SF which represents the focus condition of the laser light beams incident upon the optical tape 101 and the output signal ST which represents the tracking condition of the laser light beams incident upon the optical tape 101 are obtained from the focus and tracking detector 104 and the output signals SIN which vary in response to variations in each of the laser light beams modulated in response to the information recorded on the optical tape 101 are obtained from the light detector 106 to be supplied to the information reproducing portion 107. Then, in the information reproducing portion 107, the information recorded on the optical tape 101 is reproduced based on the output signals SIN obtained from the light detector 106.

With the embodiment of apparatus for recording and reproducing information shown in FIG. 27, a noncontact information recording on the optical tape 101 by which the information is recorded on the recording tracks formed with the predetermined minimum guard bands on the optical tape 101 can be carried out, difficulties in determining and maintaining positional relations among the optical means through which the laser light beams pass or from which the laser light beams are reflected can be reduced and the coefficient of utilization of the laser light beams can be improved. Further, since the recording of the information on the optical tape 101 is performed in the condition wherein the laser light beams modulated in response to the modulation control signals SME based on the information to be recorded and arranged substantially in the common plane are incident upon the optical tape 101 to form thereon the light spots arranged in a line, the information recorded on the optical tape 101 can be reproduced relatively easily without performing complicated signal processing.

Figure 28:
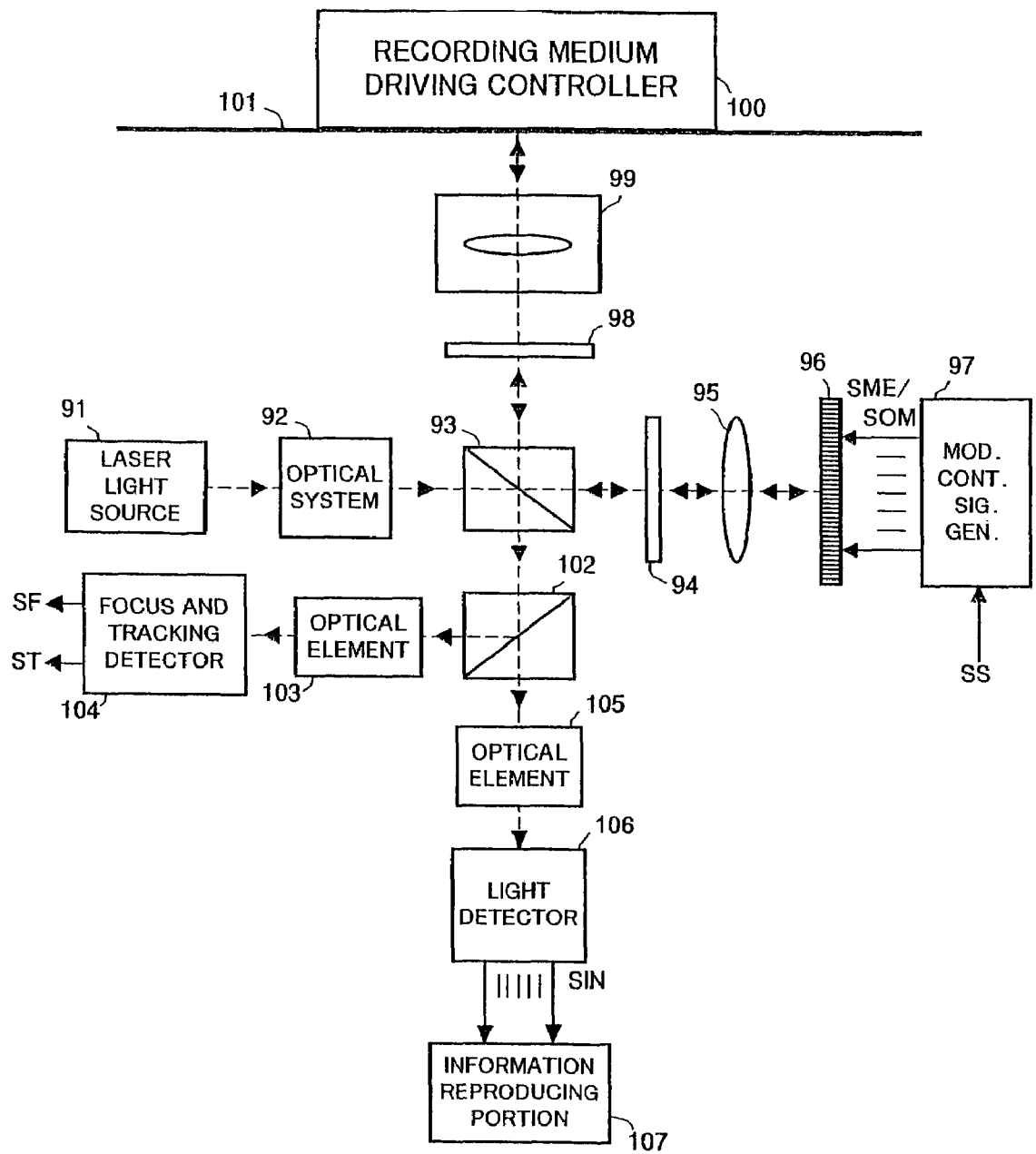
FIG. 28 is a schematic block diagram showing an essential part of another embodiment of apparatus for recording and reproducing information according to the invention claimed in any one of claims 29 to 36 of the present application.

FIG. 28 shows an essential part of another embodiment of apparatus for recording and reproducing information according to the invention claimed in any one of claims 29 to 36 of the present application.

In the embodiment shown in FIG. 28, a tape-shaped optical recording medium, that is, an optical tape is used as an optical recording medium and information is recorded on or reproduced from the optical tape.

The essential part of the embodiment shown in FIG. 28 is constituted with various structural elements corresponding to those constituting the essential part of the embodiment shown in FIG. 27, and in FIG. 28, blocks and signals in the essential part of the embodiment corresponding to those in the essential part of the embodiment shown in FIG. 27 are marked with the same references and further description thereof will be omitted.

The embodiment shown in FIG. 28 is different from the embodiment shown in FIG. 27 in the polarization characteristic of a polarized light beam splitter 93, the positional arrangement of a quarter wavelength plate 94, a converging lens 95, a one-dimensional light-modulator 96 and a modulation control signal generator 97, and the positional arrangement of another portion including a light beam splitter 102, an optical element 103, a focus and tracking detector 104, an optical element 105, a light detector 106 and an information reproducing portion 107.

In the embodiment shown in FIG. 28, a plurality of laser light-beams obtained from a laser light source 91 pass through an optical system 92 and the polarized light beam splitter 93, the quarter wavelength plate 94 and the converging lens 95 to be incident upon the one-dimensional light-modulator 96. Then, the laser light beams which have been modulated in response to modulation control signals SME based on information to be recorded by the reflection type light-modulating elements arranged in a line for constituting the one-dimensional light-modulator 96 and reflected from the reflection type light-modulating elements or the laser light beams which have not been subjected to any modulation and reflected from the reflection type light-modulating elements with constant reflection amount are obtained from the one-dimensional light-modulator 96 to enter into the polarized light beam splitter 93 through the converging lens 95 and the quarter wavelength plate 94. The laser light beams entering into the polarized light beam splitter 93 from the quarter wavelength plate 94 are reflected from the polarized light beam splitter 93 to be directed upward in FIG. 28. Then, the laser light beams obtained to be directed upward from the polarized light beam splitter 93 pass through a quarter wavelength plate 98 and a light beam control optical system 99 to be incident upon an optical tape 101.

Further, a plurality of laser light beams having been modulated in response to information recorded on the optical tape 101 are obtained from the optical tape 101 to enter into the polarized light beam splitter 93 through the light beam control optical system 99 and the quarter wavelength plate 98. The laser light beams entering into the polarized light beam splitter 93 from the quarter wavelength plate 98 pass through the polarized light beam splitter 93 to enter into the light beam splitter 102. A part of each of the laser light beams having entered into the light beam splitter 102 is reflected from the light beam splitter 102 to be directed to the left in FIG. 28 to enter into the focus and tracking detector 104 through the optical element 103, and another part of each of the laser light beams having entered into the light beam splitter 102 passes through the light beam splitter 102 to enter into the light detector 106 through the optical element 105.

The operation of each of the one-dimensional light-modulator 96, modulation control signal generator 97, light beam control optical system 99, focus and tracking detector 104 and information reproducing portion 107 is the same as that in the embodiment shown in FIG. 27. Accordingly, with the embodiment of apparatus for recording and reproducing information shown in FIG. 28, the advantages corresponding to those obtained with the embodiment of apparatus for recording and reproducing information shown in FIG. 27 can be also obtained.

APPLICABILITY FOR INDUSTRIAL USE

As apparent from the above description, with the apparatus for recording information thus constituted in accordance with the invention claimed in any one of claims 1 to 3 of the present application, since the light source which comprises the one-dimension diode array constituted with the laser diodes arranged in a line is used and the light beams which are modulated in response to the modulation control signals based on the information to be recorded are produced to be arranged in accordance with the arrangement of the laser diodes substantially in a common plane, focused so that the geometric optical images of the light beams are reduced over the diffraction limit thereof and simultaneously caused to be incident upon the optical recording medium driven by the recording medium driving controller, the noncontact information recording on the optical recording medium by which the information to be recorded is recorded on the recording tracks formed with minimum guard bands on the optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the optical recording medium is performed in the condition wherein the light beams arranged substantially in the common plane to be modulated in response to the modulation control signals based on the information to be recorded are incident upon the optical recording medium to form thereon the light spots arranged in a line, the information recorded on the optical recording medium can be reproduced relatively easily without performing complicated signal processing.

With the apparatus for recording information thus constituted in accordance with the invention claimed in claim 4 of the present application, since the light source which comprises the one-dimension diode array constituted with the laser diodes arranged in a line is used and the light beams which are modulated in response to the modulation control signals based on the information to be recorded are produced to be arranged in accordance with the arrangement of the laser diodes substantially in a common plane, focused so that the geometric optical images of the light beams are reduced over the diffraction limit thereof and simultaneously caused to be incident upon the tape-shaped optical recording medium driven by the recording medium driving controller to form on the tape-shaped optical recording medium the light spots arranged in a line at the predetermined angle to the direction in which the tape-shaped optical recording medium runs, the noncontact information recording on the tape-shaped optical recording medium by which the information to be recorded is recorded on the recording tracks formed with minimum guard bands on the tape-shaped optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the tape-shaped optical recording medium is performed in the condition wherein the light beams arranged substantially in the common plane to be modulated in response to the modulation control signals based on the information to be recorded are incident upon the tape-shaped optical recording medium to form thereon the light spots arranged in a line, the information recorded on the tape-shaped optical recording medium can be reproduced relatively easily without performing complicated signal processing.

With the apparatus for recording information thus constituted in accordance with the invention claimed in any one of claims 5 to 9 of the present application, since the light source which comprises the one-dimension diode array constituted with the laser diodes arranged in a line and the one-dimensional light-modulator constituted with the light-modulating elements which are arranged in a line are used and the light beams which are modulated in response to the modulation control signals based on the information to be recorded are produced to be arranged in accordance with the arrangement of the light-modulating elements substantially in a common plane, focused so that the geometric optical images of the light beams are reduced over the diffraction limit thereof and simultaneously caused to be incident upon the optical recording medium driven by the recording medium driving controller, the noncontact information recording on the optical recording medium by which the information to be recorded is recorded on the recording tracks formed with minimum guard bands on the optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the optical recording medium is performed in the condition wherein the light beams arranged substantially in the common plane to be modulated in response to the modulation control signals based on the information to be recorded are incident upon the optical recording medium to form thereon the light spots arranged in a line, the information recorded on the optical recording medium can be reproduced relatively easily without performing complicated signal processing.

With the apparatus for recording information thus constituted in accordance with the invention claimed in any one of claims 10 to 12 of the present application, since the light source which comprises the one-dimension diode array constituted with the laser diodes arranged in a line and the one-dimensional light-modulator constituted with the light-modulating elements which are arranged in a line are used and the light beams which are modulated in response to the modulation control signals based on the information to be recorded are produced to be arranged in accordance with the arrangement of the light-modulating elements substantially in a common plane, focused so that the geometric optical images of the light beams are obtained under the diffraction limit thereof and simultaneously caused to be incident upon the tape-shaped optical recording medium driven by the recording medium driving controller to form on the tape-shaped optical record medium the light spots arranged in a line at the predetermined angle to the direction in which the tape-shaped optical record medium runs, the noncontact information recording on the optical recording medium by which the information to be recorded is recorded on the recording tracks formed with minimum guard bands on the tape-shaped optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the optical recording medium is performed in the condition wherein the light beams arranged substantially in the common plane to be modulated in response to the modulation control signals based on the information to be recorded are incident upon the tape-shaped optical recording medium to form thereon the light spots arranged in a line, the information recorded on the tape-shaped optical recording medium can be reproduced relatively easily without performing complicated signal processing.

With the apparatus for recording and reproducing information thus constituted in accordance with the invention claimed in claim 13 or 14 of the present application, since the light source which comprises the one-dimension diode array constituted with the laser diodes arranged in a line is used and the light beams which are modulated in response to the modulation control signals based on the information to be recorded are produced to be arranged in accordance with the arrangement of the laser diodes substantially in a common plane, focused so that the geometric optical images of the light beams are reduced over the diffraction limit thereof and simultaneously caused to be incident upon the optical recording medium driven by the recording medium driving controller, the noncontact information recording on the optical recording medium by which the information to be recorded is recorded on the recording tracks formed with minimum guard bands on the optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the optical recording medium is performed in the condition wherein the light beams arranged substantially in the common plane to be modulated in response to the modulation control signals based on the information to be recorded are incident upon the optical recording medium to form thereon the light spots arranged in a line, the information recorded on the optical recording medium can be reproduced relatively easily without performing complicated signal processing, for example, with the additional light beams obtained from the second light source incident upon the optical recording medium driven by the recording medium driving controller, in the information reproducing portion.

With the apparatus for recording and reproducing information thus constituted in accordance with the invention claimed in claim 15 or 16 of the present application, since the light source which comprises the one-dimension diode array constituted with the laser diodes arranged in a line is used and the light beams which are modulated in response to the modulation control signals based on the information to be recorded are produced to be arranged in accordance with the arrangement of the laser diodes substantially in a common plane, focused so that the geometric optical images of the light beams are obtained under the diffraction limit thereof and simultaneously caused to be incident upon the tape-shaped optical recording medium driven by the recording medium driving controller to form on the tape-shaped optical record medium the light spots arranged in a line at the predetermined angle to the direction in which the tape-shaped optical record medium runs, the noncontact information recording on the optical recording medium by which the information to be recorded is recorded on the recording tracks formed with minimum guard bands on the tape-shaped optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the tape-shaped optical recording medium is performed in the condition wherein the light beams arranged substantially in the common plane to be modulated in response to the modulation control signals based on the information to be recorded are incident upon the tape-shaped optical recording medium to form thereon the light spots arranged in a line, the information recorded on the tape-shaped optical recording medium can be reproduced relatively easily without performing complicated signal processing, for example, with the additional light beams obtained from the second light source incident upon the tape-shaped optical recording medium driven by the recording medium driving controller, in the information reproducing portion.

With the apparatus for recording and reproducing information thus constituted in accordance with the invention claimed in claim 17 or 18 of the present application, since the first light source which comprises the one-dimension diode array constituted with the laser diodes arranged in a line and the one-dimensional light-modulator constituted with the light-modulating elements which are arranged in a line are used and the light beams which are modulated in response to the modulation control signals based on the information to be recorded are produced to be arranged in accordance with the arrangement of the light-modulating elements substantially in a common plane, focused so that the geometric optical images of the light beams are reduced over the diffraction limit thereof and simultaneously caused to be incident upon the optical recording medium driven by the recording medium driving controller, the noncontact information recording on the optical recording medium by which the information to be recorded is recorded on the recording tracks formed with minimum guard bands on the optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the optical recording medium is performed in the condition wherein the light beams arranged substantially in the common plane to be modulated in response to the modulation control signals based on the information to be recorded are incident upon the optical recording medium to form thereon the light spots arranged in a line, the information recorded on the optical recording medium can be reproduced relatively easily without performing complicated signal processing, for example, with the additional light beams obtained from the second light source incident upon the optical recording medium driven by the recording medium driving controller, in the information reproducing portion.

With the apparatus for recording and reproducing information thus constituted in accordance with the invention claimed in claim 19 or 20 of the present application, since the first light source which comprises the one-dimension diode array constituted with the laser diodes arranged in a line and the one-dimensional light-modulator constituted with the light-modulating elements which are arranged in a line are used and the light beams which are modulated in response to the modulation control signals based on the information to be recorded are produced to be arranged in accordance with the arrangement of the light-modulating elements substantially in a common plane, focused so that the geometric optical images of the light beams are obtained under the diffraction limit thereof and simultaneously caused to be incident upon the tape-shaped optical recording medium driven by the recording medium driving controller to form on the tape-shaped optical recording medium the light spots arranged in a line at the predetermined angle to the direction in which the tape-shaped optical recording medium runs, the noncontact information recording on the optical recording medium by which the information to be recorded is recorded on the recording tracks formed with minimum guard bands on the tape-shaped optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the tape-shaped optical recording medium is performed in the condition wherein the light beams arranged substantially in the common plane to be modulated in response to the modulation control signals based on the information to be recorded are incident upon the tape-shaped optical recording medium to form thereon the light spots arranged in a line, the information recorded on the tape-shaped optical recording medium can be reproduced relatively easily without performing complicated signal processing, for example, with the additional light beams obtained from the second light source incident upon the tape-shaped optical recording medium driven by the recording medium driving controller, in the information reproducing portion.

With the apparatus for recording and reproducing information thus constituted in accordance with the invention claimed in any one of claims 21 to 25 of the present application, since the light source which comprises the one-dimension diode array constituted with the laser diodes arranged in a line is used and the light beams modulated in response to the modulation control signals based on the information to be recorded or not modulated in accordance with the predetermined modulation control signal are produced to be arranged in accordance with the arrangement of the light-modulating elements substantially in a common plane, focused so that the geometric optical images of the light beams are reduced over the diffraction limit thereof and simultaneously caused to be incident upon the optical recording medium driven by the recording medium driving controller, the noncontact information recording on the optical recording medium by which the information to be recorded is recorded on the recording tracks formed with minimum guard bands on the optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the optical recording medium is performed in the condition wherein the light beams arranged substantially in the common plane to be modulated in response to the modulation control signals based on the information to be recorded are incident upon the optical recording medium to form thereon the light spots arranged in a line, the information recorded on the optical recording medium can be reproduced relatively easily without performing complicated signal processing, with the light beams not modulated to be arranged substantially in the common plane and caused to be incident upon the optical recording medium driven by the recording medium driving controller, in the information reproducing portion.

With the apparatus for recording and reproducing information thus constituted in accordance with the invention claimed in any one of claims 26 to 28 of the present application, since the light source which comprises the one-dimension diode array constituted with the laser diodes arranged in a line is used and the light beams modulated in response to the modulation control signals based on the information to be recorded or not modulated in accordance with the predetermined modulation control signal are produced to be arranged in accordance with the arrangement of the light-modulating elements substantially in a common plane, focused so that the geometric optical images of the light beams are obtained under the diffraction limit thereof and simultaneously caused to be incident upon the tape-shaped optical recording medium driven by the recording medium driving controller to form on tape-shaped optical recording medium the light spots arranged in a line at the predetermined angle to the direction in which the tape-shaped optical recording medium runs, the noncontact information recording on the tape-shaped optical recording medium by which the information to be recorded is recorded on the recording tracks formed with minimum guard bands on the tape-shaped optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the tape-shaped optical recording medium is performed in the condition wherein the light beams arranged substantially in the common plane to be modulated in response to the modulation control signals based on the information to be recorded are incident upon the tape-shaped optical recording medium to form thereon the light spots arranged in a line, the information recorded on the tape-shaped optical recording medium can be reproduced relatively easily without performing complicated signal processing, with the light beams not modulated to be arranged substantially in the common plane and caused to be incident upon the tape-shaped optical recording medium driven by the recording medium driving controller, in the information reproducing portion.

With the apparatus for recording and reproducing information thus constituted in accordance with the invention claimed in any one of claims 29 to 33 of the present application, since the light source which comprises the one-dimension diode array constituted with the laser diodes arranged in a line and the one-dimensional light-modulator constituted with the light-modulating elements arranged in a line are used, and the light beams modulated in response to the modulation control signals based on the information to be recorded or not modulated in accordance with the predetermined modulation control signal are produced to be arranged in accordance with the arrangement of the light-modulating elements substantially in a common plane in the one-dimensional light-modulator, focused so that the geometric optical images of the light beams are reduced over the diffraction limit thereof and simultaneously caused to be incident upon the optical recording medium driven by the recording medium driving controller, the noncontact information recording on the optical recording medium by which the information to be recorded is recorded on the recording tracks formed with minimum guard bands on the optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the optical recording medium is performed in the condition wherein the light beams arranged substantially in the common plane to be modulated in response to the modulation control signals based on the information to be recorded are incident upon the optical recording medium to form thereon the light spots arranged in a line, the information recorded on the optical recording medium can be reproduced relatively easily without performing complicated signal processing, with the light beams not modulated to be arranged substantially in the common plane and caused to be incident upon the optical recording medium driven by the recording medium driving controller, in the information reproducing portion.

With the apparatus for recording and reproducing information thus constituted in accordance with the invention claimed in any one of claims 34 to 36 of the present application, since the light source which comprises the one-dimension diode array constituted with the laser diodes arranged in a line and the one-dimensional light-modulator constituted with the light-modulating elements arranged in a line are used, and the light beams modulated in response to the modulation control signals based on the information to be recorded or not modulated in accordance with the predetermined modulation control signal are produced to be arranged in accordance with the arrangement of the light-modulating elements substantially in a common plane in the one-dimensional light-modulator, focused so that the geometric optical images of the light beams are obtained under the diffraction limit thereof and simultaneously caused to be incident upon the tape-shaped optical recording medium driven by the recording medium driving controller to form on the tape-shaped optical recording medium the light spots arranged in a line at the predetermined angle to the direction in which the tape-shaped optical recording medium runs, the noncontact information recording on the tape-shaped optical recording medium by which the information to be recorded is recorded on the recording tracks formed with minimum guard bands on the tape-shaped optical recording medium can be carried out, difficulties in determining and maintaining positional relations among the optical means through which the light beams pass or from which the light beams are reflected can be reduced, and the coefficient of utilization of the light beams can be improved.

Further, since the recording of the information to be recorded on the tape-shaped optical recording medium is performed in the condition wherein the light beams arranged substantially in the common plane to be modulated in response to the modulation control signals based on the information to be recorded are incident upon the tape-shaped optical recording medium to form thereon the light spots arranged in a line, the information recorded on the tape-shaped optical recording medium can be reproduced relatively easily without performing complicated signal processing, with the light beams not modulated to be arranged substantially in the common plane and caused to be incident upon the tape-shaped optical recording medium driven by the recording medium driving controller, in the information reproducing portion.

The invention claimed is:

1. An apparatus for recording information comprising:
a recording medium driving controller for driving an optical recording medium,
a light source comprising a one-dimensional diode array constituted with a plurality of laser diodes arranged in a line for generating a plurality of light beams,
a modulation control signal generator for supplying the laser diodes in said light source with modulation control signals varying in response to information to be recorded so that the laser diodes in said light source generate modulated light beams which are modulated in response to the modulation control signals and arranged in a line in accordance with an arrangement of said laser diodes, and
an optical system for focusing the modulated light beams obtained from said light source so that geometric optical images of said modulated light beams are reduced over the diffraction limit thereof and for causing the modulated light beams thus focused to be incident upon the optical recording medium driven by said recording medium driving controller to record the information to be recorded on the optical recording medium.

2. An apparatus for recording information according to claim 1, wherein said optical recording medium driven by said recording medium driving controller is a tape-shaped optical recording medium driven to run, and said optical system is operative to cause the modulated light beams focused so that the geometric optical images of said modulated light beams are reduced over the diffraction limit thereof to be incident upon said tape-shaped optical recording medium to form thereon a plurality of light spots arranged in a line at a predetermined angle to a direction in which said tape-shaped optical recording medium runs.

3. An apparatus for recording information according to claim 2, wherein said modulated light beams caused to be incident upon the tape-shaped optical recording medium by said optical system are operative to form on the tape-shaped optical recording medium the light spots arranged in a line substantially at a right angle to the direction in which said tape-shaped optical recording medium runs.

4. An apparatus for recording information comprising;
a recording medium driving controller for driving a tape-shaped optical recording medium,
a light source comprising a one-dimensional diode array constituted with a plurality of laser diodes arranged in a line for generating a plurality of light beams,
a modulation control signal generator for supplying the laser diodes in said light source with modulation control signals varying in response to information to be recorded so that the laser diodes in said light source generate modulated light beams which are modulated in response to the modulation control signals and arranged in a line in accordance with an arrangement of said laser diodes, and
an optical system for focusing the modulated light beams obtained from said light source so that geometric optical images of said modulated light beams are obtained under the diffraction limit thereof and for causing the modulated light beams thus focused to be incident upon the tape-shaped optical recording medium driven by said recording medium driving controller to form on said tape-shaped optical recording medium a plurality of light spots arranged in a line at a predetermined angle to a direction in which said tape-shaped optical recording medium runs and record the information to be recorded on said tape-shaped optical recording medium.

5. An apparatus for recording information comprising;
a recording medium driving controller for driving an optical recording medium,
a light source comprising a one-dimensional diode array constituted with a plurality of laser diodes arranged in a line for generating a plurality of light beams,
a one-dimensional light-modulator constituted with a plurality of light-modulating elements arranged in a line,
a first optical system for causing the light beams obtained from said light source to incident upon the light-modulating elements in said one-dimensional light-modulator, a modulation control signal generator for supplying the light-modulating elements in said one-dimensional light-modulator with modulation control signals varying in response to information to be recorded so that the light beams obtained from said light source are modulated in response to the modulation control signals at the light-modulating elements in said one-dimensional light-modulator to be arranged in a line in accordance with an arrangement of said light-modulating elements, and a second optical system for focusing the light beams modulated in said one-dimensional light-modulator so that geometric optical images of said light beams are reduced over the diffraction limit thereof and for causing the light beams thus focused to be incident upon the optical recording medium driven by said recording medium driving controller to record the information to be recorded on the optical recording medium.

6. An apparatus for recording information according to claim 5, wherein the number of the light-modulating elements in said one-dimensional light-modulator is larger than the number of the light beams incident upon said light-modulating elements and a group of the light-modulating elements upon which the light beams are actually incident is supplied with the modulation control signals from said modulation control signal generator.

7. An apparatus for recording information according to claim 5, wherein the number of the light-modulating elements in said one-dimensional light-modulator is larger than the number of the light beams incident upon said light-modulating elements and each two or more of the light-modulating elements upon which one of the light beams is incident are supplied with the same modulation control signal from said modulation control signal generator.

8. An apparatus for recording information according to claim 5, wherein said optical recording medium driven by said recording medium driving controller is a tape-shaped optical recording medium driven to run, and said second optical system is operative to cause the modulated light beams focused so that the geometric optical images of said modulated light beams are reduced over the diffraction limit thereof to be incident upon said tape-shaped optical recording medium to form thereon a plurality of light spots arranged in a line at a predetermined angle to a direction in which said tape-shaped optical recording medium runs.

9. An apparatus for recording information according to claim 8, wherein said modulated light beams caused to be incident upon the tape-shaped optical recording medium by said optical system are operative to form on the tape-shaped optical recording medium the light spots arranged in a line substantially at a right angle to the direction in which said tape-shaped optical recording medium runs.

10. An apparatus for recording information comprising;
a recording medium driving controller for driving a tape-shaped optical recording medium,
a light source comprising a one-dimensional diode array constituted with a plurality of laser diodes arranged in a line for generating a plurality of light beams,
a one-dimensional light-modulator constituted with a plurality of light-modulating elements arranged in a line,
a first optical system for causing the light beams obtained from said light source to incident upon the light-modulating elements in the one-dimensional light-modulator,
a modulation control signal generator for supplying the light-modulating elements in said one-dimensional light-modulator with modulation control signals varying in response to information to be recorded so that the light beams obtained from said light source are modulated in response to the modulation control signals at the light-modulating elements in said one-dimensional light-modulator to be arranged in a line in accordance with an arrangement of said light-modulating elements, and a second optical system for focusing the modulated light beams modulated in said one-dimensional light-modulator so that geometric optical images of said modulated light beams are obtained under the diffraction limit thereof and for causing the light beams thus focused to be incident upon the tape-shaped optical recording medium driven by said recording medium driving controller to form on said optical recording medium a plurality of light spots arranged in a line at a predetermined angle to a direction in which said tape-shaped optical recording medium runs and record the information to be recorded on said tape-shaped optical recording medium.

11. An apparatus for recording information according to claim 10, wherein the number of the light-modulating elements in said one-dimensional light-modulator is larger than the number of the light beams incident upon said light-modulating elements and a group of the light-modulating elements upon which the light beams are actually incident is supplied with the modulation control signals from said modulation control signal generator.

12. An apparatus for recording information according to claim 10, wherein the number of the light-modulating elements in said one-dimensional light-modulator is larger than the number of the light beams incident upon said light-modulating elements and each two or more of the light-modulating elements upon which one of the light beams is incident are supplied with the same modulation control signal from said modulation control signal generator.

13. An apparatus for recording and reproducing information comprising;
a recording medium driving controller for driving an optical recording medium,
a first light source comprising a one-dimensional diode array constituted with a plurality of laser diodes arranged in a line for generating a plurality of light beams,
a modulation control signal generator for supplying the laser diodes in said first light source with modulation control signals varying in response to information to be recorded so that the laser diodes in said first light source generate modulated light beams which are modulated in response to the modulation control signals and arranged in a line in accordance with an arrangement of said laser diodes,
a first optical system for focusing the modulated light beams obtained from said first light source so that geometric optical images of said modulated light beams are reduced over the diffraction limit thereof and for causing the modulated light beams thus focused to be incident upon the optical recording medium driven by said recording medium driving controller to record the information to be recorded on the optical recording medium,
a second light source for emitting additional light beams,
a second optical system for causing the additional light beams obtained from said second light source to be incident upon the optical recording medium driven by said recording medium driving controller so that a plurality of light beams modulated in response to the information recorded on the optical recording medium are obtained from said optical recording medium, a light detector for generating output signals varying in response to variations in light beams incident thereupon, a third optical system for causing the modulated light beams obtained from the optical recording medium to be incident upon said light detector, and an information reproducing portion for reproducing the information recorded on the optical recording medium based on the output signals obtained from said light detector.

14. An apparatus for recording and reproducing information according to claim 13, wherein said second light source is operative to produce the additional light beams arranged substantially in a common plane.

15. An apparatus for recording and reproducing information comprising;

a recording medium driving controller for driving a tape-shaped optical recording medium, a first light source comprising a one-dimensional diode array constituted with a plurality of laser diodes arranged in a line for generating a plurality of light beams, a modulation control signal generator for supplying the laser diodes in said first light source with modulation control signals varying in response to information to be recorded so that the laser diodes in said first light source generate modulated light beams which are modulated in response to the modulation control signals and arranged in a line in accordance with an arrangement of said laser diodes, a first optical system for focusing the modulated light beams obtained from said first light source so that geometric optical images of said modulated light beams are obtained under the diffraction limit thereof and for causing the modulated light beams thus focused to be incident upon the tape-shaped optical recording medium driven by said recording medium driving controller to form on said tape-shaped optical recording medium a plurality of light spots arranged in a line at a predetermined angle to a direction in which said tape-shaped optical recording medium runs and record the information to be recorded on said tape-shaped optical recording medium, a second light source for emitting additional light beams, a second optical system for causing the additional light beams obtained from said second light source to be incident upon the tape-shaped optical recording medium driven by said recording medium driving controller so that a plurality of light beams modulated in response to the information recorded on the tape-shaped optical recording medium are obtained from said tape-shaped optical recording medium, a light detector for generating output signals varying in response to variations in light beams incident thereupon, a third optical system for causing the modulated light beams obtained from the tape-shaped optical recording medium to be incident upon said light detector, and an information reproducing portion for reproducing the information recorded on the tape-shaped optical recording medium based on the output signals obtained from said light detector.

16. An apparatus for recording and reproducing information according to claim 15, wherein said second light source is operative to produce the additional light beams arranged substantially in a common plane.

17. An apparatus for recording and reproducing information comprising;

a recording medium driving controller for driving an optical recording medium, a first light source comprising a one-dimensional diode array constituted with a plurality of laser diodes arranged in a line for generating a plurality of light beams, a one-dimensional light-modulator constituted with a plurality of light-modulating elements arranged in a line, a first optical system for causing the light beams obtained from said light source to incident upon the light-modulating elements in said one-dimensional light-modulator, a modulation control signal generator for supplying the light-modulating elements in said one-dimensional light-modulator with modulation control signals varying in response to information to be recorded so that the light beams obtained from the light source are modulated in response to the modulation control signals at the light-modulating elements in said one-dimensional light-modulator to be arranged in a line in accordance with an arrangement of the light-modulating elements, a second optical system for focusing the light beams modulated in said one-dimensional light-modulator so that geometric optical images of said light beams are reduced over the diffraction limit thereof and for causing the light beams thus focused to be incident upon the optical recording medium driven by said recording medium driving controller to record the information to be recorded said the optical recording medium, a second light source for emitting additional light beams, a third optical system for causing the additional light beams obtained from said second light source to be incident upon the optical recording medium driven by said recording medium driving controller so that a plurality of light beams modulated in response to the information recorded on the optical recording medium are obtained from said optical recording medium, a light detector for generating output signals varying in response to variations in light beams incident thereupon, a fourth optical system for causing the modulated light beams obtained from the optical recording medium to be incident upon said light detector, and an information reproducing portion for reproducing the information recorded on the optical recording medium based on the output signals obtained from said light detector.

18. An apparatus for recording and reproducing information according to claim 17, wherein said second light source is operative to produce the additional light beams arranged substantially in a common plane.

19. An apparatus for recording and reproducing information comprising;

a recording medium driving controller for driving a tape-shaped optical recording medium, a first light source comprising a one-dimensional diode array constituted with a plurality of laser diodes arranged in a line for generating a plurality of light beams, a one-dimensional light-modulator constituted with a plurality of light-modulating elements arranged in a line, a first optical system for causing the light beams obtained from said light source to incident upon the light-modulating elements in said one-dimensional light-modulator, a modulation control signal generator for supplying the light-modulating elements in said one-dimensional light-modulator with modulation control signals varying in response to information to be recorded so that the light beams obtained from said light source are modulated in response to the modulation control signals at the light-modulating elements in said one-dimensional light-modulator to be arranged in a line in accordance with an arrangement of said light-modulating elements, a second optical system for focusing the light beams modulated in said one-dimensional light-modulator so that geometric optical images of said light beams are obtained under the diffraction limit thereof and for causing the light beams thus focused to be incident upon the tape-shaped optical recording medium driven by said recording medium driving controller to form on said tape-shaped optical recording medium a plurality of light spots arranged in a line at a predetermined angle to a direction in which said tape-shaped optical recording medium runs and record the information to be recorded said the tape-shaped optical recording medium, a second light source for emitting additional light beams, a third optical system for causing the additional light beams obtained from said second light source to be incident upon the tape-shaped optical recording medium driven by said recording medium driving controller so that a plurality of light beams modulated in response to the information recorded on the tape-shaped optical recording medium are obtained from the tape-shaped optical recording medium, a light detector for generating output signals varying in response to variations in light beams incident thereupon, a fourth optical system for causing the modulated light beams obtained from the tape-shaped optical recording medium to be incident upon said light detector, and an information reproducing portion for reproducing the information recorded on the tape-shaped optical recording medium based on the output signals obtained from said light detector.

20. An apparatus for recording and reproducing information according to claim 19, wherein said second light source is operative to produce the additional light beams arranged substantially in a common plane.

21. An apparatus for recording and reproducing information comprising;

a recording medium driving controller for driving an optical recording medium, a light source comprising a one-dimensional diode array constituted with a plurality of laser diodes arranged in a line for generating a plurality of light beams, a modulation control signal generator for supplying the laser diodes in said light source with one of modulation control signals varying in response to information to be recorded and predetermined modulation control signals so that the laser diodes in the light source generate one of light beams which have been modulated in response to the modulation control signals and arranged in a line in accordance with an arrangement of the laser diodes and light beams which have not been subjected to any modulation and arranged in a line in accordance with the arrangement of the laser diodes, a polarized light beam splitter into which the light beams from said light source enter, a first optical system for focusing one of the light beams having passed through said polarized light beam splitter and the light beams having been reflected from said polarized light beam splitter so that geometric optical images of said light beams are reduced over the diffraction limit thereof and for causing the light beams thus focused to be incident upon the optical recording medium driven by said recording medium driving controller to record the information to be recorded on the optical recording medium or to produce a plurality of light beams modulated in response to information recorded on the optical recording medium and departing from said optical recording medium, a light detector for generating output signals varying in response to variations in light beams incident thereupon, a second optical system for causing one of the light beams obtained from the optical recording medium and having been reflected from said polarized light beam splitter to be incident upon said light detector and the light beams obtained from the optical recording medium and having passed through said polarized light beam splitter to be incident upon said light detector, and an information reproducing portion for reproducing the information recorded on the optical recording medium based on the output signals obtained from said light detector.

22. An apparatus for recording and reproducing information according to claim 21, wherein said optical recording medium driven by said recording medium driving controller is a tape-shaped optical recording medium driven to run, and said first optical system is operative to cause the light beams focused so that the geometric optical images of said light beams are reduced over the diffraction limit thereof to be incident upon said tape-shaped optical recording medium to form thereon a plurality of light spots arranged in a line at a predetermined angle to a direction in which said tape-shaped optical recording medium runs.

23. An apparatus for recording information according to claim 22, wherein said light beams caused to be incident upon the tape-shaped optical recording medium by said first optical system are operative to form on the tape-shaped optical recording medium the light spots arranged in a line substantially at a right angle to the direction in which said tape-shaped optical recording medium runs.

24. An apparatus for recording information according to claim 21, wherein said first optical system comprises a light beam control optical system operative to subject the light beams incident upon the optical recording medium driven by said recording medium driving controller to both of a focus control and a tracking control.

25. An apparatus for recording information according to claim 24, wherein a focus and tracking detector is provided for producing at least one of output signals which represent respectively a focus condition and a tracking condition of the light beams incident upon the optical recording medium driven by said recording medium driving controller in response to the light beams incident thereupon from said optical recording medium, and said second optical system comprises a light beam splitter operative to cause one of the light beams obtained from the optical recording medium and having been reflected from said polarized light beam splitter and the light beams obtained from the optical recording medium and having passed through said polarized light beam splitter to be incident upon both of said light detector and focus and tracking detector.

26. An apparatus for recording and reproducing information comprising;
a recording medium driving controller for driving a tape-shaped optical recording medium,
a light source comprising a one-dimensional diode array constituted with a plurality of laser diodes arranged in a line for generating a plurality of light beams,
a modulation control signal generator for supplying the laser diodes in said light source with one of modulation control signals varying in response to information to be recorded or predetermined modulation control signals so that the laser diodes in said light source generate one of light beams which have been modulated in response to the modulation control signals and arranged in a line in accordance with an arrangement of the laser diodes and light beams which have not been subjected to any modulation and arranged in a line in accordance with the arrangement of the laser diodes,
a polarized light beam splitter into which the light beams from said light source enter,
a first optical system for focusing one of the light beams having passed through said the polarized light beam splitter and the light beams having been reflected from said the polarized light beam splitter so that geometric optical images of said light beams are obtained under the diffraction limit thereof and for causing the light beams thus focused to be incident upon the tape-shaped optical recording medium driven by said recording medium driving controller to form on said tape-shaped optical recording medium a plurality of light spots arranged in a line at a predetermined angle to a direction in which said tape-shaped optical recording medium runs and record the information to be recorded on said tape-shaped optical recording medium or produce a plurality of light beams modulated in response to information recorded on said tape-shaped optical recording medium and departing from said tape-shaped optical recording medium,
a light detector for generating output signals varying in response to variations in light beams incident thereupon,
a second optical system for causing one of the light beams obtained from the tape-shaped optical recording medium and having been reflected from said polarized light beam splitter to be incident upon said light detector and the light beams obtained from the tape-shaped optical recording medium and having passed through said polarized light beam splitter to be incident upon said light detector, and
an information reproducing portion for reproducing the information recorded on the tape-shaped optical recording medium based on the output signals obtained from said light detector.

27. An apparatus for recording information according to claim 26, wherein said first optical system comprises a light beam control optical system operative to subject the light beams incident upon the optical recording medium driven by said recording medium driving controller to both of a focus control and a tracking control.

28. An apparatus for recording information according to claim 27, wherein a focus and tracking detector is provided for producing at least one of output signals which represent respectively a focus condition and a tracking condition of the light beams incident upon the optical recording medium driven by said recording medium driving controller in response to the light beams incident thereupon from said optical recording medium, and said second optical system comprises a light beam splitter operative to cause one of the light beams obtained from the optical recording medium and having been reflected from said polarized light beam splitter and the light beams obtained from the optical recording medium and having passed through said polarized light beam splitter to be incident upon both of said light detector and focus and tracking detector.

29. An apparatus for recording and reproducing information comprising;
a recording medium driving controller for driving an optical recording medium,
a light source comprising a one-dimensional diode array constituted with a plurality of laser diodes arranged in a line for generating a plurality of light beams,
a one-dimensional light-modulator constituted with a plurality of light-modulating elements arranged in a line,
a first optical system for causing the light beams obtained from said light source to incident upon the light-modulating elements in said one-dimensional light-modulator,
a modulation control signal generator for supplying the light-modulating elements in said one-dimensional light-modulator with one of modulation control signals varying in response to information to be recorded and predetermined modulation control signals so that the light-modulating elements in said one-dimensional light-modulator generate one of light beams which have been modulated in response to the modulation control signals and arranged in a line in accordance with an arrangement of said light-modulating elements and light beams which have not been subjected to any modulation and arranged in a line in accordance with the arrangement of said light-modulating elements,
a polarized light beam splitter into which the light beams from said one-dimensional light-modulator enter,
a second optical system for focusing one of the light beams obtained from said one-dimensional light-modulator and having passed through the polarized light beam splitter and the light beams obtained from said one-dimensional light-modulator and having been reflected from the polarized light beam splitter so that geometric optical images of said light beams are reduced over the diffraction limit thereof and for causing the light beams thus focused to be incident upon the optical recording medium driven by said recording medium driving controller to record the information to be recorded on said optical recording medium or to produce a plurality of light beams modulated in response to information recorded on said optical recording medium and departing from said optical recording medium,
a light detector for generating output signals varying in response to variations in light beams incident thereupon,
a third optical system for causing one of the light beams obtained from the optical recording medium and having been reflected from the polarized light beam splitter to be incident upon said light detector and the light beams obtained from the optical recording medium and having passed through the polarized light beam splitter to be incident upon said light detector, and
an information reproducing portion for reproducing the information recorded on the optical recording medium based on the output signals obtained from said light detector.

30. An apparatus for recording information according to claim 29, wherein said optical recording medium driven by said recording medium driving controller is a tape-shaped optical recording medium driven to run, and said second optical system is operative to cause the light beams focused so that the geometric optical images of said modulated light beams are reduced over the diffraction limit thereof to be incident upon said tape-shaped optical recording medium to form thereon a plurality of light spots arranged in a line at a predetermined angle to a direction in which said tape-shaped optical recording medium runs.

31. An apparatus for recording information according to claim 30, wherein said light beams caused to be incident upon the tape-shaped optical recording medium by said optical system are operative to form on the tape-shaped optical recording medium the light spots arranged in a line substantially at a right angle to the direction in which said tape-shaped optical recording medium runs.

32. An apparatus for recording information according to claim 29, wherein said second optical system comprises a light beam control optical system operative to subject the light beams incident upon the optical recording medium driven by said recording medium driving controller to both of a focus control and a tracking control.

33. An apparatus for recording information according to claim 32, wherein a focus and tracking detector is provided for producing at least one of output signals which represent respectively a focus condition and a tracking condition of the light beams incident upon the optical recording medium driven by said recording medium driving controller in response to the light beams incident thereupon from said optical recording medium, and said third optical system comprises a light beam splitter operative to cause one of the light beams obtained from the optical recording medium and having been reflected from said polarized light beam splitter and the light beams obtained from the optical recording medium and having passed through said polarized light beam splitter to be incident upon both of said light detector and focus and tracking detector.

34. An apparatus for recording and reproducing information comprising;
a recording medium driving controller for driving a tape-shaped optical recording medium,
a light source comprising a one-dimensional diode array constituted with a plurality of laser diodes arranged in a line for generating a plurality of light beams,
a one-dimensional light-modulator constituted with a plurality of light-modulating elements arranged in a line,
a first optical system for causing the light beams obtained from said light source to be incident upon the light-modulating elements in said one-dimensional light-modulator,
a modulation control signal generator for supplying the light-modulating elements in said one-dimensional light-modulator with one of modulation control signals varying in response to information to be recorded and predetermined modulation control signals so that the light beams obtained from said light source are modulated in response to the modulation control signals to be arranged in a line in accordance with an arrangement of said light-modulating elements or the light beams obtained from said light source are not subjected to any modulation at the light-modulating elements in said one-dimensional light-modulator to be arranged in a line in accordance with an arrangement of said light-modulating elements,
a polarized light beam splitter into which the light beams from said one-dimensional light-modulator enter,
a second optical system for focusing one of the light beams obtained from said one-dimensional light-modulator and having passed through said polarized light beam splitter and the light beams obtained from said one-dimensional light-modulator and having been reflected from said polarized light beam splitter so that geometric optical images of said light beams are obtained under the diffraction limit thereof and for causing the light beams thus focused to be incident upon the tape-shaped optical recording medium driven by said recording medium driving controller to form on said tape-shaped optical recording medium a plurality of light spots arranged in a line at a predetermined angle to a direction in which said tape-shaped optical recording medium runs and record the information to be recorded on said tape-shaped optical recording medium or produce a plurality of light beams modulated in response to information recorded on said tape-shaped optical recording medium and departing from said tape-shaped optical recording medium,
a third optical system for causing one of the light beams obtained from the tape-shaped optical recording medium and having been reflected from said polarized light beam splitter and the light beams obtained from the tape-shaped optical recording medium and having passed through said polarized light beam splitter to be incident upon said light detector, and
an information reproducing portion for reproducing the information recorded on the tape-shaped optical recording medium based on the output signals obtained from said light detector.

35. An apparatus for recording information according to claim 34, wherein said second optical system comprises a light beam control optical system operative to subject the light beams incident upon the optical recording medium driven by said recording medium driving controller to both of a focus control and a tracking control.

36. An apparatus for recording information according to claim 35, wherein a focus and tracking detector is provided for producing at least one of output signals which represent respectively a focus condition and a tracking condition of the light beams incident upon the optical recording medium driven by said recording medium driving controller in response to the light beams incident thereupon from said optical recording medium, and said third optical system comprises a light beam splitter operative to cause one of the light beams obtained from the optical recording medium and having been reflected from said polarized light beam splitter and the light beams obtained from the optical recording medium and having passed through said polarized light beam splitter to be incident upon both of said light detector and focus and tracking detector.

* * * * *